United States Patent
Jamison et al.

(10) Patent No.: US 7,958,049 B2
(45) Date of Patent: *Jun. 7, 2011

(54) SYSTEM AND METHOD FOR OBTAINING CUSTOMER BILL INFORMATION AND FACILITATING BILL PAYMENT AT BILLER WEBSITES

(75) Inventors: Eric W. Jamison, Metuchen, NJ (US); David S. Fortney, Lawrenceville, NJ (US); Dhaval A. Vasavada, Belle Mead, NJ (US); Alexander Kosowski, Hamilton Square, NJ (US)

(73) Assignee: Metavante Corporation, Jacksonville, FL (US)

( * ) Notice: Subject to any disclaimer, the term of this patent is extended or adjusted under 35 U.S.C. 154(b) by 1162 days.

This patent is subject to a terminal disclaimer.

(21) Appl. No.: 10/405,570

(22) Filed: Apr. 2, 2003

(65) Prior Publication Data

US 2003/0191711 A1    Oct. 9, 2003

Related U.S. Application Data

(63) Continuation-in-part of application No. 09/999,311, filed on Nov. 1, 2001.

(51) Int. Cl.
G06Q 40/00    (2006.01)
(52) U.S. Cl. ............... 705/40; 705/39; 705/44; 705/35; 705/42
(58) Field of Classification Search ............... 705/40; 700/90
See application file for complete search history.

(56) References Cited

U.S. PATENT DOCUMENTS

| 3,833,885 | A | 9/1974 | Gentile et al. |
| 4,277,837 | A | 7/1981 | Stuckert |
| 4,319,336 | A | 3/1982 | Anderson et al. |
| 4,460,960 | A | 7/1984 | Anderson et al. |
| 4,678,895 | A | 7/1987 | Tateisi et al. |
| 4,727,243 | A | 2/1988 | Savar |
| 4,823,264 | A | 4/1989 | Deming |
| 4,947,028 | A | 8/1990 | Gorog |

(Continued)

FOREIGN PATENT DOCUMENTS

EP    1020824 A2    7/2000

(Continued)

OTHER PUBLICATIONS

"Intuit to Offer Electronic Bill Presentment Through Quicken 98", dated Dec. 1997, 1999 PR Newswire Association Inc.*

(Continued)

*Primary Examiner* — Ella Colbert
*Assistant Examiner* — Hai Tran
(74) *Attorney, Agent, or Firm* — Finnegan, Henderson, Farabow, Garrett & Dunner LLP

(57) ABSTRACT

An integrated electronic bill presentment and payment (EBPP) system is disclosed which obtains bills for customers (which include individuals, businesses, and organizations) and allow payments including payments by credit card to be processed at the biller websites on behalf of customers. The integrated EBPP system obtains bills for customers from paper billers, electronic billers, and scrape-enabled biller websites, with customers providing access information for biller websites to the integrated EBPP system, which uses a software agent or bot to make scheduled scrapes of biller websites to obtain customer bills. The integrated EBPP system enables customers to automatically set up a user account at biller websites, with customers providing user access information and user financial account information, such as a credit card or debit card, for accessing biller websites and for initiating payments at biller websites.

27 Claims, 28 Drawing Sheets

U.S. PATENT DOCUMENTS

| | | | |
|---|---|---|---|
| 5,025,373 | A | 6/1991 | Keyser, Jr. et al. |
| 5,220,501 | A | 6/1993 | Lawlor et al. |
| 5,231,571 | A | 7/1993 | D'Agostino |
| 5,283,829 | A | 2/1994 | Anderson |
| 5,287,270 | A | 2/1994 | Hardy et al. |
| 5,325,290 | A | 6/1994 | Cauffman et al. |
| 5,326,959 | A | 7/1994 | Perazza |
| 5,336,870 | A | 8/1994 | Hughes et al. |
| 5,341,429 | A | 8/1994 | Stringer et al. |
| 5,347,632 | A | 9/1994 | Filepp et al. |
| 5,383,113 | A | 1/1995 | Kight et al. |
| 5,420,405 | A | 5/1995 | Chasek |
| 5,465,206 | A | 11/1995 | Hilt et al. |
| 5,483,445 | A | 1/1996 | Pickering |
| 5,594,910 | A | 1/1997 | Filepp et al. |
| 5,655,089 | A | 8/1997 | Bucci |
| 5,710,887 | A | 1/1998 | Chelliah et al. |
| 5,710,889 | A | 1/1998 | Clark et al. |
| 5,727,129 | A | 3/1998 | Barrett et al. |
| 5,727,249 | A | 3/1998 | Pollin |
| 5,754,939 | A | 5/1998 | Herz et al. |
| 5,815,665 | A | 9/1998 | Teper et al. |
| 5,826,242 | A | 10/1998 | Montulli |
| 5,848,396 | A | 12/1998 | Gerace |
| 5,857,190 | A | 1/1999 | Brown |
| 5,870,559 | A | 2/1999 | Leshem et al. |
| 5,870,724 | A | 2/1999 | Lawlor et al. |
| 5,873,072 | A | 2/1999 | Kight et al. |
| 5,884,288 | A | 3/1999 | Chang et al. |
| 5,903,721 | A | 5/1999 | Sixtus |
| 5,903,732 | A | 5/1999 | Reed et al. |
| 5,920,847 | A | 7/1999 | Kolling et al. |
| 5,930,759 | A | 7/1999 | Moore et al. |
| 5,943,656 | A | 8/1999 | Crooks et al. |
| 5,956,693 | A | 9/1999 | Geerlings |
| 5,956,700 | A | 9/1999 | Landry |
| 5,963,925 | A | 10/1999 | Kolling et al. |
| 5,974,146 | A | 10/1999 | Randle et al. |
| 5,987,440 | A | 11/1999 | O'Neil et al. |
| 6,000,033 | A | 12/1999 | Kelley et al. |
| 6,006,333 | A | 12/1999 | Nielsen |
| 6,038,597 | A | 3/2000 | Van Wyngarden |
| 6,044,362 | A | 3/2000 | Neely |
| 6,049,786 | A | 4/2000 | Smorodinsky |
| 6,052,671 | A * | 4/2000 | Crooks et al. .................. 705/34 |
| 6,052,730 | A | 4/2000 | Felciano et al. |
| 6,055,567 | A | 4/2000 | Ganesan et al. |
| 6,070,150 | A | 5/2000 | Remington et al. |
| 6,085,191 | A | 7/2000 | Fisher et al. |
| 6,128,603 | A | 10/2000 | Dent et al. |
| 6,173,272 | B1 | 1/2001 | Thomas et al. |
| 6,178,511 | B1 | 1/2001 | Cohen et al. |
| 6,182,052 | B1 | 1/2001 | Fulton et al. |
| 6,199,077 | B1 * | 3/2001 | Inala et al. ................. 715/501.1 |
| 6,223,168 | B1 * | 4/2001 | McGurl et al. .................. 705/40 |
| 6,253,203 | B1 | 6/2001 | O'Flaherty et al. |
| 6,275,824 | B1 | 8/2001 | O'Flaherty et al. |
| 6,289,322 | B1 | 9/2001 | Kitchen et al. |
| 6,292,789 | B1 | 9/2001 | Schutzer |
| 6,327,577 | B1 | 12/2001 | Garrison et al. |
| 6,334,116 | B1 * | 12/2001 | Ganesan et al. ............... 705/34 |
| 6,363,362 | B1 | 3/2002 | Burfield et al. |
| 6,381,584 | B1 | 4/2002 | Ogram |
| 6,393,407 | B1 | 5/2002 | Middleton, III et al. |
| 6,412,073 | B1 | 6/2002 | Rangan |
| 6,446,119 | B1 | 9/2002 | Olah et al. |
| 6,578,015 | B1 * | 6/2003 | Haseltine et al. ............... 705/34 |
| 2001/0002535 | A1 | 6/2001 | Liebig et al. |
| 2001/0037296 | A1 | 11/2001 | Ganesan et al. |
| 2001/0044776 | A1 | 11/2001 | Kight et al. |
| 2002/0002536 | A1 * | 1/2002 | Braco ............................ 705/40 |
| 2002/0010677 | A1 | 1/2002 | Kitchen et al. |
| 2002/0013768 | A1 | 1/2002 | Ganesan |
| 2002/0019808 | A1 * | 2/2002 | Sharma ......................... 705/40 |
| 2002/0019809 | A1 | 2/2002 | Kitchen et al. |
| 2002/0046165 | A1 | 4/2002 | Kitchen et al. |
| 2002/0046166 | A1 | 4/2002 | Kitchen et al. |
| 2002/0046167 | A1 | 4/2002 | Kitchen et al. |
| 2002/0046168 | A1 | 4/2002 | Kitchen et al. |
| 2002/0049672 | A1 | 4/2002 | Kitchen et al. |
| 2002/0052840 | A1 | 5/2002 | Kitchen et al. |
| 2002/0062282 | A1 | 5/2002 | Kight et al. |
| 2002/0065773 | A1 | 5/2002 | Kight et al. |
| 2002/0087427 | A1 | 7/2002 | Ganesan et al. |
| 2002/0087461 | A1 | 7/2002 | Ganesan et al. |
| 2002/0087465 | A1 | 7/2002 | Ganesan et al. |
| 2002/0087468 | A1 | 7/2002 | Ganesan et al. |
| 2002/0087469 | A1 | 7/2002 | Ganesan et al. |
| 2002/0087471 | A1 | 7/2002 | Ganesan et al. |
| 2002/0184144 | A1 * | 12/2002 | Byrd et al. ...................... 705/40 |
| 2002/0194125 | A1 | 12/2002 | Shimada |
| 2003/0004874 | A1 * | 1/2003 | Ludwig et al. ................. 705/40 |

FOREIGN PATENT DOCUMENTS

| | | |
|---|---|---|
| EP | 1043668 A2 | 10/2000 |
| EP | 1049056 A2 | 11/2000 |
| EP | 1052603 A2 | 11/2000 |
| EP | 1083532 A2 | 3/2001 |
| EP | 1091330 A2 | 4/2001 |
| EP | 1111559 A2 | 6/2001 |
| EP | 1136922 A1 | 9/2001 |
| EP | 1136923 A1 | 9/2001 |
| EP | 1136924 A1 | 9/2001 |
| GB | 2294566 A | 5/1996 |
| WO | WO 99/18529 | 4/1999 |
| WO | WO99/42944 | 8/1999 |
| WO | WO00/48085 | 8/2000 |
| WO | WO0152142 A2 | 7/2001 |
| WO | WO0152142 A3 | 7/2001 |
| WO | WO01/77938 | 10/2001 |
| WO | WO0186558 | 11/2001 |
| WO | WO 02/14985 | 2/2002 |

OTHER PUBLICATIONS

Sharon Osberg, "Wells Fargo: Standards-Based Electronic Bill Presentment and Payment (EBPP)". Nov. 1999, XP-002192923.

Council for Electronic Billing and Payment, Business-to-Business EIPP: Presentment Models and Payment Options, Part One: Presentment Models, Jan. 2001, National Automated Clearing House Association, Herndon, VA.

Council for Electronic Billing and Payment, Business-to-Business EIPP: Presentment Models and Payment Options, Part Two: Payment Options. Jan. 2001, National Automated Clearing House Association, Herndon, VA.

Arald Jean-Charles and Suhas D. Joshi, Architectural Choices for OSS Integration, eAI Journal, Sep. 2001, pp. 59-63.

Interoperabill Initiative of the Banking Industry Technology Secretariat (BITS), Electronic Bill Presentment and Payment (EBPP) Business Practices. May 9, 2000, Edition 2.1, Draft for Comment, Council for Electronic Billing and Payment of the National Automated Clearing House Association (NACHA).

Business Practices Task Force of NACHA's Council for Electronic Billing and Payment: An Overview of Electronic Bill Presentment and Payment Operating Models: Process, Roles, Communications, and Transaction Flows, Apr. 9, 1999.

Pricewaterhousecoopers, Electronic Bill Presentment and Payment: A Primer, Zurich-Oerlikon.

James S. Diggs, Electronic Commerce and the Document: An Old Lexicon Re-Energized, Xploration Spring, 1997, pp. 26-29.

Netdelivery Corporation, EDM: Electronic Delivery Management: The Delivery Service for Electronic Commerce, Boulder, CO.

Robert Landry, Ian Rubin, Richard Bell, Retail Banking Delivery Technology: Channels in Transition, Financial Services Technology Conference, Apr. 27-28, 1998, The Tower Group, Newton, MA.

Robert Landry, Forecasting How U.S. Delivery Channels Will Play Out, FutureBanker, Aug. 1997, pp. 46-49.

Gary B., Meshell, A Perspective on Electronic Commerce and Payments, Price Waterhouse.

No Author Name Given, Visa-Home Banking & Bill Payment Solution. Visa Interactive.

No Author Name Given, Paysense: The Way Payments Will Be, Trisense Software, Ltd., Burnsville, MN.

Killen & Associates, Electronic Bill Presentment and Payments: Markets, Framework and Suppliers, vol. 1 of a 3 Study Set, Palo Alto. CA.

Thomas P. Vartanian, Future Banking: Reinventing the Bank As an Idea Factory, American Banker, Aug. 19, 1996.

Thomas P. Vartanian, Future Banking: Key Question for Emerging Systems: Where is the Money? American Banker, Jun. 17, 1996.

Charles G. Moody, III, From the Publisher. Outsourcing, American Waste Digest, Jul. 1998, p. 9.

No Author Name Given, Everyone's Knocking on Home Banking's Door, Business Week, Sep. 24, 2001.

No Author Name Given, Bill Gates is Rattling the Teller's Window. Business Week, Sep. 24, 2001.

No Author Name Given, Call it E-Money Management. Business Week. Sep. 24, 2001.

The Advisory Board Company, A Proposition Beyond Rescue: The Pure Play Advantage, 1998, pp. 41-72.

The Advisory Board Company, Chapter III: Creating New Payments Businesses, 1996. pp. 283-298.

The Advisory Board Company, VI: Creating New Payments Businesses, 1996, pp. 113-146.

ASC X12 Finance Subcommittee, Models for Consumer Billing and Payment Systems. Jun. 1995, Technical Report Type 2.

ASC X12 Finance Subcommittee, Models for Consumer Billing and Payment Systems, Oct. 1995, Technical Report Type II.

Michael C. McChesney. Banking in Cyberspace: an investment in itself, Banking/Investing, IEEE Spectrum, Feb. 1997, pp. 54-63.

No Author Name Given, Online Banking Report. Home Banking Partners, Issue 32, Dec. 1997.

Chip Wickenden, CCM, The Next Wave, Consumer EDI.

Just in Time Solutions, AT&T and Intuit. Open Internet Billing: White Paper. Jun. 1998.

David Lamm, The Effect of the Internet on Payment Processing, The Association for Work Process Improvement, Apr. 27, 1999, Boston, MA.

Leslie Thwaits, The Check's on the Net: CheckFree is Making Electronic Commerce Hassle Free, SourceBook, Apr. 1999, pp. 17-20, The Reddy Corporation International.

ASC X12 Finance Subcommittee. Reference Model for Addressing Financial Transactions, Technical Report Type 2, Jun. 1996.

VISA, Consumer Electronic Invoice Presentment: Not Your Everday EDI. StertConf.

ASC X12 Finance Subcommittee, Consumer Service Provider Billing & Payment System Work Group. Meeting Notes from Jun. 1995 X12F Trimester Meeting, Sep. 1995.

VISA, Bill Interest in Electronic Remittance, Bill Payment Council Meeting, Oct. 17, 1994, Methesda, MD.

ASC X12 Finance Subcommittee. Models for Payment Systems, Technical Report Type 2, ASC X12 Procedures Review Board, Feb. 1995.

Richard K. Crone, Screen Scraping: The Monster IBPP Wave You Absolutely Must Catch, IBPP Strategies and Trends, Dove Consulting.

Richard K. Crone, Unlocking Treasures Untold: The Revenue Generating Power of IBPP and Anonymous Profile Marketing. Dove Consulting.

A. Litan, The Consumer E-Billing Hype Cycle. Research Note. Dec. 19, 2000, GartnerGroup.

A. Litan, Consumer E-Billing Shakeout the Dust Starts to Settle, Research Note Oct. 3, 2000, GartnerGroup.

K. Kerr and A. Litan, Trends in Bsuiness-to-Consumer Electronic Bill Presentment and Payment, Context Overview Report, Aug. 25, 2000, GartnerGroup.

A Litan, Consumer E-Bill Payment: Built, but When Will They Come? Research Note, Feb. 18, 2000, GartnerGroup.

A. Litan, Three Banks Enter E-Billing Race with Post Office Model, Research Note, Jul. 15, 1999, GartnerGroup.

A. Litan, Future Bill Distribution: Internet Post Office Model, Research Note, Apr. 9, 1999, GartnerGroup.

Gaston Hummel, EBPP, Group 1 Software Europe, Ltd., Sep. 11, 2001.

Nicolette Lemmon, David Gourley and James Ward, Member Acceptance of Electronic Access Systems: Innovators versus Laggards, Center for Credit Union Research, University of Wisconsin-Madison School of Business and the Filene Research Institute, 1999.

Billserv, EBPP White Paper.

David B. Humphrey, Ph.D., Prospective Changes in Payment Systems: Implications for Credit Unions, Florida State University, Center for Credit Union Research, University of Wisconsin-Madison School of Business and the Filene Research Institute, 1997.

Jody Cornish and Octavio Marenzi, Scan and Pay Services: The Future of Electronic Bill Presentment, Celent Communications, May 2000. Cambridge, MA.

Jody Cornish, Octavio Marenzi and Sang Lee, Banks and Electronic Bill Presentment: A Survey, Celent Communications, Apr. 2000, Cambridge, MA.

Avolent, Using BizCast to Capture ROI and Automate the Invoice-to-Pay Process, Avolent B2B White Paper. 2001, pp. 20-28.

Avolent, The Return on Investment of EIPP, Avolent B2B White Paper, pp. 14-19.

Avolent, Market Evolution for EIPP, Avolent B2B White Paper, pp. 10-13.

Greg Sward and Brian Valente, Successfully Automating the Invoice-to-Pay Process, Avolent B2B White Paper, Feb. 2001. pp. 1-9.

Osberg, Sharon. "Wells Fargo: Standards-based electronic bill presentment and payment (EBPP)" Council for Electronic Billing and Payment, Nov. 1999, XP002192923.

Linthicum, D., "B2B Application Integration", Aug. 2001, Addison-Wesley, USA. XP002292995, pp. 97-102.

Cuan Coulter, "E-Business Account Aggregation" 'Online! Dec. 31, 2001, XP002293218, pp. 35-36.

Hilton, Andrew, "What the IT Revolution can do to Economics and Finance", 'Online! Oct. 24, 2001, XP002293219, p. 7, paragraph 2.

* cited by examiner

FIG. 7

| Schedule 210 | | | |
|---|---|---|---|
| date 214 | biller info 216 | cust. info 218 | access info 220 |
| X | XX | XXX | XXXX |
| X | XX | XXX | XXXX |

212

Per-date and biller schedule for bot execution 222

| cust. info 218 | access info 220 |
|---|---|
| | |

Statement

232 — 
Name: John Doe  Minimum Amount Due: $20.00
Account Number: XXXX- XXXX- XXXX- XXXX  Payment Due Date*: 10/10/2001
Statement/Closing Date: 09/20/2001

*Payment must be received by 1:00pm local time on 10/10/2001

244 —

| Total Credit Line | Available Credit Line | Cash Advance Limit | Available Cash Limit | New Balance |
|---|---|---|---|---|
| $10,500 | $9,886 | $5,300 | $5,300 | $613.57 |

| Amount Over Credit Line | Past Due | Purch/Adv Minimum Due | Minimum Amount Due |
|---|---|---|---|
| 248  250  252  $0.00 | $0.00 | 253   $20.00 | $20.00  254 |

246 —

Account Activity

| Sale Date | Post Date | Reference Number | Activity since Last Statement | Amount |
|---|---|---|---|---|
| 09/11 | 09/11 | R4394726 | ELECTRONIC PAYMENT-THANK YOU | -324.03 |
| 08/30 | 08/30 | LJRZM4XQ | EDDIE BAUER 0433 NEW YORK NY | -29.39 |
| 09/07 | 09/07 | 79ZSXP30 | LORD&TAYLOR BANDOLINO LAURENCEVILLE NJ | -59.00 |
| 08/22 | 08/22 | BMB*YZT6 | WILLIAMS-SONOMA M/O 800-5411262 CA | 98.06 |
| 08/24 | 08/24 | J9KSY6KJ | VICTORIAS SECR00011007 NEW YORK NY | 142.00 |
| 08/29 | 08/29 | L19MMWD3 | MERCURY BAR NEW YORK NY | 39.00 |
| 08/30 | 08/30 | J58SY6KJ | VICTORIAS SECR00011007 NEW YORK NY | 90.50 |
| 09/04 | 09/04 | BFCL1F00 | T#104 NY PENN STATION NEW YORK NY | 171.00 |
| 09/09 | 09/09 | KTTZ266S | TOTO DRY CLEANERS EDISON NJ | 46.80 |
| 09/10 | 09/10 | DK03L144 | PHILLIPS CLUB NEW YORK NY | 94.60 |
| 09/12 | 09/12 | CL01ST30 | MTA VENDING MACHINE SA 212-METROCARD NY | 20.00 |

277

*Transaction details are available by clicking on the dollar amount for the transaction. — 256

260 —

Statement Messages

Sign up for All-Electronic today.
  278  You'll get your statement online and pay your bill
  electronically, too. No more paper statements...or checks.
  We'll notify you by email when your statement is ready
  each month.

258 —

Account Summary 264

| | Previous Balance | (+) Purchases & Advances | (-) Payments & Credits | (+) FINANCE CHARGE | (=) New Balance |
|---|---|---|---|---|---|
| PURCHASES | $324.03 | $701.96 | $412.42 | $0.00 | $613.57 |
| ADVANCES | $0.00 | $0.00 | $0.00 | $0.00 | $0.00 |
| TOTAL  264 | $324.03 | $701.96 | $412.42 | $0.00 | $613.57 |

266  262

Rate Summary  Days This Billing Period: 030

| | Balance Subject to Finance Charge | Periodic Rate | Nominal APR | ANNUAL PERCENTAGE RATE |
|---|---|---|---|---|
| PURCHASES | | | | |
| Standard Purch | $0.00 | 0.02918%(D) | 10.650% | 10.650% |
| ADVANCES | $0.00 | 0.05477%(D) | 19.990% | 19.990% |

Your Citibank Card Services Statement

| | |
|---|---|
| Name: John Doe | Minimum Amount Due: $20.00 |
| Account Number: XXXX- XXXX- XXXX- XXXX | Payment Due Date*: 10/10/2001 |
| Statement/Closing Date: 09/20/2001 | |

*Payment must be received by 1:00pm local time on 10/10/2001

| Total Credit Limit | Available Credit | Cash Advance Limit | Available Cash Limit | New Balance |
|---|---|---|---|---|
| $10,500 | $9,886 | $5,300 | $5,300 | $613.57 |

| Amount Over Credit Limit | Past Due | Past Due Minimum Due | Minimum Amount Due |
|---|---|---|---|
| $0.00 | $0.00 | $20.00 | $20.00 |

Account Activity

| Sale Date | Post Date | Reference Number | Activity since Last Statement | Amount |
|---|---|---|---|---|
| 09/11 | 09/11 | R4394726 | ELECTRONIC PAYMENT-THANK YOU | -324.03 |
| 08/30 | 08/30 | LJRZM4XQ | EDDIE BAUER 0433 NEW YORK NY | -29.39 |
| 09/07 | 09/07 | 79ZSXP30 | LORD&TAYLOR BANDOLINO LAURENCEVILLE NJ | -59.00 |
| 08/22 | 08/22 | BMB*YZT6 | WILLIAMS-SONOMA M/O 800-5411262 CA | 98.06 |
| 08/24 | 08/24 | J9KSY6KJ | VICTORIAS SECR00011007 NEW YORK NY | 142.00 |
| 08/29 | 08/29 | L19MMWD3 | MERCURY BAR NEW YORK NY | 39.00 |
| 08/30 | 08/30 | J58SY6KJ | VICTORIAS SECR00011007 NEW YORK NY | 90.50 |
| 09/04 | 09/04 | BFCL1F00 | T#104 NY PENN STATION NEW YORK NY | 171.00 |
| 09/09 | 09/09 | KTTZ266S | TOTO DRY CLEANERS EDISON NJ | 46.80 |
| 09/10 | 09/10 | DK03L144 | PHILLIPS CLUB NEW YORK NY | 94.60 |
| 09/12 | 09/12 | CL01ST30 | MTA VENDING MACHINE SA 212-METROCARD NY | 20.00 |

Statement Messages

Sign up for All-Electronic today.
You'll get your statement online and pay your bill
electronically, too. No more paper statements...or checks.
We'll notify you by email when your statement is ready
each month.

Account Summary

| | Previous Balance | (+) Purchases & Advances | (-) Payments & Credits | (+) FINANCE CHARGE | (=) New Balance |
|---|---|---|---|---|---|
| PURCHASES | $324.03 | $701.96 | $412.42 | $0.00 | $613.57 |
| ADVANCES | $0.00 | $0.00 | $0.00 | $0.00 | $0.00 |
| TOTAL | $324.03 | $701.96 | $412.42 | $0.00 | $613.57 |

Rate Summary — Days This Billing Period: 030

| | Balance Subject to Finance Charge | Periodic Rate | Nominal APR | ANNUAL PERCENTAGE RATE |
|---|---|---|---|---|
| PURCHASES | | | | |
| Standard Purch | $0.00 | 0.02918%(D) | 10.650% | 10.650% |
| ADVANCES | $0.00 | 0.05477%(D) | 19.990% | 19.990% |

290 {
```
<html>
<head>
<title>Cardmember Central Account Online - Statement Transactions </title>
<link rel='stylesheet' href='/CB/styles/citi_iestyle.css' type='text/css'>
<SCRIPT Language=Javascript>
function popUp(pPage,winOpts)              294
{
        if (popUpWin!=null)
        {
                popUpWin.close();
        }
        var options = 'resizable=no,scrollbars=yes,menubar=no,toolbar=no' + winOpts;
        var popUpWin = window.open(pPage,'popWin',options); popUpWin.focus();
}
</SCRIPT>
</head>
<body bgcolor=#ffffff marginheight=0 marginwidth=0 topmargin=0 leftmargin=0>
<div id="maincontents">
        <table width=770 cellspacing=0 cellpadding=0 border=0>
        <tr>
                <td valign=top align=left width=23>                  296
                        <img src="/scrapedu/20010921/32/Shared_files/-
1288661497arr_sec.gif" width=23
                                height=19 border=0>
                </td>
                <td valign=top align=left>
                        <!--------- main contents ---------->
                        <span class=pageheading>Statement</span><br><br>
```

292 {
```
<html>
<head>
<title>Cardmember Central Account Online - Statement Transactions</title>
<link rel='stylesheet' href='/scrapedu/20010921/32/Shared.files/citi_iestyle.css' type='text/css'>
<SCRIPT Language=Javascript>
        function popUp(pPage,winOpts)
        {                                          298
                if (popUpWin!=null)
                {
                        popUpWin.close();
                }                  var options =
'resizable=no,scrollbars=yes,menubar=no,toolbar=no' + winOpts;
                var popUpWin = window.open(pPage,'popWin',options);
                popUpWin.focus();
        }
</SCRIPT>
</head>
<BODY>                                                 302
<div align=center>
<b><FONT FACE="Arial" COLOR="DarkBlue" SIZE="4">Your Citibank Card Services
Statement<br></FONT></b><br>
<div id="maincontents">
        <table width=770 cellspacing=0 cellpadding=0 border=0>
        <tr>
                <td valign=top align=left width=23></td>       300
                <td valign=top align=left>
                        <!--------- main contents ---------->
                                <br><br>
```

```
             ┌ <TR>
             │   ┌ <TD VALIGN=TOP ALIGN=LEFT>
             │   │     09/12
         314 ┤   │ </TD>
             │   │ <TD VALIGN=TOP ALIGN=LEFT>
             │   │     09/12
             │   └ </TD>
             │     <TD VALIGN=TOP ALIGN=LEFT>
             │         CL01ST30
             │     </TD>
             │   ┌ <TD VALIGN=TOP ALIGN=LEFT>
             │   │     MTA VENDING MACHINE SA 212-METROCARD NY
             │   │ </TD>
             │   │ <TD VALIGN=TOP ALIGN=RIGHT>
             │   │     <A HREF="/CB/amount.jsp?
             │   │ POSTING_DATE=
             │   │ 09%2F12%2F2001
             │   │ &SALE_DATE=
             │   │ 09%2F12%2F2001          ⎫ 318
             │   │ &TRANSACTION_TYPE_TEXT=
             │   │ PURCHASE++
     310 ┤   │   │ &REFERENCE_NUMBER=
             │   │ CL01ST30
             │   │ &PERSON_NAME=
             │   │ DONNA+JAMISON
             │   │ &TRANSACTION_AMOUNT=
         316 ┤   │ 20.00
             │   │ &FOREIGN_CURRENCY=                                    ⎫
             │   │                                                       │
             │   │ &MERCHANT_DESCRIPTION=                                │
             │   │ MTA+VENDING+MACHINE+SA+212-METROCARD+NY+              │
             │   │ &SIC_DESCRIPTION=                                     │
             │   │ LOCAL%2FSUBURBAN+COMMUTER+PASSENGER+TRANS+            ├ 320
             │   │ &STATEMENT_DATE=                                      │
             │   │ 09%2F20%2F2001"                                       │
             │   │     ONMOUSEOVER="window.status='See about this transaction';
             │   │     return true"
             │   │     ONMOUSEOUT="window.status='';
             │   │     return true"
             │   │     TARGET="DETAIL">
             │   │         20.00
             │   │     </A>
             │   └ </TD>
             └ </TR>
             ┌ <TR>   <TD VALIGN=TOP ALIGN=LEFT>
             │            09/12
             │        </TD>
             │        <TD VALIGN=TOP ALIGN=LEFT>      FIG. 11
             │            09/12
             │        </TD>
             │        <TD VALIGN=TOP ALIGN=LEFT>
         312 ┤            CL01ST30
             │        </TD>
             │        <TD VALIGN=TOP ALIGN=LEFT>
             │            MTA VENDING MACHINE SA 212-METROCARD NY
             │        </TD>
             │        <TD VALIGN=TOP ALIGN=RIGHT>
             │            20.00
             │        </TD>
             └ </TR>
```

FIG. 11

SYSTEM AND METHOD FOR OBTAINING CUSTOMER BILL INFORMATION AND FACILITATING BILL PAYMENT AT BILLER WEBSITES

IDENTIFICATION OF RELATED APPLICATIONS

This patent application is a continuation-in-part of U.S. patent application Ser. No. 09/999,311, filed on Nov. 1, 2001, entitled "Electronic Bill Presentment And Payment System That Obtains User Bill Information From Biller Website," which is assigned to the assignee of the present invention. The disclosure of the above-referenced patent application is hereby incorporated herein by reference.

BACKGROUND OF THE INVENTION

Field of the Invention

The present invention relates generally to electronic bill presentment and payment ("EBPP") systems and more particularly to EBPP systems that obtains bills for customers (which include individuals, businesses, and organizations) and allow payments including payments by credit card to be processed at the biller websites on behalf of customers.

EBPP and its predecessors have been in development for nearly twenty years, dating back to the advent of Electronic Data Interchange ("EDI") and private corporate networks. EBPP is a process that enables bills to be created, delivered, and paid over the Internet. EBPP has applications for many industries, from financial service providers to telecommunications and utilities companies.

EBPP has evolved swiftly in the past several years, moving away from the necessity of a merchant, a service provider, or a creditor sending hard copy bills to customers. However, EBPP systems have not gained widespread acceptance for several reasons. One reason is that most customers are accustomed to receiving bills in hard copy form and paying the bills by check. Making payments through a bill payment service is far removed from making payment directly to the company that provided the customer with the goods and/or services. In this regard, most bill payment service bureaus are administered by financial service providers, credit card companies, and banks, acting as agents for merchants, service providers, or creditors.

Although buying products over the Internet with a credit card has become a common occurrence, viewing bills and making payments to settle the bills electronically has not. Many EBPP solution providers assumed that billers would change their billing procedures to provide electronic bills that would be presented through a customer-oriented bill presentment service provider. That has not happened as quickly as originally anticipated.

In contrast, many billers, using a direct model of EBPP, are maintaining their own websites (or using a third party to host such websites) to allow their customers to access current bill statements. These websites provide the customer with "electronic bills," albeit in the form of information contained in HTML pages rather than in a standard electronic bill format. Many billers prefer the direct model of EBPP because the direct model allows billers to directly authenticate their customers by asking authenticating questions, such as private information that a customer has disclosed to the biller in the application process (e.g., social security number or date of birth) or shared secrets between the biller and the consumer (e.g., the 3-digit security code located on the back of certain credit cards). Privacy regulations preclude certain billers (e.g., financial institutions) from sharing private information with third parties such as consolidators, leaving billers little choice but to present bills using the biller direct model.

Another EBPP approach uses the consolidator model where bills from multiple billers are delivered to a single website, to be presented in aggregate to the customer for viewing and payment. However, this approach has its own obstacles because of the complexity of billing systems and processes used by billers, competing banks, and financial institutions. In addition, some billers have resisted implementing EBPP through a consolidator model for fear of being unable to cross-promote other services to their customers. Others, such as banks, have resisted for fear of losing out on lucrative cash management services. Furthermore, disputes over adopting uniform security and implementation standards also have stalled the adoption of EBPP.

Thus, there remains a need for aggregating the bills of the customer regardless of the implementation standards of individual websites, EBPP Models, or EBPP solutions. More particularly, there remains a need for a way to obtain the HTML forms of the electronic bills from the biller websites, extracting an image of the bill and segments of bill data from the HTML forms, and adding the bill data to the EBPP system's bill databases. In addition, there remains a need to provide more payment options to settle bills and therefore make bill settlements as intuitive as buying products on the Internet with a credit card.

One method of obtaining data from the HTML pages requires the "scraping" of data from HTML pages. A customer typically receives billing data via HTML pages or the like. The customer's web browser interprets the HTML page to produce the display that appears on the customer's display device. The HTML page is made up of a sequence of elements that may be nested. The element has the form:

<html_tag> element content </html_tag>

The tags determine how the browser displays the content of the element. The tags' meanings are defined in the HTML standard.

As is apparent from the foregoing description of an HTML page, if one knows the location of an element in the HTML page, one can go to that location in the HTML page and read the content of the element. Further, a program can be written that will do the same thing. The technique of using a program to locate an element on an HTML page and read that element's content is termed "screen scraping." The program that does the screen scraping is specific to the HTML page or pages from which the content is being read.

One example of the use of screen scraping is the SmartBalance feature found in the Paytrust bill management system operated by the assignee of the present invention (Paytrust and SmartBalance being trademarks owned by the assignee of the present invention). The SmartBalance feature provides customers with their bank balances, taking into account the bills that the customer has selected for payment. The SmartBalance feature takes advantage of the fact that many financial institutions now have websites where their customers can securely access their account balances. The interactive display of the Paytrust system which displays the lists of bills and payments includes a button that takes the customer to a page of banks. The page includes a list of banks for which the Paytrust system has developed scraping programs to read the banks' account balance web pages. The SmartBalance feature works only with these banks.

When a Paytrust customer enters his or her user identification and clicks on a login button, the Paytrust system acts as a proxy for the Paytrust customer. The Paytrust system employs the customer's user identification to access the customer's account balance information at the financial institution's website, scrapes the HTML page on which the balance information occurs, and returns the scraped data to the Paytrust system. The scraped data includes the time and date that the account balance on the website was last updated and the balance amount. Using this information, the Paytrust system then computes a current balance by subtracting from the account balance the amounts of bills paid using Paytrust since the last time the account balance was updated. Finally, the Paytrust system displays the current balance to the customer.

Another use of screen scraping is aggregation of account balances for all of a user's accounts at a single site. Yodlee.com, Inc, of Sunnyvale, Calif. is a provider of one such service, called My Yodlee. Techniques used in the My Yodlee service are further the subject of U.S. Pat. No. 6,199,077, to Inala, et al.

The My Yodlee service aggregates account information from a large number of financial institutions. When a user wishes to use the My Yodlee service, the user provides the service with account identification and user identification information for each of the accounts the balances of which the user wants to appear on the web page that My Yodlee service provides to the user. The My Yodlee service includes a software agent, familiarly termed a bot, for each of the financial institutions from which the My Yodlee service aggregates account information. (A bot, which is short for robot, is a small and focused computer application that runs continuously in the background and responds automatically to a user's activity.) The My Yodlee bots do the scraping on the HTML's provided by the financial institutions' websites.

A bot for each financial institution is run periodically. On each run, the bot has the user identification information for all of the users for which the My Yodlee service is aggregating account information from that financial institution. The bot uses the user identification information to access the web page for each user on the list, scrapes the account balance information from the web page, and returns it to the My Yodlee's website service, which stores the account balance in a database under the user's name. When the user wishes to see his or her account balances, the My Yodlee service creates a web page for the user upon which the balances currently listed in the database for the user are displayed.

The techniques of screen scraping may be employed generally to make an HTML page a source of "electronic data." The Paytrust system's SmartBalance feature shows how a system may use account and user identification information provided by a customer to gain access to a web page for purposes of screen scraping, and the My Yodlee service's software agents show how screen scraping may be done without direct user intervention. However, none of these techniques are applicable to the problem of integrating bill statement information that is available to a customer of an EBPP system at a biller website with the statement information that is available to the EBPP system from sources such as mailed paper bills or bills provided directly to the EBPP system in electronic form.

Another disadvantage of current EBPP systems is that too much customer action is required to pay a bill online. For example, online payment requires that the payor designate the recipient of the payment, supply the account number, the amount to be paid and the date that the payment is to be made, as well as the identity of the person making the payment. In addition, for credit card payment, the payor must enter the credit card number, the expiration date, and, in some instances, the type of credit card being used for making the payment. Moreover, payment by credit card may require the entry of customer information, such as the payor's name and home address. For direct payment, the payor must enter the bank routing number and the payor's account number. In addition, the biller may require customer information. In any case, several payment pages must be accessed and data entered on several pages at each biller website to complete a bill payment transaction.

In addition, a customer may forget to make the payment. As is well known, a late payment can result in late payment fees and other penalties. It is readily apparent that with current EBPP systems there is no practical way to make last minute payment of a bill, such as a forgotten mortgage payment, payment of an insurance premium, or a payment on an utility account, any or all of which could result in cancellation, late fees, and/or interest, for example. Thus, customers are generally not given the option of making payment using the convenience of a credit card or a debit card. In fact, if a service provider accepts a credit card payment for bills (i.e., to avoid late payment fees), not only is the service provider subject to credit card processing fees, but it may also be in violation of credit card association rules that prohibit one organization from accepting credit card payments for payment to another organization.

Succinctly, current customer-oriented EBPP solutions only allow customers to pay bills using a checking account at any bank. For the sake of clarity, a customer-oriented EBPP solution provides a means for a customer to log in to a centralized bill center website to view the bills that are awaiting payment and the bills that are already scheduled for payment, and facilitate the payment of these bills.

Therefore, there exists a need to incorporate credit card payment transactions into bill centers to enable a customer to use his or her credit card much like a checking account for bill payments made to a plurality of biller. Credit card bill payment will extend the buying power of customers, and will give them more flexibility in how their bills are paid.

In summary, although buying products over the Internet has become a common occurrence, viewing bills and making payments to settle bills electronically has not reached the same level of acceptance. Therefore, much like how credit card purchases have helped fuel the growth of the Internet, an improved credit card bill payment system for paying bills with credit cards would help increase the volume and exposure of EBPP. Credit card bill payments will increase the rate of making payments to settle bills electronically.

Accordingly, it is an objective of the present invention to provide an integrated EBPP system and a related method which can obtain statement information from a plurality of biller websites, as well as from other sources. It is the primary objective of the present invention to provide a technique for paying bills to any biller website that permits online payment of a bill by the EBPP system. It is a related objective of the present invention to enable customers to initiate credit card payments to any biller website that permits online payment of a bill using EBPP products.

It is another objective of the present invention to enable customers to schedule payments to billers from their bill center using a credit card. It is yet another objective of the present invention to enable a service provider to accept credit card payments for billers and to process those payments by submitting them to the billers' websites. It is further an objective of the present invention to provide a single online location for customers to use to initiate payments to biller direct websites.

The integrated EBPP system of the present invention must also be highly reliable and stable, and it should also provide the highest possible degree of security during its normal operation. In order to enhance the market appeal of the system of the present invention, it should also be inexpensive to implement to thereby afford it the broadest possible market. Finally, it is also an objective that all of the aforesaid advantages and objectives of the integrated EBPP system of the present invention be achieved without incurring any substantial relative disadvantage.

SUMMARY OF THE INVENTION

The disadvantages and limitations of the background art discussed above are overcome by the present invention. The present invention provides an integrated EBPP system and method which has two principal features: first, electronic presentment of bills from paper billers, electronic billers, and scrape-enabled billers; and second, electronic payment of bills using a plurality of payment options, including checking accounts, credit cards, debit cards, stored value cards (including gift cards), and smart cards.

The present invention is capable of presenting bills from paper billers, electronic billers, and biller websites. Bills from paper billers are accommodated by providing a scanning network for converting bills into electronic form, bills from electronic billers are accommodated by providing a network for receiving and/or conditioning bills for presentment, and bills from biller websites are received by enabling customers to input access information which they use to access biller websites. For customers not having such user access information to access the biller website for scraping, the integrated EBPP system enables the entry of necessary information to set up a user account at the biller website. The integrated EBPP system then uses the access information to make scheduled accesses to the biller website via the network, thereby obtaining customer bills which are displayed on the biller website and stored in the integrated EBPP system. The integrated EBPP system incorporates information from bills into the items of bill data that the system maintains for customers. The integrated EBPP system treats items of bill data that is obtained from the website in exactly the same way as the items of bill data the EBPP system obtains via other methods (e.g., paper bills and direct electronic form).

Another enhancement provided by the present invention is scheduling the biller website accesses according to the statement dates on the bills. The validity of items of bill data is checked, and the items are incorporated only if they are valid, with the system responding to invalid items of bill data by modifying how such items of bill data are read from the biller website. The integrated EBPP system also checks to determine whether there is already an item of bill data in corresponding to each item of bill data obtained from the website, in which case the particular item of bill data is not added to the integrated EBPP system.

The integrated EBPP system of the present invention also obtains biller bill display data associated with each item of bill data in a biller's website, and storing the bill display data so that the integrated EBPP system can properly display the biller bill display data. The integrated EBPP system of the present invention may modify the biller display data for display by the integrated EBPP system. Such modifications include adding information, replacing references in the biller display data to information in the biller website with references to information in the integrated EBPP system, and removing interactive elements. These techniques are applicable not only in the context of EBPP systems, but also generally to the problem of scraping information used to make a display from a website.

In the preferred embodiment, the present invention provides an EBPP system which includes a bill center for enabling a customer bill to be created, delivered, and paid over the Internet. The system includes an interface for the user to enter user identification information. Proxies are used to allow access to biller websites using user identification information, the proxies scraping the biller websites for a customer bill data and returning customer bill data from the biller websites to the bill center. The system uses an automated user ID and password module to facilitate online setup of a user account at the biller website for the user if the user does not have a user account with the biller website. A bill presentment component is used to present bills to users, and a bill payment component is used to enable users to initiate payment of bills.

The present invention allows the use of credit cards (or bankcards) on the Internet to facilitate payment of bills, and offers multiple payment options. The bill payment component enables the payment of a bill with a checking account, a debit card, a credit card, a stored value card, or any equivalent financial account or bankcard, such as a smart card. The credit card payment option includes a credit card payment bot for acquiring and using the user identification information to access the biller website to initiate credit card payment at the biller website.

The present invention also features advanced credit card payment capabilities in which customers can initiate credit card payments to a plurality of biller websites upon request of the customers to initiate payment, or though an automatic or recurring payment rule that customers have established with the integrated EBPP system of the present invention.

In the preferred embodiment, a bill payment system provided by the present invention employs the use of scraping strategies to incorporate credit card payment transactions. The bill payment system uses customer login information to initiate credit card payments at biller websites. In order to initiate credit card payments at biller websites, the bill payment system requires the customer credit card information for each credit card a customer will use to pay billers, and the customer's login information for biller websites.

In the preferred embodiment, the process of credit card bill payments using the present invention can be broken down into three parts. The first part is the setup of a customer credit card payment account, which may be done automatically if the credit card issuer provides the required information. This includes setting up the credit card payment account and the capture of the standard fields required by billers to initiate a credit card payment.

Preferably, credit card issuers provide credit card information for their cardholder accounts. Such cooperation from credit card issuers eliminates the need to enter credit card information on the credit card issuers' websites, and avoids the necessity for duplicate entry of account information by the customer. However, if a cardholder credit card information is unavailable from a credit card issuer, the present invention provides a process for setting up a credit payment account using a customer-initiated process.

The bill payment system of the present invention may also provide an automated user ID and password setup feature for setting up a user account at the biller website if the customer has not yet set up an account at the biller website. In the preferred embodiment, the bill payment system attempts to use the preferred user ID and password provided by the customer to create the user account at the biller website. If the preferred user ID and password provided by the customer are not valid or are unavailable at the biller website, the bill payment system may alter the user ID and randomly create a new password for the customer that meets the requirements of the biller for the biller website.

If, on the other hand, the customer already has a customer account setup at the biller website, the present invention provides a real-time access information and account information validator. For example, when the customer access information (e.g., user name and password) for accessing the biller website is supplied, a real-time validator is spawned to confirm that the account information provided by the customer is correct by performing a sample login at the biller website using the customer access information and confirming that the biller account corresponds with the account information provided by the customer (e.g., account number match).

The second part of the bill payment system is the setup of the billers for which the customer wishes to use his or her credit card account to make payments. In the preferred embodiment, the customer sets up the biller for credit card transactions at a centralized bill center equipped with credit card payment options in which the bill center captures the user ID and password needed to initiate the payments at biller websites.

The third part of the bill payment system is the process of scheduling and making the credit card bill payments, which includes scheduling the payments by the customer when the bills are received in the bill center. This process also includes initiating the payments at the biller websites by the credit card bill payment process and any messaging to the customer associated with successful, unsuccessful, or failed transactions. This third part also features a validation process that validates customer user ID's and passwords at biller websites, as well as the timing that the bill payment system of the present invention will use to schedule credit card bill payments.

In one aspect, credit card payment accounts may not be eligible to be made as default payment accounts for the customer's bill center account. Rather, checking accounts may be used as default payment accounts, especially in a "pay-any" EBPP system. For example, if a customer selects a payment rule that authorizes the bill payment system to make payments to any biller, a checking account will be required to handle payments to billers that do not accept credit card payments. In an embellishment, credit card payment accounts may be eligible to be set as the default payment accounts on a biller-by-biller basis or in a "pay-some" system in which the customer has selected a group of billers that accepts credit card payments. In addition, debit accounts or stored value cards may be used in addition to credit cards and checking accounts as the method of bill payment.

The credit card payment initiation process of the present invention may take place through a manual, automatic, or recurring payment. A bill received into the bill center may either be manually paid by the customer, or be paid using an automatic payment rule the customer has set up for the biller. Automatic payment may be triggered by the retrieval of the bill. For example, a customer can choose an automatic payment rule in which the customer authorizes the bill payment system to settle a bill in full (or partial) five days before the due date of the bill. Automatic payments are optimal for billers in which the amount due varies with each bill statement. In contrast, a recurring payment rule instructs the bill payment system to pay a certain amount at a fixed frequency (e.g., monthly). Recurring payments are optimal for bills (e.g., a home mortgage bill) with a predictable bill statement, meaning the amount due is constant.

The bill payment system of the present invention also features a payment validation process and a login verification process. These capabilities help to ensure that the bill payment system will be able to successfully process the customer's payments on the scheduled payment dates. The validation process is used to ensure that the payments are still properly set up for the bill center credit card payment process. The verification process not only helps to validate the customer's user ID and password, but will also helps to give advance warning of any biller website problems in advance of the payment initiation date.

In the preferred embodiment, if an error occurs that is related to the customer's user ID, password, or account number when initiating credit payment, the customer may be notified, for example via e-mail, that the bill center will be unable to initiate the scheduled credit card payment transaction. If an error occurs with the biller's website, then the bill center may try again, preferably the next day.

By offering multiple payment options, the present invention is also able to offer a "fail-proof" payment option in which the system allows the customer to designate one or more backup payment accounts in case an error (e.g., non-sufficient fund, website error, wrong access information, or over-limit credit card) occurs while attempting to settle the bill using the primary or default payment account.

In accordance with another aspect of the present invention, an independent bill payment system is provided which includes a user interface for enabling a customer to enter user access information and user credit card information for accessing a biller website and for initiating credit card payment at the biller website. A bot program uses the user access information to access the biller website, and uses the user credit card information to initiate credit card payment at the biller website. The credit payment system also includes a payment validation mechanism to ensure that a credit card bill payment will be successfully processed on a scheduled payment date, the payment validation mechanism ensuring that a bill payment is properly set up using the user interface. A login verification mechanism is used to validate a user ID and a user password, and is responsive to provide advance warning of a biller website problem in advance of the payment initiation date.

The integrated EBPP system of the present invention provides a method of using a credit card to settle bills on the Internet which sets up the biller's website by providing an interface for customers to enter user access information required to access the biller website. The interface allows customers to enter credit card information necessary to perform credit card transactions at biller websites, and makes it possible for the system to initiate credit payment at biller websites using the user access information and the credit card information.

The present invention also provides a method of providing electronic bill presentment and payment which includes automatically setting up user accounts at biller websites if a customer has not set up user accounts at the biller websites. By setting up billers to settle bills at the biller websites using an interface for customers to enter user access information required to access the biller websites, the system allows a customer to enter checking account information necessary to settle a bill with a checking account, and credit card information necessary to perform a credit card transaction at the biller website. By accessing biller websites using the user access information to scrape user bill data from the biller websites, current bill account balance may be computed based on the scraped user bill data from the biller websites and previous bill account balances and/or payments. Access to biller websites may be scheduled according to statement dates on user bill data, and credit payment may be initiated at biller websites using user access information and credit card information.

In the preferred embodiment, the credit card bill payment process and the scraping process to obtain bills for presentment and payment by the integrated EBPP system run independently of each other. The credit card bill payment component may be run at off-peak hours to ensure faster processing at the biller website when web traffic is low.

The bill payment system of the present invention uses bot technology to incorporate specific strategies for each biller. These strategies may be deployed on a main platform, and may be customized to each individual biller website. The strategies may also call up customer information from the bill center database needed to schedule payment transactions at biller websites on behalf of customers. All transactions will be logged to the bill center database, and will be used for notification and reporting purposes. Each successful transaction may generate an e-mail confirmation to the customer. Preferably, e-mail notifications are sent to customers on the date payments were successfully made at the biller website.

It may therefore be seen that the present invention teaches an integrated EBPP system and a related method which can obtain statement information from a plurality of scrape-enabled biller websites where user accounts are automatically set for customers, as well as from other sources. The integrated EBPP system of the present invention provides a technique for paying bills to any biller website that permits online payment of a bill by the EBPP system, setting up bill payment user accounts at biller websites for customers who do not have such accounts. The integrated EBPP system of the present invention enables customers to initiate credit card payments to any biller website that permits online payment of a bill using credit cards.

The integrated EBPP system of the present invention also enables customers to schedule payments to billers from their bill center using a credit card. The integrated EBPP system of the present invention enables a service provider to accept credit card payments for billers and to process those payments by submitting them to the billers' websites. The integrated EBPP system of the present invention provides a single online location for customers to use to initiate payments to biller direct websites.

The integrated EBPP system of the present invention is highly reliable and stable, and provides the highest possible degree of security during its normal operation. The system of the present invention is also inexpensive to implement to enhance its market appeal and to thereby afford it the broadest possible market. Finally, all of the aforesaid advantages and objectives of the integrated EBPP system of the present invention are achieved without incurring any substantial relative disadvantage.

DESCRIPTION OF THE DRAWINGS

These and other advantages of the present invention are best understood with reference to the drawings, in which:

FIG. 7 shows scheduling data for a bill bot contained in the integrated EBPP system illustrated in FIG. 1;

FIG. 8 shows a display made by a browser from an HTML page from the biller website;

FIG. 9 shows a display made by a browser from a cleaned HTML page from the biller website;

FIG. 10 shows portions of HTML code from the scraped HTML page illustrated in FIG. 8 and the cleaned HTML page illustrated in FIG. 9;

FIG. 11 shows additional portions of HTML from the scraped HTML page illustrated in FIG. 8 and the cleaned HTML page illustrated in FIG. 9;

DETAILED DESCRIPTION

Figure 1:
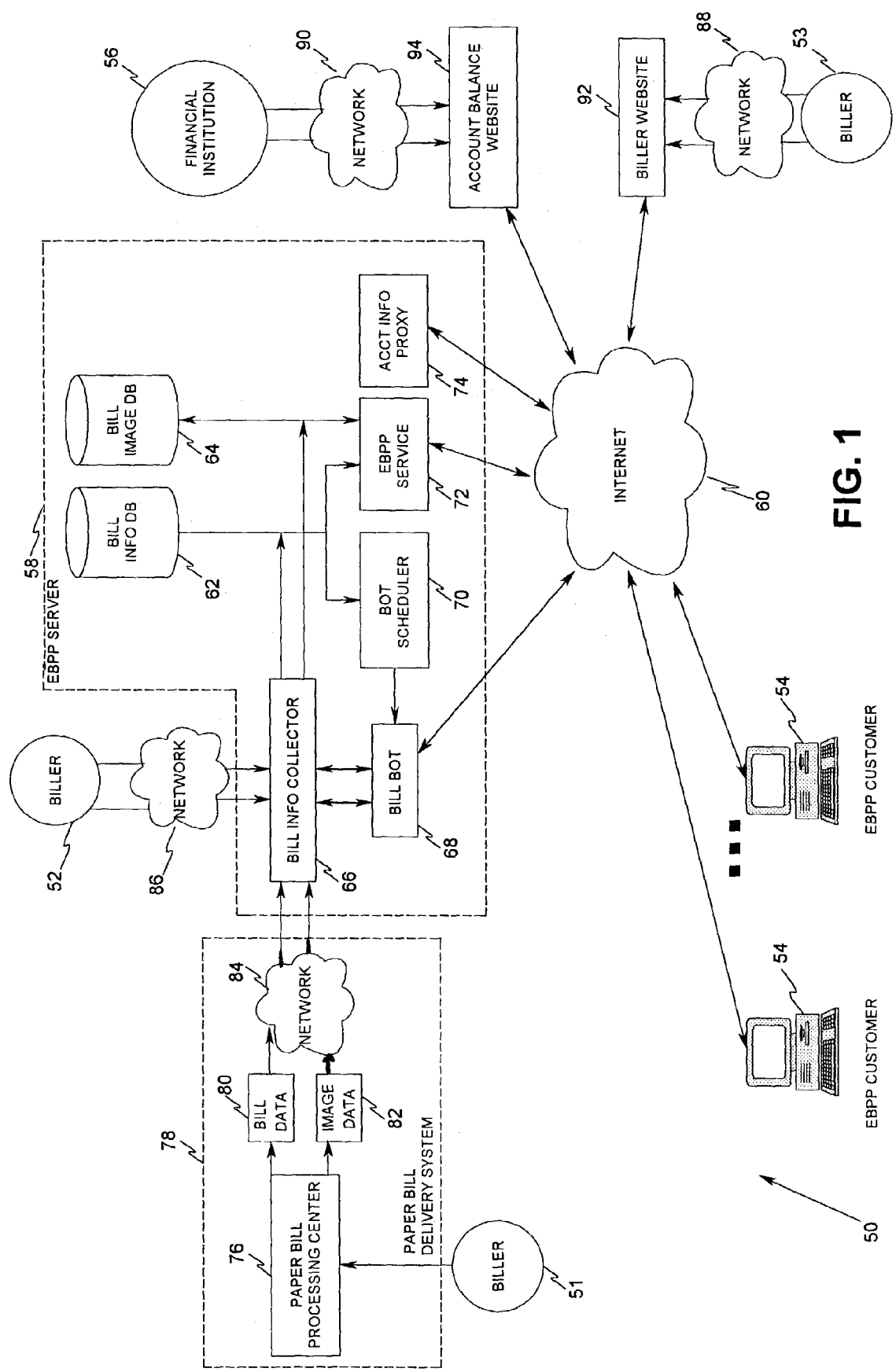
FIG. 1 is an block diagram showing an overview of the integrated EBPP system of the present invention.

The present invention provides a bill center which is capable of making payments on biller websites on behalf of customers, using customer financial accounts including credit card accounts. In the preferred embodiment, the bill payment system of the present invention is an integrated EBPP system in which the bill center also includes bill presentment. In this regard, the bill center interacts with a paper delivery network to collect and convert paper bills to electronic bills, an electronic delivery network to receive bills in electronic form, and an agent or bot program for "scraping" bill data from biller websites using a customer access information. The integration of these sources of customer bills enables the customer to log onto a centralized bill center, retrieve his/her bills, and have the bill center settle the bills on his/her behalf using a plurality of payment options.

With regard to scraping bill data, a customer of the integrated EBPP system of the present invention inputs his/her user access information used to access the biller website. The integrated EBPP system then uses the user access information to access the biller website on a scheduled basis, obtain the customer's bills from the biller website, and store the bill on the integrated EBPP system. The integrated EBPP system integrates information from the scraped bills, together with other data that it obtains for the customer via other methods (e.g., paper bills and direct electronic bills) into items of bill data that it maintains for the customer.

If the customer does not have the user access information necessary to access biller websites for scraping, the integrated EBPP system prompts the customer to enter information necessary to set up a user account at the biller website. Then using the customer-entered user account information, the integrated EBPP system sets up a user account at the biller website and scrapes the bills from the biller website for the customer.

With regard to payment options, the integrated EBPP system includes the bill payment component of the present invention to enable the payment of bills with a checking account (including by an electronic check), a debit card, a credit card, a stored value card, or any other financial account or bank card, including smart cards. The credit card payment option includes a credit card payment bot program which uses the user identification information to access the biller website to initiate credit card payment at the biller website. Credit card payments are used as an example in this description. However, debit cards and other financial accounts or cards could be used in a similar manner in the present invention.

The bill payment component of the present invention features a payment validation process and a login verification process which ensures that bill payments will be successfully processed on the scheduled payment date. The integrated bill payment component of the present invention also features multiple payment options in which the customer can preset a backup payment account, such as a credit card, if the default payment account, such as a checking account, fails to settle the bills.

The EBPP system and the bill payment system of the present invention may be integrated as one system, or they may be used separately in coordination with each other, or be totally independent of each other. In addition, the integrated EBPP system of the present invention or its bill payment system may also be integrated with other EBPP solutions.

The following detailed description will first present an overview of the integrated EBPP system in which the present invention is embodied. More specifically, the first portion of the detailed description (FIGS. 1 through 16) discloses the bill presentment features used in conjunction with the bill payment system of the present invention. An overview of the user interface for the integrated EBPP system with its features will be described, complete with details of the implementation of the scraping strategy to aggregate and scrape bills from a plurality of biller websites. In the second portion of the detailed description (FIGS. 17 through 28), the bill payment system of the present invention and bill payment options will be discussed, including an overview of the bill payment system and details of the processes used to obtain and pay bills.

Overview of the Integrated EBPP System—Bill Presentment

Electronic bill presentment enables a biller to use the Internet to send invoices, statements, and other financial information to the customer. Instead of sending paper bills through the mail, some billers enable their customers to get invoices over the Internet or through e-mail. Other EBPP service providers help facilitate the presentment of bills by receiving bills from billers and storing them in an electronic database of customer bills. Still other EBPP service providers recently have begun to use screen scraping methodology to collect bills for presentment to customers that subscribe to their services.

FIG. 1 is a high-level block diagram of an integrated EBPP system 50 which is embodied with an EBPP server 58 as the focal point. The integrated EBPP system 50 is shown in use with three billers 51, 52, and 53, although it will be appreciated that many more billers are actually accommodated by the integrated EBPP system 50. The integrated EBPP system 50 is also shown in use with other external components, such as multiple customer computers 54 and multiple financial institutions such as the exemplary financial institution 56. Customers using their customer computers 54 which are connected to the Internet 60 communicate with the EBPP server 58, which is also connected to the Internet 60. The customer computers 54 and the EBPP server 58 interact according to the well-known Hypertext Transfer Protocol ("HTTP"), which defines a set of rules for exchanging files (text, graphic images, sound, video, and other multimedia files) on the Internet 60. HTTP is an application protocol relative to the Transmission Control Protocol/Internet Protocol ("TCP/IP") suite of protocols that are the basis for information exchange on the Internet 60.

The integrated EBPP system 50 of the present invention may use other protocols such as the common protocol known as the Open Financial Exchange ("OFX") to allow billers to integrate their systems with the present invention. Interactive Financial Exchange ("IFX") protocol, a second competing standard, may also be implemented if desired. The IFX Forum, an organization that comprises financial institutions, billers, insurance companies and vendors, is currently developing IFX.

The EBPP server 58 is a website that is identified by an Internet address. When a customer who is operating a web browser on one of the EBPP customer computers 54 provides the server's Internet address to the web browser, the web browser sends a message to the EBPP server 58. The EBPP server 58 then responds with a Hypertext Markup Language ("HTML") page that the browser displays on a monitor of the EBPP customer computer 54. The customer can interact with the displayed HTML page. Because of the interaction, the browser returns information to the EBPP server 58, which processes the information and updates the browser display. The EBPP server 58 can also communicate with the browser using protocols such as Extensible Markup Language ("XML"), which provide a means for creating common formats and for sharing the format and data over the Internet 60.

The EBPP server 58 includes a bill information database 62 for storing bill information, a bill image database 64 for storing bill images, and a bill information collector 66 which is operatively connected to the bill image database 64 and to the bill image database 64. The bill information needed for the integrated EBPP system 50 to operate is contained primarily in the bill information database 62, which contains the non-image bill information, and the bill image database 64, which contains the HTML and any image information needed to provide the customer with a detailed view of a bill. A bill bot 68 is operatively connected to the bill information collector 66, and is operated by a bot scheduler 70, which is also connected to the bill information database 62. An EBPP service 72 obtains bill information from the bill information collector 66 and the bill image database 64, and sends this information to EBPP customer computer 54 via the Internet 60. The EBPP server 58 also includes an account information proxy 74, which is also connected to the Internet 60.

The bill information database 62 is a database of information about customer bills which is obtained from billers, including from the billers 51, 52 and 53. For example, the bill information database 62 can contain information about customer bills that may include, for each customer, information about individual bills that have not yet been paid, information about bills that the integrated EBPP system will automatically pay unless the customer indicates otherwise, and a history of the bills previously paid. Each item of bill information about an individual bill that has not yet been paid will be termed an "item of bill data" in the following discussion. An item of bill data typically includes the biller's account number, the statement date, the bill amount, the payment due date, minimum amount due, and/or total amount due. The bill image database 64 contains information such as images of bills or the HTML for bills.

The EBPP service 72 is a program that interacts with the customers' Internet browsers. The EBPP service 72 retrieves information stored in the bill information database 62 and the bill image database 64 to provide an HTML page which displays each bill corresponding to an item of bill data to the customer's browser.

The bill information collector 66 obtains bill information from billers, including the billers 51, 52, and 53, and stores the bill information in the bill database 62 and/or the bill image database 64. The bill information comes from billers in three forms: paper bills (shown coming from the biller 51 via a paper bill delivery system 78), electronic bills (shown coming from the biller 52 via a network 86, and bills scraped from a biller website 92, shown coming from the biller 53 via a network 88.

For paper bills, billers such as the biller 51 send the paper bill by mail to a paper bill processing center 76, which may be run as part of the integrated EBPP system 50. At the paper bill processing center 76, each bill is scanned to produce a digital image, and the digital image is read by optical character recognition ("OCR") software to obtain the item of bill data corresponding to the bill. Bill data 80 and image data 82 generated by the paper bill processing center 76 are then sent via a network 84 to the bill information collector 66, which provides the item of bill data 80 and the image data 82 to the bill information database 62 and the bill image database 64, respectively.

As an example of an electronic biller, the biller 52 is connected by a network 86 directly to the bill information collector 66, thereby providing electronic bills to the bill information collector 66, which in turn provides the items of bill data and images from the electronic bills to the bill information database 62 and the bill image database 64, respectively. With electronic billing, the electronic bills may also be contained in storage media (e.g., a diskette, a hard disk, a compact disk, a tape, or any other database) that the biller 52 provides to be loaded into the EBPP server 58. The bill information collector 66 processes the electronic bills on such storage media in the same fashion as it does electronic bills received via the network 84 and the network 86. In the preferred embodiment, the EBPP server 58 can receive bills in a plurality of formats from electronic billers such as the biller 52. In an embellishment, the EBPP server 58 conditions the incoming bills from biller 52 to convert the bills into a standard format.

For "scraped-enabled" billers, billers such as the exemplary biller 53 operate websites such at the biller website 92, which is connected to the Internet 60. The EBPP server 58 maintains a list of scrape-enabled billers such as the biller 53 for which the EBPP server 58 can obtain items of bill data from the biller websites such as the biller website 92 via the Internet 60. For each such scrape-enabled biller, the EBPP server 58 is able to read the HTML, XML, and/or other format (hereinafter collectively referred to as simply "HTML") provided by the biller website to obtain each item of bill data corresponding to a bill and to make a version of the HTML which the EBPP server 58 can use to display the bill on the customer's browser. The HTML required to display the bill and any images required for that HTML are stored in the bill image database 64. If the customer so specifies, the EBPP server 58 may obtain the customer's bills from one or more of the biller website 92.

An account information proxy 74 permits a customer of the integrated EBPP system 50 to obtain customer account balance information for accounts maintained for the customer by the financial institution 56 from the bank's account balance website 94 (via a network 90) while remaining in the integrated EBPP system 50. The integrated EBPP system 50 then combines the account balance information with information in the bill information database 62 about payments the customer has made to compute a current bank balance.

The EBPP server 58 may be implemented using several different computer systems integrated to provide the integrated EBPP system 50. In particular, the EBPP service 72, the account information proxy 74, and the bill information database 62 and the bill image database 64 may be implemented as one system while the bill bot 68, the bot scheduler 70, and the bill information collector 66 may be implemented as another system; both systems are integrated to provide the features exhibited by the EBPP server 58. Furthermore, a number of instances of the bill bot 68 may be executing simultaneously, either to fetch items of bill data from a plurality of biller websites or from a single biller website for multiple customers.

Figure 2:
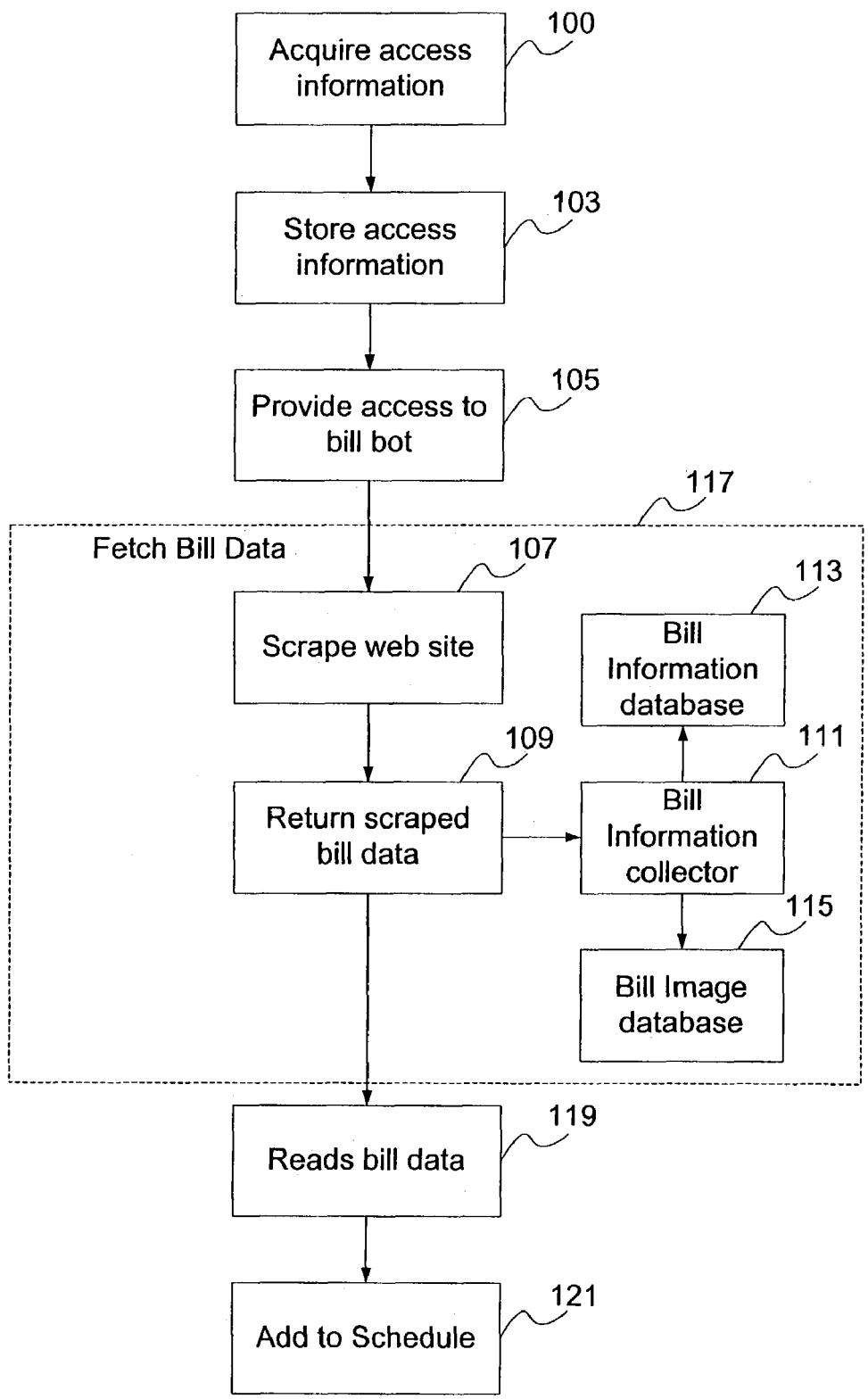
FIG. 2 is a flowchart showing the general operation of scraping capabilities provided by the system illustrated in FIG. 1.

Referring now to FIG. 2, there is shown a flowchart demonstrating the procedures used by the integrated EBPP system 50 illustrated in FIG. 1 to scrape bills from scraped-enabled billers such as the biller 53. Referencing FIGS. 1 and 2, to obtain the customer's bills from the biller website 92 (FIG. 1), the customer provides the EBPP server 58 (FIG. 1) with the information (hereinafter referred to as "customer access information") that the EBPP server 58 needs to access the customer's statement on the scrape-enabled biller website 92 in an acquire access information step 100. The EBPP service 72 (FIG. 1) stores the customer access information along with an identification of the biller in the customer's information in the bill information database 62 (FIG. 1) in a store access information step 103.

In a provide access to bill bot step 105, the EBPP service 72 (FIG. 1) thereupon provides the customer access information and the biller identification to a bill bot 68 (FIG. 1), which is a software agent that uses the biller identification and the customer access information to access the customer's web page on the biller website 92. The bill bot 68 then scrapes the item of bill data and the bill's HTML from the biller website 92 in a scrape web site step 107. The bill's statement date is also included in the scraped item of bill data. The bill bot 68 returns the scraped bill data in a return scraped bill data step 109. The bill bot 68 returns the bill's HTML to the bill information collector 66 (FIG. 1) in a collect bill information step 111, which provides the item of bill data to the bill information database 62 (FIG. 1) in a collect bill data step 113 and the HTML to the bill image database 64 (FIG. 1) at step 115.

After the first time an item of bill data has been fetched and processed (in the series of steps contained within the dashed box 117) from the biller website 92 for a customer, the bot scheduler 70 (FIG. 1) reads the bill's statement date and uses it to determine the biller's billing cycle for the customer in a read bill data step 119. In an add to schedule step 121, the bot scheduler 70 then adds the billing cycle information to the schedule the bot scheduler 70 maintains for the bill bot 68 for each of the scrape-enabled biller such as the biller 53. The schedule ensures that the bill bot 68 will collect an item of bill data for a given customer and biller shortly after the biller has posted a new statement for the customer.

The bot scheduler 70 helps to ensure that the bill bot 68 runs as scheduled for each scrape-enabled biller website. Each time the bill bot 68 runs, the bill bot 68 obtains items of bill data from the given biller for a list of customers and provides the items of bill data for the customers to bill information collector 66.

Customer Interface

Figure 3:
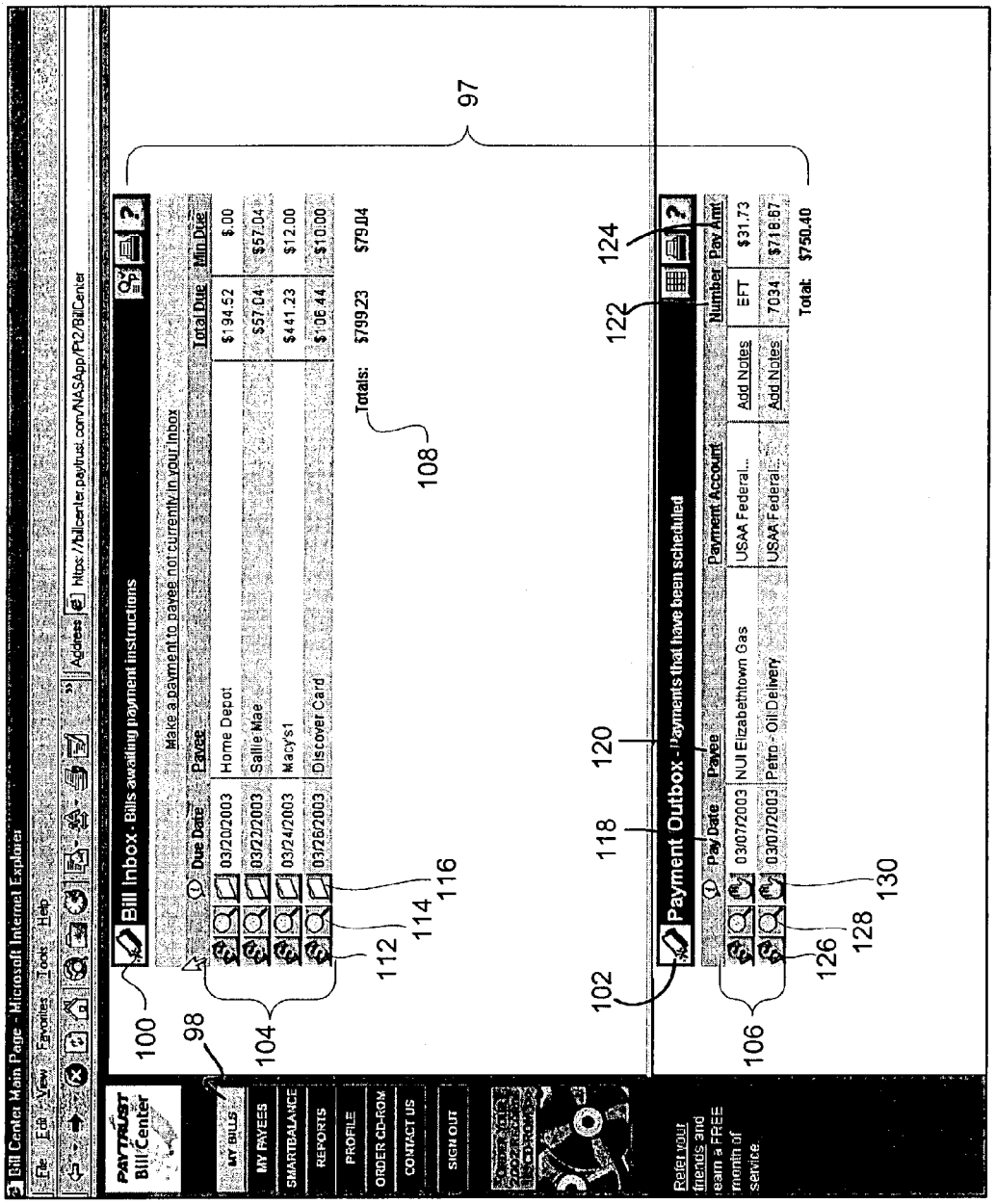
FIG. 3 is a screenshot showing the Bill Center display of the integrated EBPP system of the invention.
Figure 4:
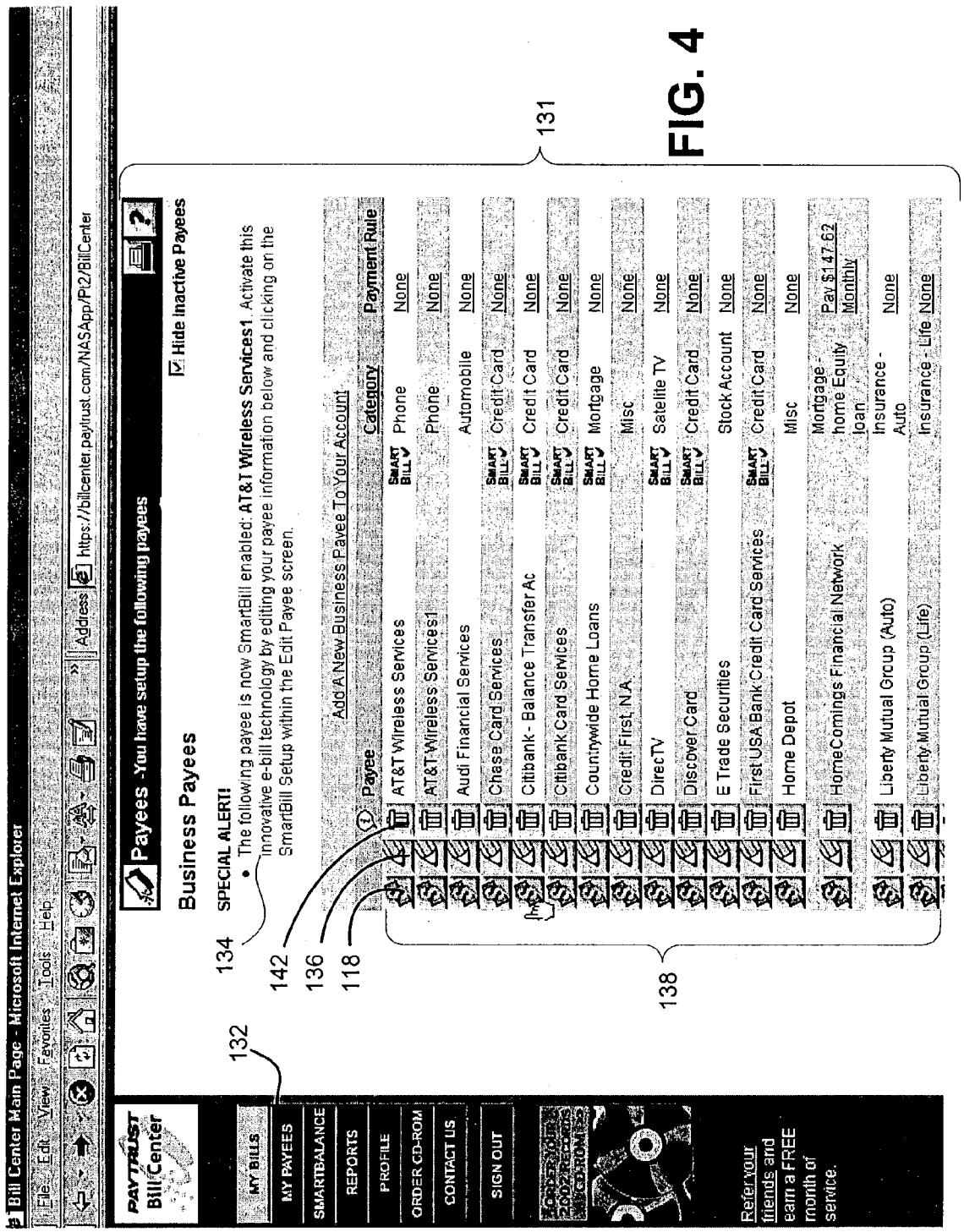
FIG. 4 is a screenshot showing the display used to initiate the inclusion of bills from a biller's website in the integrated EBPP system of the invention.
Figure 5:
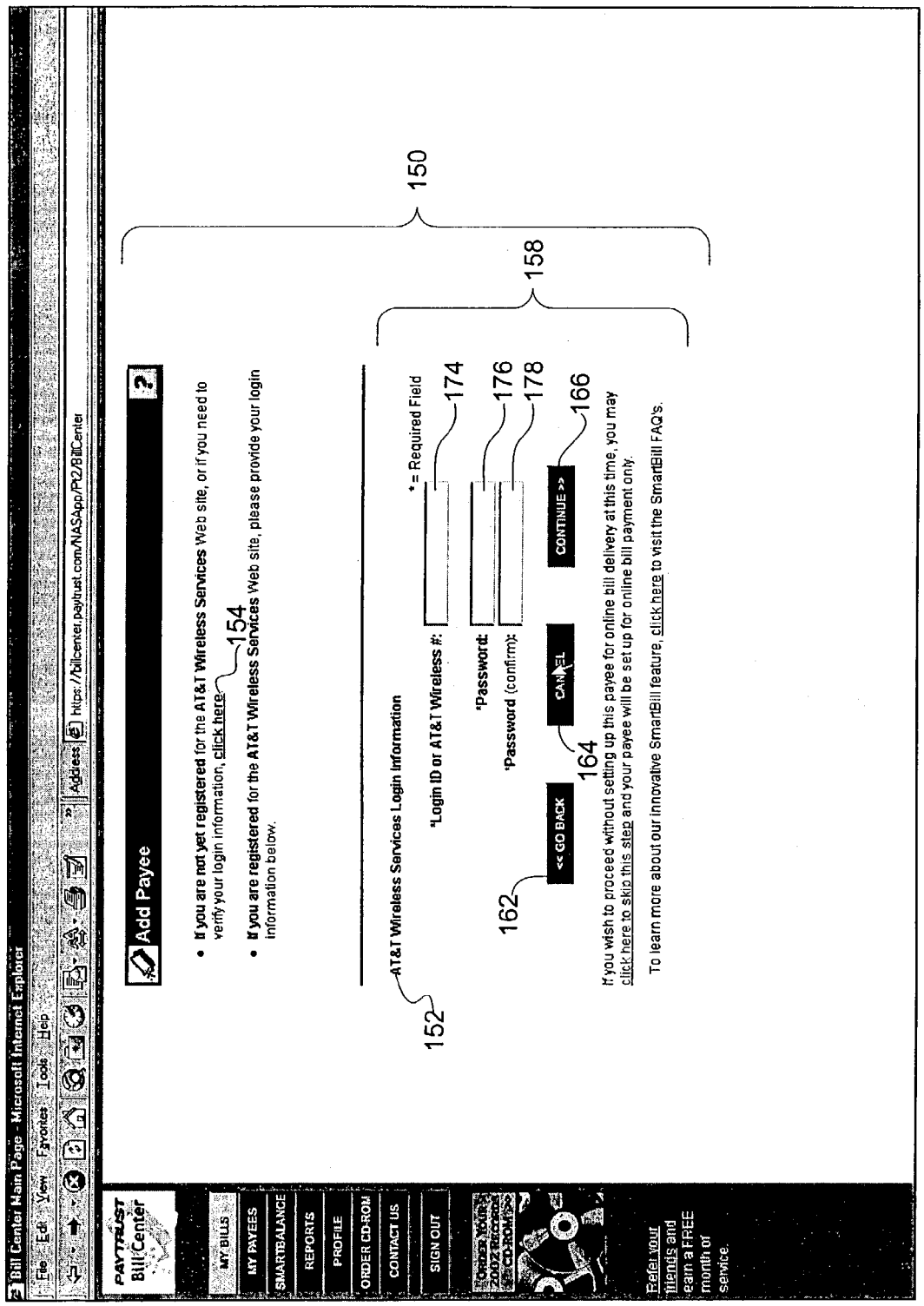
FIG. 5 is a screenshot showing the display used to edit biller information in the integrated EBPP system of the invention.

FIGS. 3 through 5 illustrate the customer interface of the integrated EBPP system 50 illustrated in FIG. 1. FIG. 3 shows a bill center web page 96 for the integrated EBPP system 50. The bill center web page 96 is an interface that the customer uses to see what bills need to be paid, to select bills for payment, and for other features available on a selection bar on the left of the screen. The customer reaches the bill center web page 96 by entering the URL address in the customer's web browser.

Once there, by clicking on a My Bills button 98, a My Bills page (indicated generally by the reference numeral 97) is displayed. The My Bills page 97 has two main components: a Bill Inbox 100, which contains a list of bills awaiting payment, and a Payment Outbox 102, which contains a list of bills which the EBPP system 50 currently has scheduled to automatically pay for the customer unless the customer indicates otherwise. The Bill Inbox 100 contains entries 104 for all of the bills currently awaiting payment, regardless of whether the bill was received from the biller as a paper bill, in electronic form, or was scraped from a biller website by the bill bot 68 (FIG. 1). Each entry contains summary information for the bill that indicates the due date, the biller (the payee), the total due, and the minimum payment. The summary information is made from the item of bill data for the bill. Totals indicated by the reference numeral 108 indicate the total amount presently due and the total minimum amount due.

If the customer wishes to pay the bill, the customer may click on a pay bill button 112. If the customer wishes to see an image of the bill, the customer may click on a view bill button 114. If the customer wishes to file the bill, the customer may click on a file bill button 116. In each case, the result of clicking is a new HTML page in which the desired operation has been performed. In each case, a new browser window may be launched to display the new HTML page. Alternatively, the new HTML page may be displayed in the same browser window.

The payment outbox 102 contains entries 106 for all of the customer's bills for which the integrated EBPP system 50 has scheduled automatic payment but has not yet paid. Each entry specifies summary information for the payment including a payment date 118, the name of the biller 120 (the payee), a check number or mode of payment 122 if not by check, and the amount to be paid 124. A pay bill now button 126 allows the customer to pay the bill immediately, a view bill button 128 allows the customer to see the bill's image, and a stop payment button 130 allows the customer to stop the scheduled payment.

FIG. 4 shows an HTML page (indicated generally by the reference numeral 131) that lists the customer's billers (the payees). The payees may be divided into two classes: business billers (shown in FIG. 4) and personal billers (not shown in FIG. 4, but obtained by scrolling down beyond the point shown in FIG. 4). To reach the HTML page 131, the customer clicks on a "My Payees" button 132 in the bar on the left of the screen. A message 134 indicates that a business payee has been added to the list of scrape-enabled billers. A number of entries 138 for the billers lists each biller's name, a category to which the biller belongs, and any payment rules for bills from the biller. A payment rule may for example, specify that the integrated EBPP system 50 pay a bill automatically if it is below a certain amount or that a bill be paid at specific intervals. Again, there are three buttons: a pay bill button 118 allows the customer to pay the current bill for the payee; an edit button 136 allows the customer to edit the information which the integrated EBPP system 50 maintains about customer's relationship to the biller; and a delete button 142 permits the customer to remove the biller from the list.

When a biller is scrape enabled, the customer can edit the information which the integrated EBPP system 50 maintains about the customer's relationship to the biller to specify that the customer wishes the integrated EBPP system 50 to obtain the customer items of bill data from the biller by scraping the biller website 92 (FIGS. 1-2).

FIG. 5 shows an HTML page (indicated generally by the reference numeral 150 that the EBPP service 72 (FIG. 1) provides to the customer's browser when the customer indicates that he/she wishes the integrated EBPP system 50 to scrape items of bill data from a biller website such as the biller website 92 (FIG. 1). The name of the selected scrape-enabled biller is indicated by the reference numeral 152.

The customer can click the "click here" button 154 to register for access to the biller website and to obtain the customer access information that is necessary to access the customer account information on the biller website. The customer is then prompted to enter customer access information 158, including a user ID and a password required to access the biller website. The actual customer access information will be specific to the customer and may vary with the biller website.

If the customer is already registered on the biller website, the customer enters the user ID into a text box 174, and a password into a text box 176. The password is entered a second time at a text box 178 for password verification. A "Go Back" button 162 permits the customer to move to the previous HTML page, and a cancel button 164 allows the customer to cancel the process. A continue button 166 allows the customer to continue the process of setting up parameters for the bill bot 68 to access the biller website 92 for scraping.

If the customer clicks on the continue button 166, the EBPP service 72 (FIG. 1) initiates the process of setting up the integrated EBPP system 50 to obtain the customer's items of bill data from the biller by scraping. If the scraping process is successful, the elected scraped-enabled biller, the customer access information 158, and the items of bill data obtained from the elected scraped-enabled biller are added to the customer information that the EBPP server 58 (FIG. 1) maintains about the customer. The bill bot 68 (FIG. 1) then uses the customer access information 158 as described above to periodically access the added biller website for the customer (as shown in FIGS. 1-2).

Details of Bill Information

Figure 6:
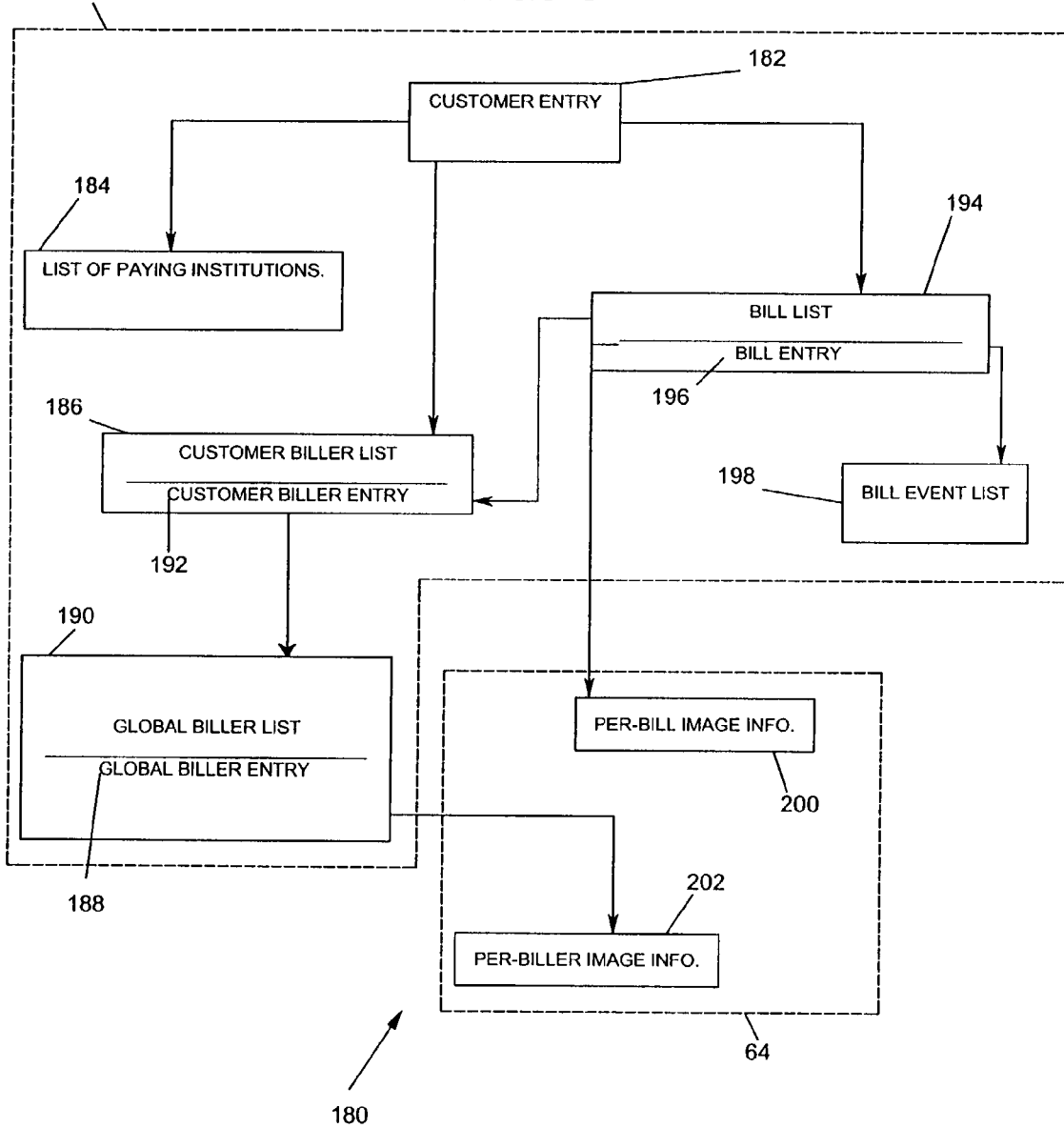
FIG. 6 is an overview of the structure of information in databases contained in the integrated EBPP system illustrated in FIG. 1.

FIG. 6 is a conceptual overview 180 of the bill information database 62 and the bill image database 64 contained in the integrated EBPP system 50 illustrated in FIG. 1. FIG. 6 shows the information in the bill information database 62 and the bill image database 64 as it relates to a single customer. The customer may be one of a plurality of customers in a database table of customers, and the information for the customers is similarly contained in database tables having information for a plurality of customers. A customer entry 182 for a single customer in a table of customers contains the customer's name, address, the access information for gaining access to the integrated EBPP system 50, and the customer profile.

Corresponding to each customer entry 182 is a list of paying institutions 184 upon which the integrated EBPP system 50 makes payments such as checks or perform electronic funds transfers ("EFT's") to pay the customer's bills as specified by the customer for each biller. Each entry in the list of paying institutions 184 indicates the paying institution's routing number, institution name, customer's account number at the institution, and other information required by the paying institutions.

Also corresponding to each customer entry 182 is a customer biller list 186 containing that customer's billers. There is a customer biller entry 192 for each biller in customer biller list 186, and the customer biller entry 192 for a given biller specifies the biller's name and address, the customer's account number with the biller, and any payment rules for paying bills from the biller for the customer. If the biller is scrape-enabled and the customer has specified that the integrated EBPP system 50 is to use scraping to obtain the customer's items of bill data, the customer biller entry will also include the customer's access information for the particular biller website.

The integrated EBPP system 50 preferably divides billers into business payees and personal payees. Since multiple customers of the integrated EBPP system 50 will receive bills from the same business payees, the bill information database 62 includes a global biller list 190, which includes information for each biller on the list that is relevant to all of the bills for that biller. Included in each global biller entry 188 for a biller on the global biller list 190 are the biller's name and address, and electronic funds transfer information, if relevant. If the biller is scrape-enabled, the billing interval and the scraping strategy (scraping strategy will be explained in more detail below) that the bill bot 68 (FIG. 1) will use when scraping the biller website 92 are also included in the global biller entry. Given a global biller entry 188 for a particular biller, the integrated EBPP system 50 can also find a per-biller image information 202 in the bill image database 64. The per-biller image information 202 includes images and/or HTML and related data which the integrated EBPP system 50 can use to produce an image of the biller's statement.

Also included in the bill information database 62 is a bill list 194 which lists current bills for each customer. A bill entry 196 contains biller information for the bill, the bill summary information, and status flags. Given a particular bill entry 196, the integrated EBPP system 50 can also locate a per-bill image information 200 and a bill event list 198. The bill event list 198 includes such events as when the bill was received, when the customer authorized payment of the bill, and when the bill was actually paid. For a scrape-enabled biller, the per-bill image information 200 is a cleaned version of the HTML for the bill that the bill bot 68 scraped from the biller website 92. For a non-scraped payee, the per-bill image information 200 is simply an image of the payee's invoice.

As can be seen from the foregoing discussion, given a customer entry 182, the integrated EBPP system 50 can find the customer's bill list 194. Given the bill entry 196, the integrated EBPP system 50 can find the customer biller entry 192 for the biller. The integrated EBPP system 50 can also find the global biller entry 188 for the biller given the customer biller entry 192. From the customer biller entry 192, the integrated EBPP system 50 can retrieve the information needed to access the customer's account with a scrape-enabled biller. From the global biller entry 188, the integrated EBPP system 50 can retrieve the information needed to do the scraping and to display the bill's image.

Scheduling Information

FIG. 7 shows the information used to schedule the bill bot 68 contained in the integrated EBPP system illustrated in FIG. 1. Referring to FIGS. 1 and 7, each time the integrated EBPP system 50 scrapes a biller website for a customer who has agreed that the customer's bills from the biller should be obtained from the biller website, the bot scheduler 70 reads the billing date from the customer's bill and uses the biller's billing interval to schedule the next scrape. A schedule 210 has an entry for each scrape that has been scheduled for a given customer and biller. A schedule entry 212 contains information including a next scrape date 214, biller information 216 including specifications for the scraping strategy, customer information 218, and the customer's access information 220 for the biller website.

When preparing the schedule for an execution of the bill bot 68 on a given date, the bot scheduler 70 queries the schedule 210 by the date 214 and scrape-enabled biller. Based on the queries by the bot scheduler 70, a schedule 222 of the scrapings to be done on is produced. The schedule 222 includes an entry for each customer for which the scraping is to be done. Contained in the entry of the schedule 222 is the information, including the customer information 218 and the access information 220, that bill bot 68 needs to access the biller website 92 for the customer.

Scraping and Cleaning Bill

With regard to scraped bills, the integrated EBPP system 50 can combine the biller's per-biller image information 202 (FIG. 6) and the customer's per-bill image information 200 (FIG. 6) to produce a display on the customer's browser in response to a click on the bill image button 114/128 (FIG. 3). The display looks like the bill the customer would see when the customer directly accesses the biller website 92, but which has been produced by the integrated EBPP system 50 instead of the bill website 92. Simply making a copy of the HTML that was scraped from the biller website 92 and providing the copy to the customer's browser is not sufficient because the HTML from the biller website 92 is intended to work in the environment provided by the biller website 92 and will not work in a different environment. For example, the HTML from the biller website 92 may contain links to objects and resources that are not available on the EBPP server 58 and/or objects not supported or used by the present invention.

The scraped HTML must be conditioned by the integrated EBPP system 50 because the scraped HTML may refer to files or other resources that are not available in the integrated EBPP system 50. The scraped HTML may also include functions that cannot be duplicated in the integrated EBPP system 50. In addition, the customer may need information that is not included in the scraped HTML. Hence, if the display produced by the integrated EBPP system 50 is to be useful to the customer, the scraped HTML should be conditioned and filtered to remove and/or add new information before displaying the scraped information to the customer In order to deal with these problems, the integrated EBPP system 50 modifies the scraped HTML from the biller website 92 to make a cleaned or conditioned HTML page for display on the customer's browser. Examples of these displays for a typical credit card bill are shown in FIGS. 8 and 9. FIG. 8 shows a display 230 that is produced when a customer of a particular credit card biller accesses the biller website 92. FIG. 9 shows a display 280 with cleaned HTML based on the scraped HTML illustrated in FIG. 8.

Using a credit card bill as an example, referring first to FIG. 8, from top to bottom, a header 232 shown at the top contains most of the bill summary data. Below the header 232 are tables 244 which contain credit line information. Next is an account detail table 246, which has an entry, such as an entry 256, for each transaction. Each entry lists a sale date 248, a transaction date 250, a reference number 252, a vendor 253, and an amount 254 for each transaction. Next, a message section 260 contains messages from the biller to the customer. A summary table 258 then lists a summary of the activities, with entries for purchases 262, advances 264, and totals 266.

As is generally the case with displays made from HTML pages, the display 230 includes active areas, which are indicated in the display by underlines shown at 277 and 278. When the customer clicks on the active area, the customer receives another HTML page. As indicated on the display 230, when a customer clicks on an amount 277, the result is a web page showing the details of the transaction. When the customer clicks on the active area 278 on the display 230, the result is a web page explaining the details of the biller's all-electronic billing service.

FIG. 9 shows the display 280 produced by the cleaned HTML produced from the scraped HTML. The header 232, the tables containing credit line information 244, and the account detail 246 are virtually identical to those appearing in FIG. 8. As may be seen by comparing FIG. 9 with FIG. 8, there are three differences in the display in FIG. 9 from the display in FIG. 8. First, the label "Your Citibank Card Services Statement," shown at 286 at the top of the display has been added. The label 286 is necessary because the integrated EBPP system 50 displays statements from many different billers, whereas the biller website 92 displays statements from only a single biller. Second, the amounts in entries 256 are no longer active, as shown at the areas designated by the reference numeral 282. Third, the word "All-Electronic," which was a message 278 (FIG. 8) which was an active element is no longer active, as shown at reference numeral 284.

The modification of the cleaned HTML to eliminate the active areas is necessary because the customer of the integrated EBPP system 50 is interacting with the EBPP server 58, not with the server at the biller website 92. Because the amounts in the entries 256 and "All-Electronic" in the message 278 are no longer active, the display 280, though produced using HTML, behaves in exactly the same fashion as a scanned image of a bill that customers of the integrated EBPP system 50 otherwise sees when they click on the image button 128 (FIG. 3).

The HTML for the displays in FIGS. 10 and 11 each show corresponding portions of the HTML as scraped from the biller and the cleaned HTML. Beginning with FIG. 10, the HTML shown sets up the environment for the rest of the HTML page. The HTML indicated by the reference numeral 290 is from the scraped HTML. The HTML indicated by the reference numeral 292 is from the cleaned HTML. The reference numerals 294 and 296 indicate references to files that contain material that is relevant to the HTML page.

Reference numeral 294 identifies a reference to a stylesheet file that determines how the information contained in the HTML will be rendered when it is displayed. Reference numeral 296 identifies an image file that contains an image that will be displayed at a point in the displayed HTML page that corresponds to the point where the reference occurs. In the HTML page as scraped, both of these points (294 and 296) are linked to files on the biller website 92. In order to ensure that the end use can view the scraped HTML exactly as it appears in the biller website 92, corresponding files have been set up in the EBPP server 72 and the scraped HTML has been modified to refer to these local files.

These modified file references appear at locations identified by the reference numerals 298 and 302 in the corresponding part of the cleaned HTML 292. As shown at reference numeral 298, the reference to the stylesheet file 294 has been replaced by the reference to a stylesheet file 298 that is specific to the cleaned HTML. In the preferred embodiment, the stylesheet file referenced by 298 is part of the per-biller image information 202 (FIG. 6). The HTML for the "Your Citibank Card Services Statement" 286 that appears in the display 280 (FIG. 9) is made from the HTML portion identified by the reference numeral 302; there is nothing corresponding to this HTML code in the biller website HTML portion 290. Finally, as shown at 300, there is nothing in the cleaned HTML 292 corresponding to the referenced image 296 in the scraped HTML 290.

FIG. 11 shows a portion 310 of the scraped HTML and a portion 312 of the cleaned HTML that correspond to the entry 256 (FIG. 8) in the account detail 246 (FIG. 8). The difference between the entry 256 in the display 230 (FIG. 8) which is made from the scraped HTML and the corresponding entry in the display 280 (FIG. 9) made from the cleaned HTML is the absence of the active area in the amount field 254 (FIG. 8). As shown at reference numeral 314, each field in the entry 256 (FIG. 8) is specified by a <TD> . . . </TD> construct which contains the value that is to appear in the field and format specifiers for the field. The <TD> . . . </TD> construct for the amount field 254 (FIG. 8) appears at the area identified by the reference numeral 316. In addition to the field value and formatting information, the <TD> . . . </TD> contains, at the area identified by the reference numeral 320, an external reference, defined by <A> . . . </A>, to a Java server page/CB/amount.jsp at the line identified by the reference numeral 318.

The referenced line 318 includes a list of arguments that the code in the Java server page uses to generate the HTML for a web page containing the transaction details when the customer of the biller website clicks on the amount field 254 (FIG. 8). As would be expected from the foregoing discussion of the differences between the display of FIG. 8 and the display of FIG. 9, the external reference is completely lacking in the portion 312 of the cleaned HTML and the amount field 254 is handled like all of the other fields in the entry 256 in the cleaned HTML.

Customer Access Information and Scraping Bills

Referring briefly to FIG. 1, the preferred embodiment of the integrated EBPP system 50 does scraping of the biller website 92 to obtain items of bill data only on the websites of scrape-enabled billers. Hence, the customer must provide customer access information for the bill bot 68, or the customer must authorize the integrated EBPP system 50 to create a user account at the biller website 92 for the customer.

Figure 12:
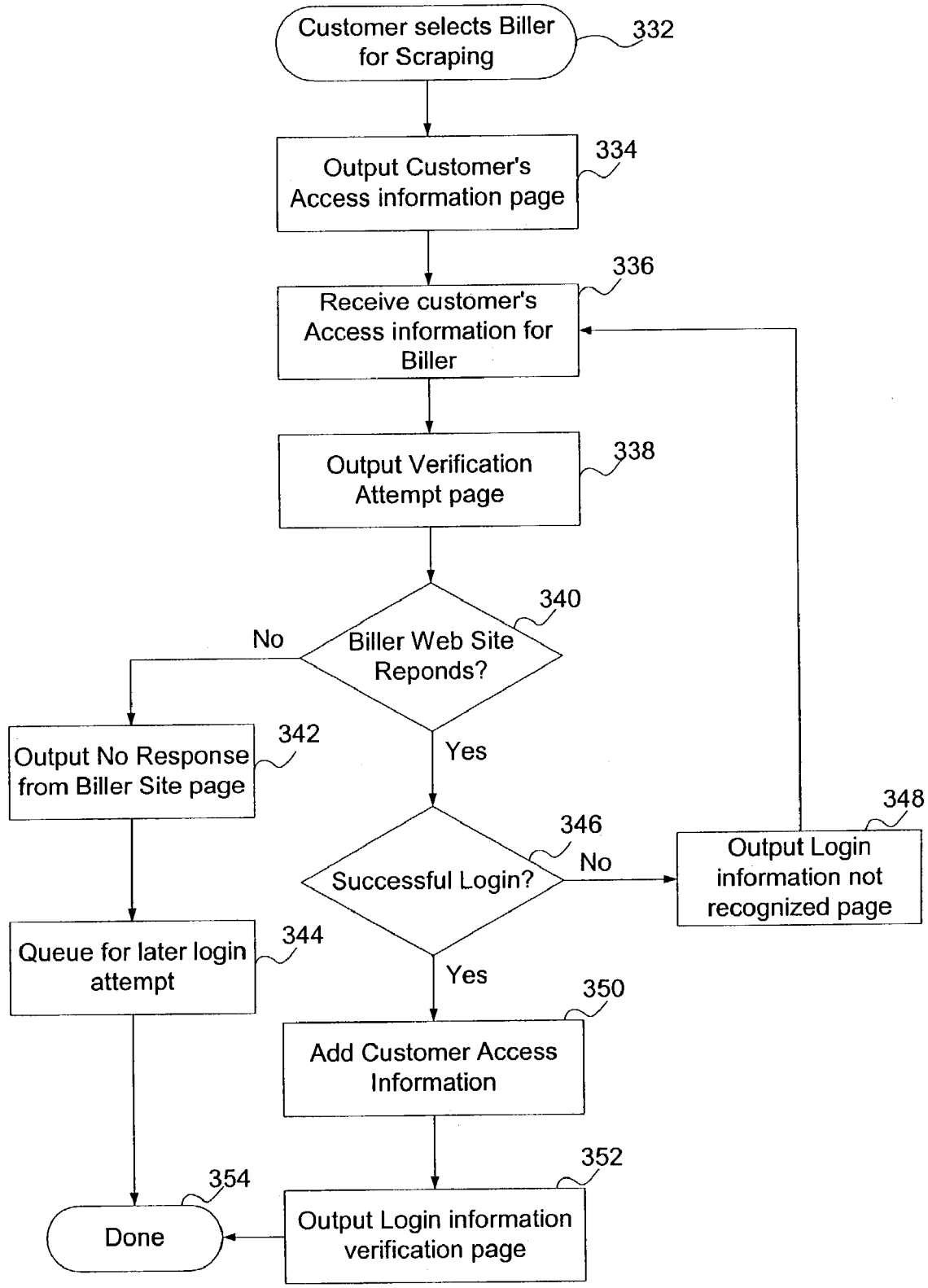
FIG. 12 is a flowchart 330 showing the details of how the EBPP service illustrated in FIG. 1 obtains a customer's access information for a biller from the customer.

FIG. 12 is a flowchart showing the details of how the EBPP service 72 of FIG. 1 obtains a customer's access information for a biller from the customer. At a select biller step 332, the customer selects a biller from a list of scrape-enabled billers before inputting access information. At an output information step 334, the EBPP service 72 provides the web page 150 (FIG. 5) to the customer's browser to prompt the customer for the customer's access information for the biller website 92. At a receive information step 336, the customer inputs the access information. The EBPP service 72 then provides another web page which indicates that verification is in process and asks the customer to wait at a verification step 338. The EBPP service 72 attempts to access the biller website 92.

If the biller website 92 does not respond at a biller website response determination step 340, the EBPP service 72 moves to a no response display step 342, in which the EBPP service 72 provides a web page informing the customer that the biller website did not respond. The EBPP service 72 then stores the access information entered by the customer for a later login attempt at a login queue step 344, and ends the process of obtaining customer access information at a completion step 354.

The EBPP service 72 will process the login attempt later starting at the biller website response determination step 340; however, the later login attempt is not interactive. Thus, e-mail messages to the customer replace the web pages viewed by the customer on the first attempt. The number of times the login attempt is queued for verification of the customer access information can be regulated by a parameter of the system.

If, on the other hand, the biller website response determination step 340 determines that the biller website responded, the EBPP service 72 attempts to login using the customer's access information for biller website and moves to a successful login determination step 346. If the login does not succeed at the successful login determination step 346, the EBPP service 72 moves to a login information not recognized step 348 in which it provides a web page that indicates to the customer that the login information has not been recognized. The EBPP service 72 then returns to the receive information step 336 and asks the customer to reenter the access information. If the customer does not wish to try again, the customer can use a cancel button in the web page to exit the process.

If, on the other hand, the login does succeed at the successful login determination step 346, the EBPP service 72 moves to an add access information step 350. At the add access information step 350, the EBPP service 72 adds the customer access information to the customer biller entry 192 (FIG. 5) for the appropriate customer and biller. The EBPP service 72 then outputs a login information verified page to the customer's browser at a display verification page step 352, completing the process by moving to the completion step 354.

Figure 13:
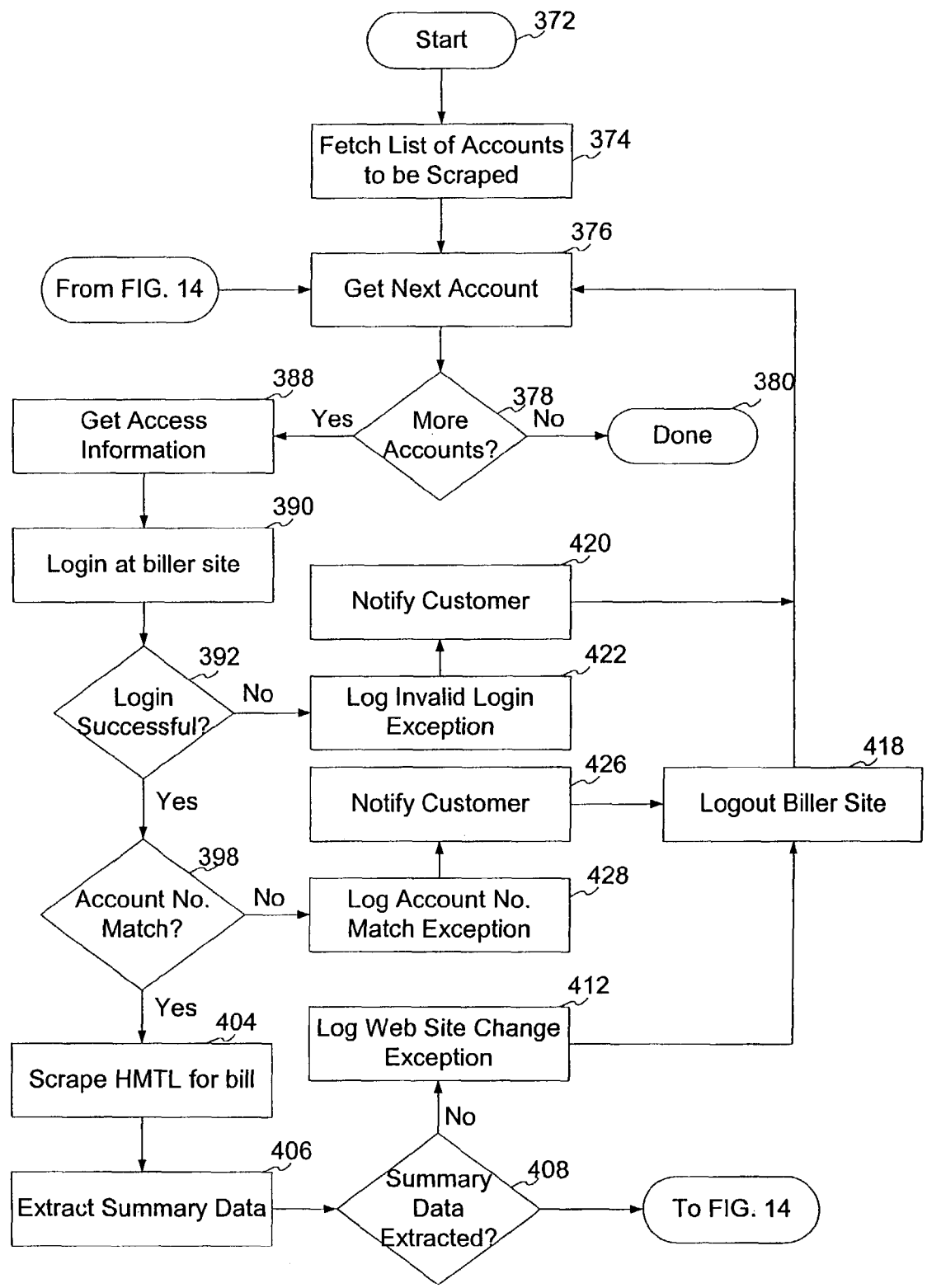
FIG. 13 is the first portion of a flowchart showing the operation of the bill bot illustrated in FIG. 1 when the bill bot is scraping items of bill data from a given biller website.
Figure 14:
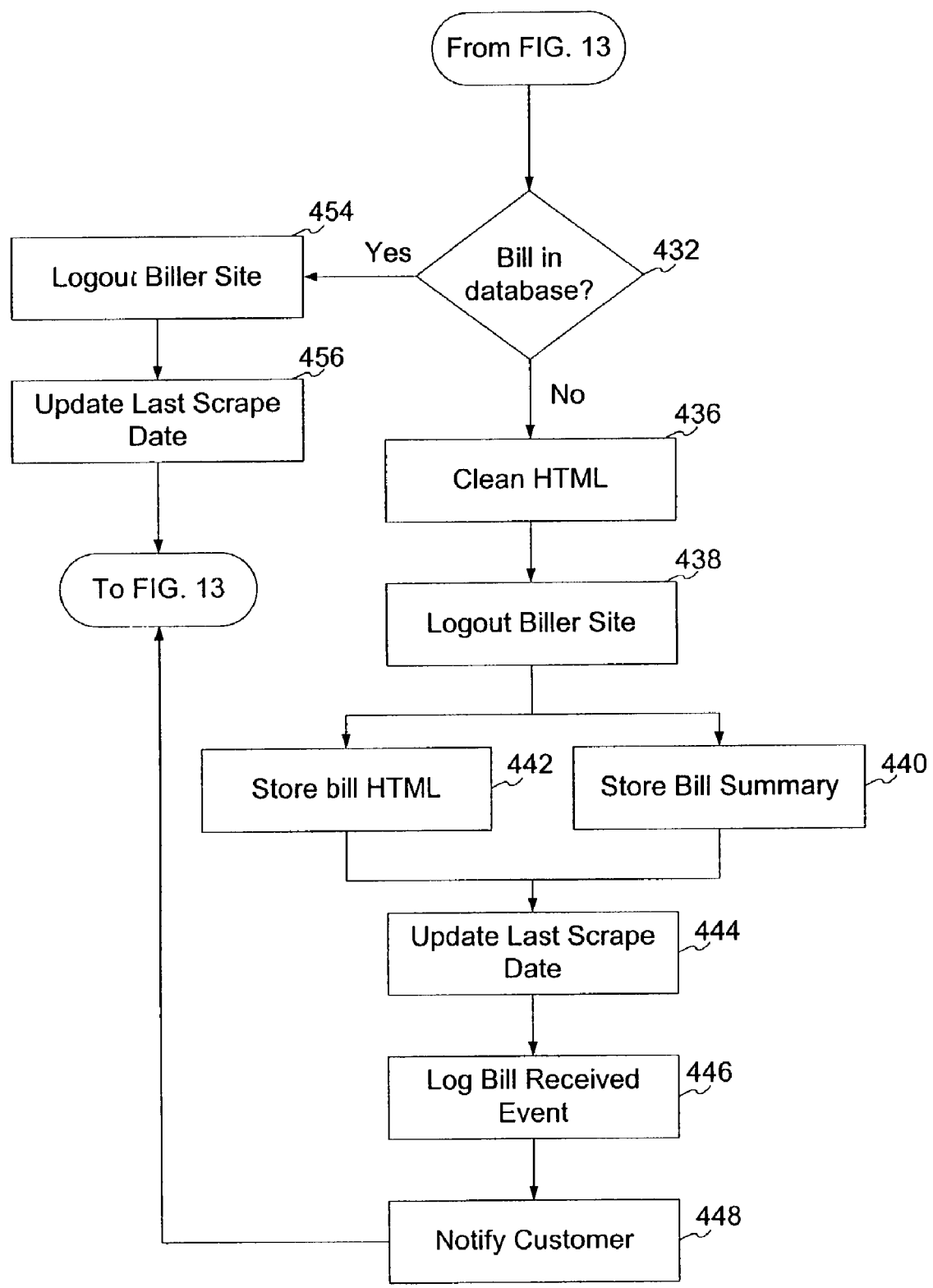
FIG. 14 is the second portion of the flowchart illustrated in FIG. 13 showing the operation of the bill bot illustrated in FIG. 1 when the bill bot is scraping items of bill data from a given biller website.

FIGS. 13 and 14 depict a flowchart showing the operation of the bill bot 68 (FIG. 1) in scraping items of bill data from a given biller website. As discussed above, the bill bot 68 scrapes bill data according to a schedule provided to it by the bot scheduler 70 (FIG. 1). The schedule for operation of the bill bot 68 for a given scrape-enabled biller is organized as shown in FIG. 7. The bot scheduler 70 schedules a first scrape of a biller website for a given customer of the integrated EBPP system 50 after the integrated EBPP system 50 has received and verified the given customer's access information.

The bot scheduler 70 uses the statement date obtained in the first scrape, together with information about the billing interval used by the biller, to schedule the next scrape, with each successive scrape being scheduled using the statement date obtained in the previous scrape. On calling the bill bot 68 to scrape bill data from a given biller website 92, the bot scheduler 70 specifies the configuration of the bill bot 68 required to do the scraping. Each biller website 92 may have its own statement format. Therefore, the bill bot 68 can be configured for each of the different statement formats that the bill bot 68 must interact with at the biller website 92.

Referring first to FIG. 13, the process of scraping bills starts at a process initiation step 372. The configured bill bot 68 fetches a list of accounts for the biller website that is to be scraped at a fetch list step 374. Information in the list of accounts includes the customer's account number with the biller and the customer's access information for the biller website. In a get next account step 376, the bill bot 68 retrieves the next account. As shown in a more accounts determination step 378, if there are no more accounts, the process for scraping of the biller website is completed, leading to a process completion step 380.

If, on the other hand, there are more accounts, the bill bot 68 gets the next customer's access information in a get access information step 388. It then logs into the biller website for the next customer in a login step 390. If the login is not successful as determined in a login determination step 392, the process moves to an invalid login step 422 where the bill bot 68 logs an invalid login exception to the bill information database 62, and e-mails a notification of the problem to the customer in a notify customer step 420, and returns to the get next account step 376 to get the next account.

Invalid login exceptions occur when a customer enters customer access information that is not recognized by the biller website. When this occurs, the customer is notified via e-mail that the access information the customer provided was not recognized by the biller website. The customer is asked to return to the bill center and re-enter the proper information. The notification also states that the customer will not be able to receive this particular bill online until the customer enters valid login information. The customer will still be able to issue payments to this biller through the bill center 96 (FIG. 3), but the customer will have to refer to the paper bill the customer receives for the due date, amount due, and other statement details.

When a customer returns to the bill center 96 and updates his or her access information, the customer's account is scheduled for scraping during the next scrape session. If the login is successful in the login determination step 392, then the customer's most recent statement is retrieved and processed as described above. If the login in the login determination step 392 is still unsuccessful, another e-mail notice is sent to the customer and the integrated EBPP system 50 will wait until the customer has updated his or her login information before again attempting to access the biller website for the customer.

If, on the other hand, it is determined in the login determination step 392 that the login is successful, the bill bot 68 reads the account number from the biller website and compares the account number with the account number from the customer's customer information 208 (FIG. 6) and compares it in an account number comparison determination step 398. If the comparison of account numbers in the account number comparison determination step 398 results in a mismatch, the flow proceeds to a match exception step 428 which logs an account number match exception. The integrated EBPP system 50 then notifies the customer via e-mail, in a notify customer step 426, logs the customer out of the biller website in a logout step 418, and returns to the get next account step 376 to retrieve the next account.

If the account numbers do not match, an e-mail notification is delivered to the customer notifying the customer of this discrepancy. The notification also states that the customer will not be able to receive this particular bill online until the customer updates the account information. The customer will be able to issue payments to the biller through bill center 96, but will have to refer to the paper bill the customer receives for the due date, amount due, and other statement details.

When a customer returns to the bill center 96 and updates the customer account information, the account is scheduled for the bill bot 68's next scrape of the biller website. If the account number on the bill matches the account number in bill information database 62 on that scrape, then the bill is staged for posting via the normal cycle. If the account numbers still do not match, another e-mail notice is delivered to the customer and the integrated EBPP system 50 will wait until the customer has updated the account information again before again attempting to access the biller website for the customer.

If, on the other hand, the account numbers match at the account number determination step 398, the bill bot 68 proceeds to scrape the HTML for the bill from the biller website in a scrape HTML step 404. The bill bot 68 processes the scraped HTML by first extracting the summary bill data from the scraped HTML in an extract date step 406. The summary bill data contains the information needed for the item of bill data. If the summary data cannot be extracted as determined in a data extraction determination step 408 (usually because the biller has changed the format of the web pages on its biller website), the bill bot 68 must be reconfigured to interact with the new format so that the it can scrape the new format from the biller website. If the bill bot 68 needs to be reconfigured, it logs a website change exception in a log exception step 412. The integrated EBPP system 50 then logs the customer out of the biller website 92 in the logout step 418, and returns to the get next account step 376 to retrieve the next account.

With regard to the website change exception, the bill bot 68 is programmed to report any changes to the format of the HTML on the pages which the bill bot 68 encounters at the biller website. The bill bot 68 looks for bill summary information in specific areas of the HTML of the bill. In the preferred embodiment, the bill summary information that the bill bot 68 looks for is Account Number, Statement Date, Payment Due Date, Minimum Amount Due, and/or Total Amount Due. If any of these elements is missing, or has been moved or altered in the HTML, the bill bot 68 generates an exception report. The exception report is stored in the bill information database 62 and is delivered to the team of software engineers responsible for maintaining the bill bot 68. The team responds to the exception report by reviewing all of the bills for that particular biller in order to identify the changes that have taken place on the HTML of the bill. Any significant changes that are made to the biller website require a change to the bill bot 68. Once the changes have been put in place, the bill bot 68 is rescheduled for that biller in order to retrieve of customer bills. The new bills are scrutinized for accuracy, and if the bills are accurate, they are then posted to customers' accounts.

The bill bot 68 would then perform the next account check instead of going to the process completion step 380 after logging the customer out because a given website change may affect only a relatively small number of customers on a given scrape of the biller website. A provision may be programmed into the integrated EBPP system 50 for ending the scrape if it is noticed that there has been a change in the biller website 92 which affects many customers.

If, on the other hand, it is determined in the data extraction determination step 408 that the summary data can be extracted, the process moves to FIG. 14. The bill bot 68 will use the summary data to check whether the EBPP server 72 has already received a paper copy and/or an electronic copy of the scraped bill in a bill received determination step 432. The bill bot 68 uses the summary data to make a query for the bill which the bill bot 68 applies to the bill information database 62 (FIG. 1). If it is determined that the bill is already in the database (a paper copy or electronic copy has been received), the bill bot 68 logs the customer out of the biller website in a logout step 454, updates the bill information database 62 as to the last scrape date in an update scrape date step 456, and moves to the get next account step 376 (FIG. 13) to retrieve the next account. The updated scrape date for the customer and biller is entered into the schedule entry 212 (FIG. 7) to specify the next time the biller should be scraped for the customer, and the new scrape date is placed into the customer biller entry 192 (FIG. 6) for the customer and biller.

If, on the other hand, it is determined in the bill received determination step 432 that no paper or electronic copy of the bill has been received, the bill bot 68 cleans the scraped HTML in a clean HTML step 436 to get rid of references in the HTML local to the biller website and to get rid of behavior which only works if the customer is interacting with the biller website.

Once the bill bot 68 has cleaned the HTML, the bill bot 58 logs the customer out from the biller website 92 in a logout step 438, and stores the scraped bill information in the databases. The cleaned HTML is stored in the per-bill image information 200 (FIG. 6) in the bill image database 64 (FIG. 6) in a store bill HTML step 442, while the bill summary information is stored in the bill entry 196 (FIG. 6) in the bill information database 62 (FIG. 6) in a store bill summary step 440. The bill bot 68 then updates the scrape date for the customer in an update scrape date step 444. Finally, the bill bot 68 logs a bill received event in the bill event list 198 (FIG. 6) for the customer and biller in a log bill received step 446, and sends the customer an e-mail notifying the customer of the arrival of the new bill in a notify customer step 448, and returns to the get next account step 376 (FIG. 13) to retrieve to the next account.

Automated User Account Setup for Scraping

Figure 15:
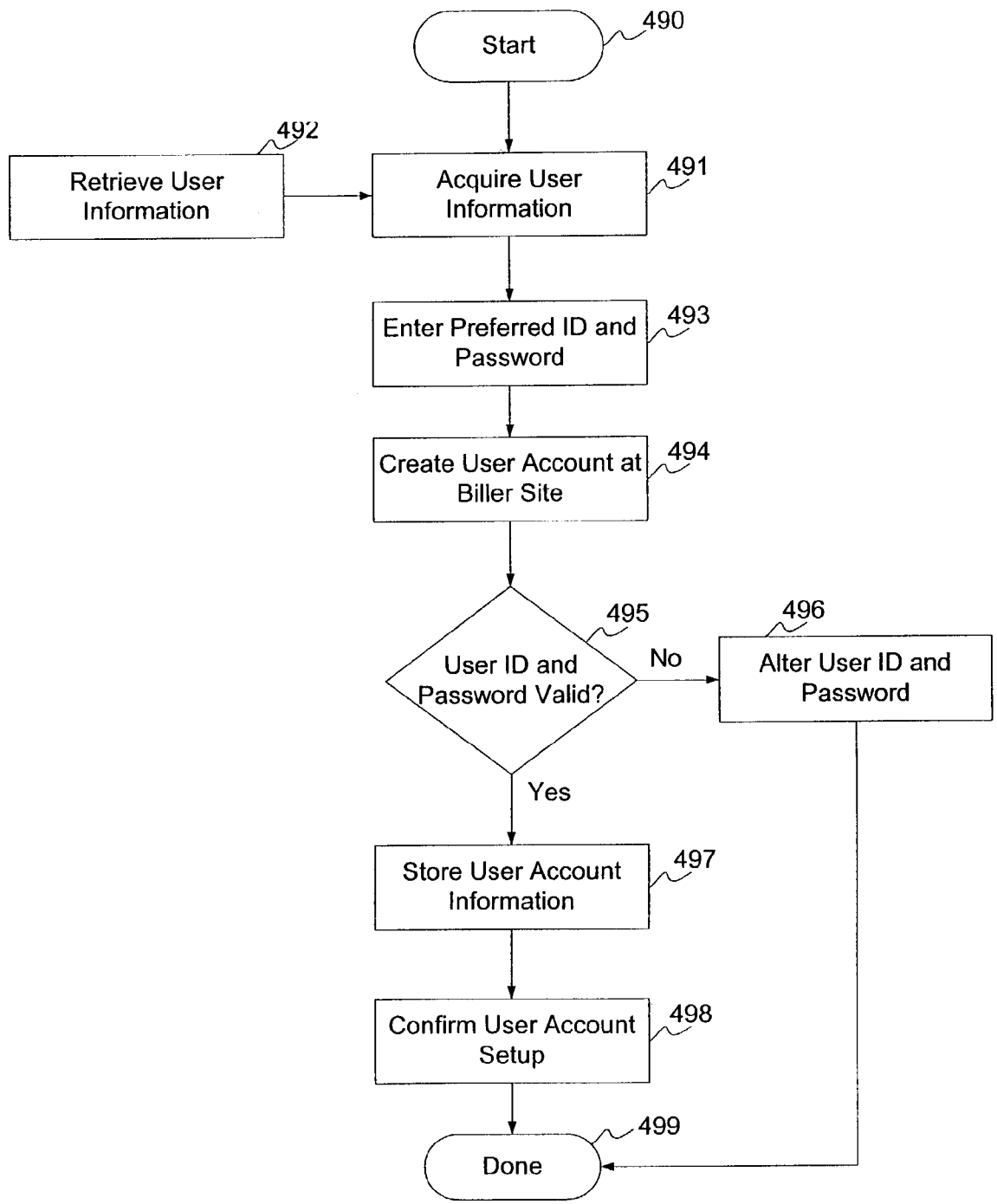
FIG. 15 is a flowchart showing the automated user ID and password setup process used by the present invention if the customer does not have a pre-existing account with the biller to allow bills to be viewed.

Referring now to FIG. 15, even if the customer does not have the user access information necessary to access the biller website for scraping, an automated user ID and password setup option may be used to automatically set up online access for a customer's account with the biller website. The automated user ID and password setup option 490 enables the customer to enter information necessary to set up a user account at the biller website. Then using the customer account information, the integrated EBPP system 50 will proceed to scrape the bills from the biller website for the customer.

In the preferred embodiment, the integrated EBPP system 50 captures the information from the customer that is necessary to set up online access with the biller website. The integrated EBPP system 50 will use the information the customer has already provided to set up his/her bill center account and prompt him/her to enter any additional information necessary to set up the account for online access at each biller website.

As discussed above, when adding a biller for scraping by the bill center 96, a customer that chooses to set up the biller for scraping will be prompted for the user ID and password and to verify the password. If the customer does not have a user ID and password with a biller website or the customer does not have an existing account with the biller website, the customer will have the option of setting up an account (e.g., a user ID and password) with the biller website through the bill center 96. If the customer chooses the option of automated user ID and password setup, the customer will be prompted to enter information that is necessary to set up a user ID and password at the biller website, such as a first name, a last name, a middle initial, a billing address, a home phone number, a social security number, an e-mail address, a secret identifier (i.e. mother's maiden name, pet's name etc.), a preferred user ID, and a preferred password. The logic of what information will be required will be based upon the requirements of the biller website. The present invention can aggregate information required by way of a standard, generic form and then transmit only information that is required by the biller website. This methodology will ensure that the present invention remains flexible in how it communicates, transmits, and retrieves data from each biller website.

When the integrated EBPP system 50 prompts the customer for the user ID and password (FIG. 5), the customer can set up an account with a biller website through the automated ID and password setup process shown in FIG. 15 if the customer does not have a user account registered with the biller website, beginning with a process initiation step 490. If the customer chooses to allow the integrated EBPP system 50 to automatically set up an account with the biller website, the integrated EBPP system 50 first prompts the customer for the customer information at an acquire information step 491. Preferably, the integrated EBPP system 50 interfaces with an existing database and retrieves customer information in a retrieve user information step 492, if any exists, that is relevant to the automated ID and password process. Using the retrieved customer information and/or the customer information entered by the customer at step 491, the integrated EBPP system 50 next prompts the customer to enter a preferred user ID and password in an enter account information step 493.

Next, in a create account step 494, the integrated EBPP system 50 will use the information entered to set up a user account at the biller website, and will attempt to use the preferred user ID and password entered by the customer to determine whether they are valid. If it is determined in a valid account information determination step 495 that the preferred user ID and password entered by the customer are not valid or are not available at the biller website, the integrated EBPP system 50 will automatically create a new user ID and password by altering the user ID and randomly creating a password that meets the biller's requirements in an alter account information step 496, and the process will terminate in a process termination step 499. If, on the other hand, the information entered by the customer is valid and an account is set up at the biller website, the integrated EBPP system 50 stores the account information in a store user account information step 497, confirms that an account has been set up for the customer at the biller website 92 in a confirm account step 498, and terminates in the process termination step 499.

In the preferred embodiment, the automated ID and password setup process is done in real-time once the customer provides all the appropriate information. The integrated EBPP system 50 may set up the login information in the biller website while the customer is still in the bill center session. Any errors encountered at the biller website will be messaged immediately to the customer, and will require the customer to correct any necessary information. Once the customer has corrected any necessary information, the customer can resubmit the enrollment information.

In the preferred embodiment, the automated ID and password setup process will be run on a nightly basis to set up user ID and password for each biller website. The nightly setup will be run for any accounts that were unable to be set up using the preferred real-time setup method while the customers were still in bill center sessions.

The customer may be prompted to review and revise the information submitted if the automated ID and password setup 490 fails. For example, if an error occurs as a result of the customer providing invalid information, the customer will be notified via e-mail that the integrated EBPP system 50 was unable to establish a login for a biller website. A special alert will also be added to the bill center 96 alerting the customer of the error. The customer will need to update the customer account information for the biller website and resubmit his/her enrollment request.

If a biller website is unavailable at the time the customer is setting up his/her account, an error message will be displayed to the customer explaining the problem. The customer's information will be stored, and the integrated EBPP system 50 will schedule the enrollment setup process during the next automated enrollment setup.

If the system is unable to properly set up the customer's login access to a biller website due to a problem with the biller website, the process will be rescheduled for the following day. The process will continue to be run on a daily basis until the problem with the biller website is corrected. The biller will not be scrape-enabled until this process has been completed.

Bill Bot

Generally, a bot (short for "robot") is a program that operates as an agent for a user or another program. The most recognized bots on the Internet are programs called spiders or crawlers that access websites and gather content for search engine indexes. Although the term bot is used to describe the functions of the present invention, equivalent terminologies, such as agents, brokers, daemons, and avatars, may also be used, none of which depart from the spirit or scope of the present invention.

The bill bot 68 of the present invention may be programmed to be a spider or a crawler. Meaning, if the bill bot 68 is programmed as a spider, the spider will visit a biller website and read the web pages and other information in order to create entries for the integrated EBPP system 50. A spider bill bot also visits many websites and web pages in parallel at the same time. If the bill bot 68 is programmed as a crawler, the crawler bill bot also visits websites and reads the web pages. A crawler bill bot, however, only crawls through website pages one at a time, following the links to other relevant billing pages on a biller website until all bill pages have been read.

In the preferred embodiment, the bill bot 68 is object-oriented, distributed, mobile, and can negotiate with and talk to other bots. Using object-oriented programming ("OOP"), the bill bot 68 is organized around "objects" rather than "actions," and data rather than logic. OOP makes use of the concept of a data class that makes it possible to define subclasses of data objects that share some or all of the main class characteristics. In addition, the inheritance property of OOP provides the bill bot 68 with a more thorough data analysis, reduces development time, and ensures more accurate coding of the bill bot 68. Since a class defines only the data it needs to be concerned with, when an instance of that class (an object) is run, the bill bot 68 will not be able to accidentally access other program data. This characteristic of data hiding provides greater system security and avoids unintended data corruption by the bill bot 68.

Another advantage of using OOP for the bill bot 68 is that a class is reusable, not only by the integrated EBPP system 50 for which the bill bot 68 is initially created, but also by other object-oriented programs. For this reason, the integrated EBPP system 50 can be more easily distributed for use in networks. In addition, the concept of data classes allows a programmer to create any new data type that is not already defined in the language itself.

The bill bot 68 program can be written in the well-known Java (Java is a registered trademark of Sun Microsystems, Inc.) programming language. The program may be implemented using many Java libraries, including libraries provided as freeware by Sun Microsystems, Inc.

Figure 16:
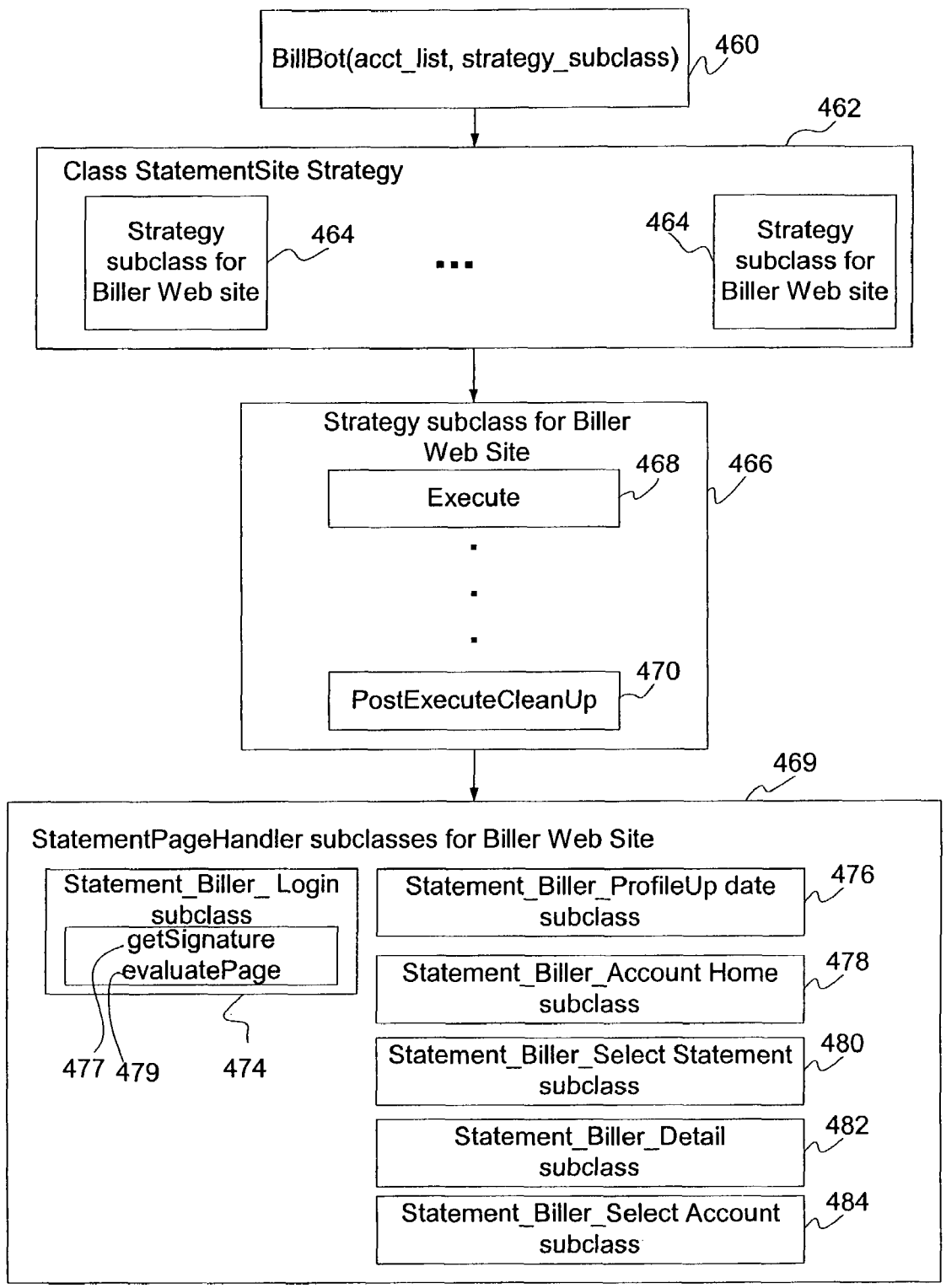
FIG. 16 is an overview of the architecture of a program used by the bill bot contained in the integrated EBPP system illustrated in FIG. 1.

Referring now to FIG. 16, there is shown an overview of the architecture for a program to operate the bill bot 68 contained in the integrated EBPP system 50 illustrated in FIG. 1. Generally, a programmer who is writing a program in the Java language defines the program's data objects and the operations that manipulate them by making class definitions. An operation is defined by writing a method for the operation (i.e., code that performs the operation). One kind of method is a constructor, a method that constructs an instance of the data object defined by the class. One way of making a class definition is to extend an existing class definition by changing the definition of the data objects and/or the methods. The class that has thus been extended is a subclass of the original class.

As shown in FIG. 16, a main bill bot program 460 of the bill bot 68 is invoked by the bot scheduler 70 (FIG. 1) with a specification of a list of accounts and the access information 222 (FIG. 7) for a given biller website and a specification of the strategy that the bill bot 68 is to use to read the biller website. The main bill bot program 460 gets the account list and selects the strategy required for the biller website.

The strategy is implemented as a Java class, and the main bill bot program 460 uses methods belonging to the strategy's class to access the biller website and read the web pages for each account.

In the preferred embodiment, the classes that define the strategies are subclasses of a class statement site strategy 462, which is the superclass for the subclasses. The class-subclass relationship is shown by the fact that the boxes representing a plurality of strategy subclasses 464 are contained within the box representing the class statement site strategy 462 (the superclass). All of the strategy classes make the same set of methods available to the main bill bot program 460, but a given method does what is required for the biller website it is used with. Unless two biller websites are identical with regard to how they are accessed and with regard to their web pages, separate strategies are required for each biller website. There will thus in most cases be a strategy subclass 464 for each scrape-enabled biller website. Moreover, if a biller changes its biller website with regard to how it is accessed or with regard to its web pages, the strategy for the biller website can be modified so that the main bill bot program 460 works with the pages received from the modified biller website.

For example, a single strategy subclass 464 for a biller website is shown in FIG. 16 as a strategy subclass 466. The methods of particular interest for the strategy subclass 466 are an Execute method 468 and a PostExecuteCleanUp method 470. The Execute method 468 creates page handler objects to contain the scraped pages, logs in and gets the login page, and then handles the website's pages as required to access the account and get the account summary and account detail information. The PostExecuteCleanUp method 470 cleans the previously-scraped account detail page.

The biller website strategy subclass 466 in turn uses a set of subclasses which are StatementPageHandler subclasses, one of which is the StatementPageHandler subclass 469, which has been extended to deal with the pages which a customer of the biller website will encounter when the customer logs in to view an account. In the biller website, there are six web page subclasses (designated as 474, 476, 478, 480, 482, and 484). Each of these subclasses 474, 476, 478, 480, 482, and 484 has a constructor and two methods, namely a getSignature method 477, which adds a character string to the scraped web page and an evaluatePage method 479. The getSignature method 477 identifies scraped web page to other components of the bill bot 68 and of the EBPP server 72, and the evaluatePage 479 retrieves information from the web page. The signature and the information go into an object that is defined by the subclass.

For example, a customer of the biller website may encounter a login page, the corresponding subclass for which is login subclass 474, a page that permits the customer to change the profile information, the corresponding subclass for which is the profile update subclass 476; a home page for the customer's account, the corresponding subclass for which is the account home subclass 478; a page which permits the customer to select which statement the customer would like to view, the corresponding subclass for which is the select statement subclass 480; a page which permits the customer to see the detail for the selected statement, the corresponding subclass for which is the biller detail subclass 482; and a page that permits the customer to select an account, the corresponding subclass for which is the select account subclass 482.

As can be seen, the integrated EBPP system 50 is capable of presenting bills from paper billers, electronic billers, and biller websites. Bills from biller websites are received by enabling customers to input access information which they use to access biller websites. For customers not having such user access information to access the biller website 92 for scraping, the integrated EBPP system 50 enables the entry of necessary information to set up a user account at the biller website. The integrated EBPP system 50 then uses the access information to make scheduled accesses to the biller website via the Internet 60, thereby obtaining customer bills which are displayed on the biller website and stored in the integrated EBPP system 50.

The integrated EBPP system 50 incorporates information from bills into the items of bill data that the system maintains for customers. The validity of each item of bill data is checked, and the items are incorporated only if they are valid, with the system responding to invalid items of bill data by modifying how such items of bill data are read from the biller website. The integrated EBPP system 50 may modify the biller display data for display by the integrated EBPP system 50. Such modifications include adding information, replacing references in the biller display data to information in the biller website with references to information in the integrated EBPP system 50, and removing interactive elements.

Bill Payment—Payment Options

Moving now to the bill payment portion which is the heart of the present invention, the following detailed description will discuss the payment options utilized by the present invention.

With currently available EBPP solutions, the customer receives a bill from a biller either electronically or via traditional means. The customer then logs onto the website to review the bill and instructs the EBPP provider to pay the amount of the bill or a designated portion of it. The EBPP provider transfers money either electronically using the Automated Clearing House ("ACH"), by a check written on the EBPP provider's account, or with a manual draft written on the customer's checking or other asset account. With all types of payment except for the draft, the EBPP provider then debits the customer's funds and credits its own account. If the biller accepts electronic payments, the EBPP provider sends payment electronically. If the biller cannot be paid electronically, the EBPP provider pays the biller directly with a check written on its account or a draft written on the customer's account. The check or draft is then mailed to the biller, which processes it as any other payment check received.

Even with multiple "checking" payment options offered by current EBPP solutions, customers have been slow to use EBPP. The EBPP process is perceived as too complicated and too expensive for most customers.

As previously discussed, the scraping of bills and the integration of scraped bills with paper bills and electronic helps to promote the use of EBPP by offering customer an integrated EBPP system that makes the process of collecting and presenting bills easier.

It is well known that customers are reluctant to change their habits. It is also well known that credit cards have helped to fuel the growth and acceptance of the Internet. The present invention applies and capitalizes on these two facts by enlisting the use of credit cards, in addition to the use of any other financial account such as a checking or savings account, to pay bills.

When customer bills are presented electronically by the biller and the customer initiates payment on-line, most such bills are paid electronically via ACH. With the present invention, customers now can pay bills with credit cards, enticing credit card-using customers to use the bill payment system of the present invention. The present invention also provides additional payment options such as debit cards, stored value cards, and smart cards, as well as payment from checking or savings accounts. With multiple payment options, the present invention further provides fail-proof bill payment capabilities by allowing customers to set up "backup" accounts. For example, if the integrated EBPP system 50 is unable to process a bill payment with a checking account due to non-sufficient funds ("NSF"), the integrated EBPP system 50 may be set up to then use a credit card account as a backup account to settle the bill.

Bill Payment Component

Figure 17:
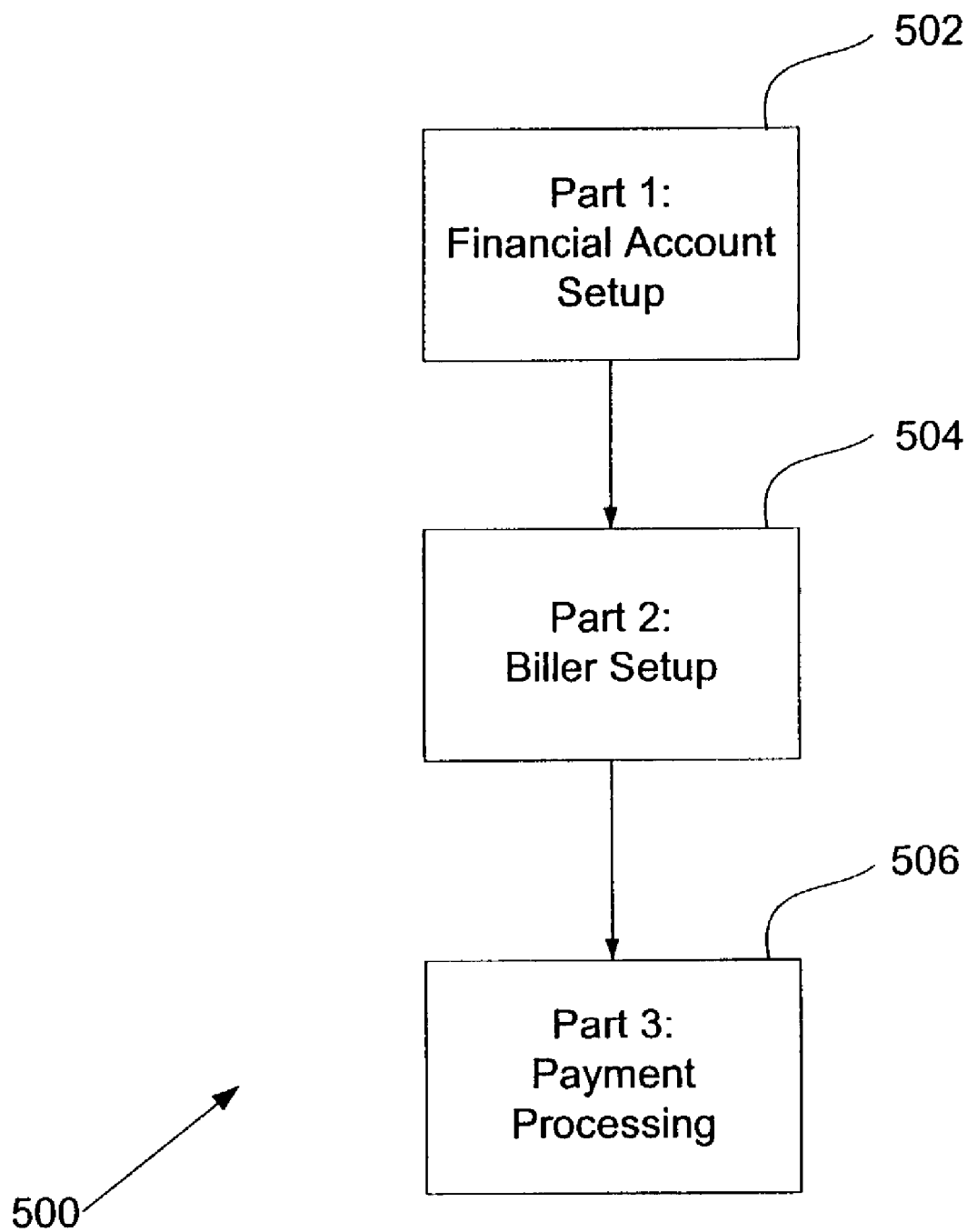
FIG. 17 is a simplified block diagram showing the three components of a bill payment system used by the integrated EBPP system of the present invention.

Referring now to FIG. 17, the following is a detailed description of the bill payment system 500 of the present invention, which may either operate independently of the integrated EBPP system 50 described above, or may be utilized with the integrated EBPP system 50 to operate as a combined presentment and payment system. The bill payment system 500 employs a technology similar to the one used to aggregate and present bills through the use of scraping strategies as described earlier. However, instead of retrieving a copy of a customer's bill from a biller website, the bill payment system 500 uses the customer's access information to initiate payments at biller websites. The integrated EBPP system can initiate any form of payment at biller websites if the appropriate customer information is provided by the customer. For example, the present invention can initiate direct debit payment at a biller website. The fact that in the following description credit card payment is described as an example to enable one skilled in the art to practice the features of the present invention does not limit the scope of the present invention to payment by credit card.

In order to initiate a credit card payment at a biller website, the bill payment system 500 requires the customer's credit card information for the credit card the customer will use to pay the biller and the login information for the biller website. FIGS. 17 through 28 are block diagrams and flowcharts describing the bill payment system 500 which demonstrate the major processes of the bill payment system 500, and show the processes and business rules implemented by the bill payment system 500.

Figure 18:
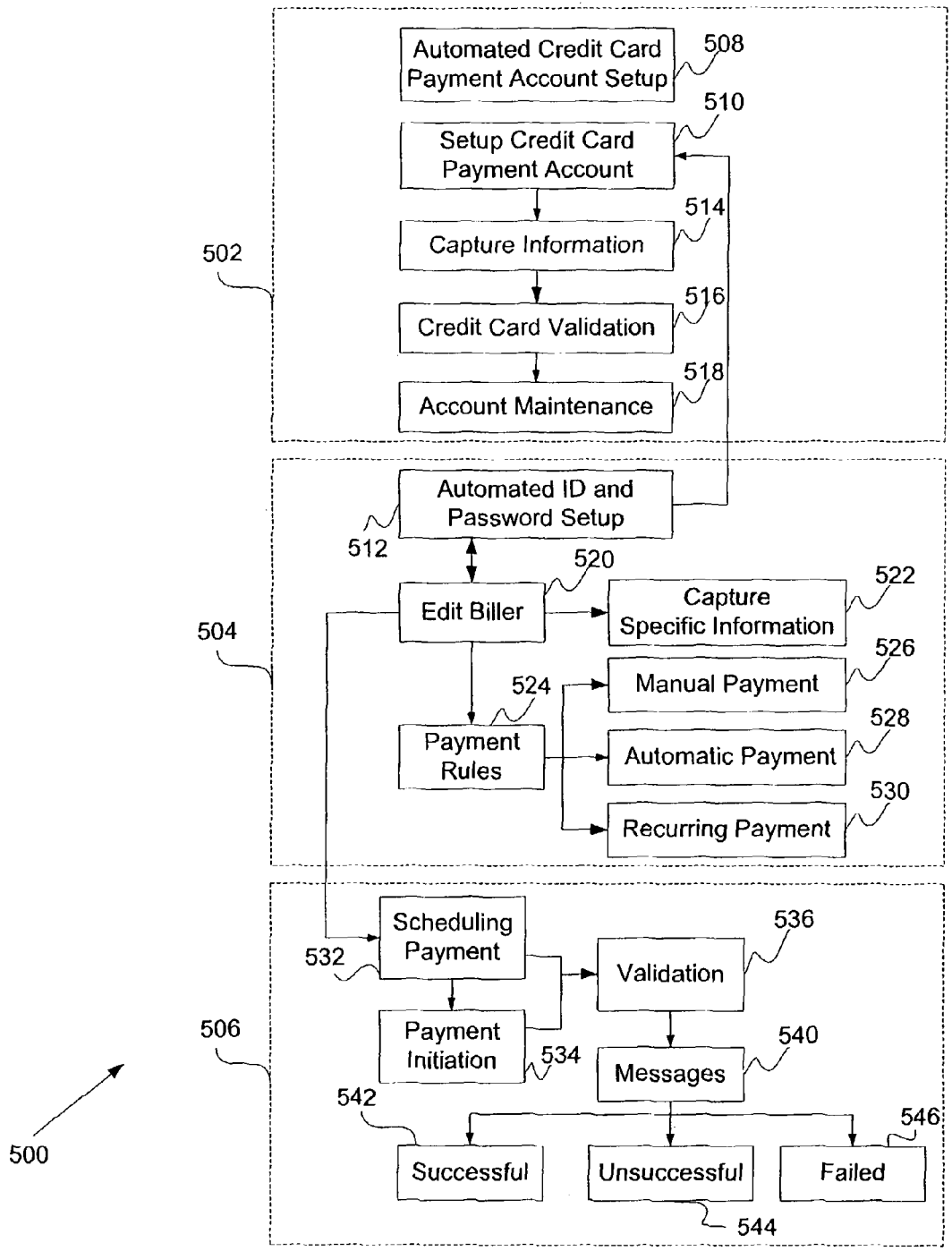
FIG. 18 is an expanded block diagram showing a system/process overview of the bill payment system of the integrated EBPP system illustrated in FIG. 17.

FIGS. 17 and 18 are block diagrams detailing the system and processes of the bill payment system 500. More specifically, FIG. 17 shows that the bill payment system 500 includes three major components, namely a financial account setup component 502, a biller setup component 504, and a payment processing component 506. The financial account setup component 502 functions to set up the customer's payment account, such as, for example, the customer's credit card payment account. The biller setup component 504 functions to set up the individual billers which the customer wishes to pay using the customer's financial account (the credit card payment account) to make credit card payments. The payment process component 506 performs the actual process of scheduling and making the credit card bill payment.

Referring now to FIG. 18, there is shown an expanded block diagram of the bill payment system 500 illustrated in FIG. 17. The financial account setup component 502 includes an automated credit card payment account setup step 508 which allows credit card issuers to share credit card information for the customer accounts that are registered with the bill payment system 500. If customer credit card payment account information cannot be provided or is not provided by the credit card issuer, the bill payment system 500 provides an avenue for setting up the credit card payment account at a setup credit card payment account step 510. When setting up a credit card payment account in the setup account step 510, the bill payment system 500 obtains information from the customer in a capture information step 514 (e.g., credit card account information) which information is required by billers in order to initiate a credit card payment. The credit card account is then validated with the credit card issuer in a credit card validation step 516. The information provided by customers to the financial account setup component 502 may also be edited in an account maintenance step 518.

The biller setup component 504 of the bill payment system 500 includes an automated User ID and password setup step 512 which allows customers that do not have a user account at the biller website to automatically set up online bill payment access with a biller in real-time through the bill payment system 500. It will be appreciated by those skilled in the art that, as is the case with bill presentment, a customer may have previously set up online bill payment with a biller. In this case, the customer information used to access the biller website for payment must be provided to the bill payment system 500. Alternatively, if the customer has not set up a biller for online payment, the bill payment system 500 will do so on behalf of the customer.

In addition to the setting up of online bill payment access in the biller automated User ID and password setup step 512, the biller setup component 504 includes the addition of billers and the editing of existing billers in an edit biller step 520, as well as the entry of payment rules in a payment rules entry step 524. The biller setup 504 allows for individual billers that may require specific information by providing the capture specific information step 522 to capture specific information. The main element of the biller setup 504 is the edit biller step 520, which may capture specific information needed to properly set up a biller for credit card bill payment in the capture specific information step 522. After setting and/or editing information relating to a biller, the customer can proceed to the payment rules entry step 524 in which the user can define whether the credit card payment to the biller website is a manual payment, an automatic payment, or a recurring payment. Each of these payment rules can each have its own setup procedure, namely a manual payment rule step 526, an automatic payment rule step 528, and a recurring payment rule step 530.

The biller setup component 504 includes the capturing of any additional fields specific to the biller which are needed to initiate a credit card payment, outside of the standard set of data collected in the setup of the financial account setup component 502. In the preferred embodiment, all messaging of payment timeframes and processes to the customer that sets his/her expectations for the processes of the bill payment system 500 are performed or provided for in the biller setup component 504. In addition, the biller setup component 504 can also include the option of the biller automated ID and password setup 512.

The biller setup component 504 of the bill payment system 500 allows for the setup of the individual billers for whom the customer wishes to use his/her credit card account to make payments. The biller setup component 504 can acquire the user ID and the password needed to initiate the payments at a biller's website.

The payment processing component 506 performs the actual process of scheduling and making payments on behalf of customers. The payment processing component 506 includes a payment scheduling step 532 performed by the customer which allows the scheduling of the payment of a bill by the customer when after the bill is received in the bill center 96 (FIG. 1). The payment processing component 506 also includes a payment initiation step 534 which initiates the payment of bills at biller websites by the payment processing component 506 of the bill payment system 500.

A validation step 536 verifies the customer's user ID's and passwords at biller websites as well as the timing that the payment processing component 506 of the bill payment system 500 uses to schedule credit card payments. A message step 540 is used to provide messages to customers regarding the status of payments. A message to a customer associated with a successful transaction is sent in a successful message step 542. Likewise, a message to a customer associated with an unsuccessful transaction is sent in an unsuccessful message step 544, and a message to a customer associated with a failed transaction is sent in a failed message step 546.

In the preferred embodiment, the integrated EBPP system 50 is capable of credit card bill payments by including appropriate credit card payment functionality in the bill payment system 500, the financial account setup component 502, and the biller setup component 504 of the bill payment system 500. With the integration of the EBPP system 50 and the bill payment system 500, the present invention can make use of the existing logic that captures User ID and password information (FIG. 2) from a customer from biller websites. Also, the bill payment system 500 may also use the existing logic of the automated user ID and password setup 490 (FIG. 15) of the integrated EBPP system 50.

Alternatively, a customer interface may be provided by the bill payment system 500 for allowing EBPP solutions without scraping capabilities to be set up for credit card bill payments using the bill payment system 500. If the customer chooses to set a biller up for credit card bill payment, the customer will need to be prompted to enter the customer user ID and password for the biller website. If the customer does not have a user ID and password, there will be a link to the biller's enrollment page for online account access. Alternately, the system may include functionality to automatically set up the customer account for payment on the biller website.

For the integrated EBPP system 50 that the customer has chosen to set up for online billing and has already provided his/her user ID and password for the biller web site, the validation step may be skipped. This is because the integrated EBPP system 50 has previously captured and validated the customer's user ID and password through the normal integrated EBPP system 50 setup process as discussed earlier.

Any additional values and/or information needed by a biller that were not provided in the credit card payment account setup can be captured in the payment processing component 506 as well. The new value/information is stored in a database table, because the newly captured information will be needed specifically for the biller. The present invention may also provide a link to specific credit card account information so that the customer has the chance to confirm and/or modify, if necessary, the information contained in the payment account.

Financial Account (Credit Card) Setup

Figure 19:
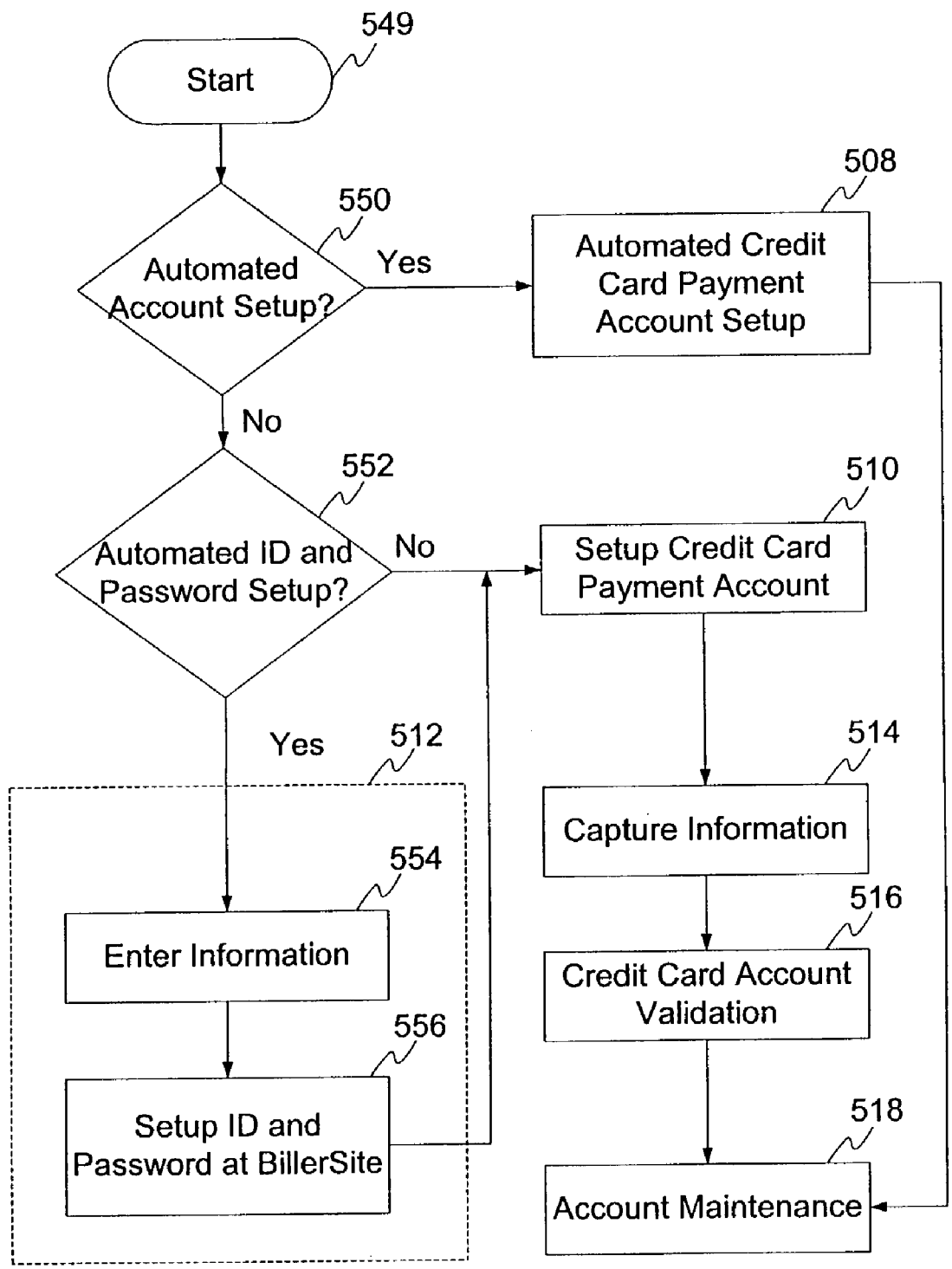
FIG. 19 is a flowchart showing the credit card setup component of the bill payment system illustrated in FIGS. 17 and 18.

FIG. 19 shows an overview of the process of the financial account setup component 502 in which the steps necessary to activate a credit card account for the bill payment system 500 are shown. Beginning at a process initiation step 549, the bill payment system 500 determines whether the credit card account setup process will be automated in an automated account setup determination step 550. If the credit card account setup process is to be automated, then the process moves to the automated credit card payment account setup step 508, and, following its completion, to an account maintenance step 518. If, on the other hand, the credit card account setup process is not to be automated, then the process moves instead to an automated setup determination step 552 in which the billing system 500 determines whether or not there will be an automated ID and password setup.

If the customer already has an account set up with the biller at the biller website, the automated setup is not necessary, and thus the system moves to the setup credit card payment account step 510. The system then captures the necessary information (i.e., user ID and password) in the capture information step 514, performs a credit card account validation check in the credit card validation step 516, and executes any required account maintenance routine in the account maintenance step 518. If, on the other hand, the system determines that the customer has not previously set up an account with the biller at the biller website, then the process moves to steps contained in the biller automated User ID and password step 512 (FIG. 18). The first of these steps prompts the customer to enter his/her customer information in an enter information step 554. Using the customer information entered in the enter information step 554, the process then sets up a User ID and password for the customer at the biller website in a setup account step 556 and then performs steps 510, 514, 516, and 518.

Figure 20:
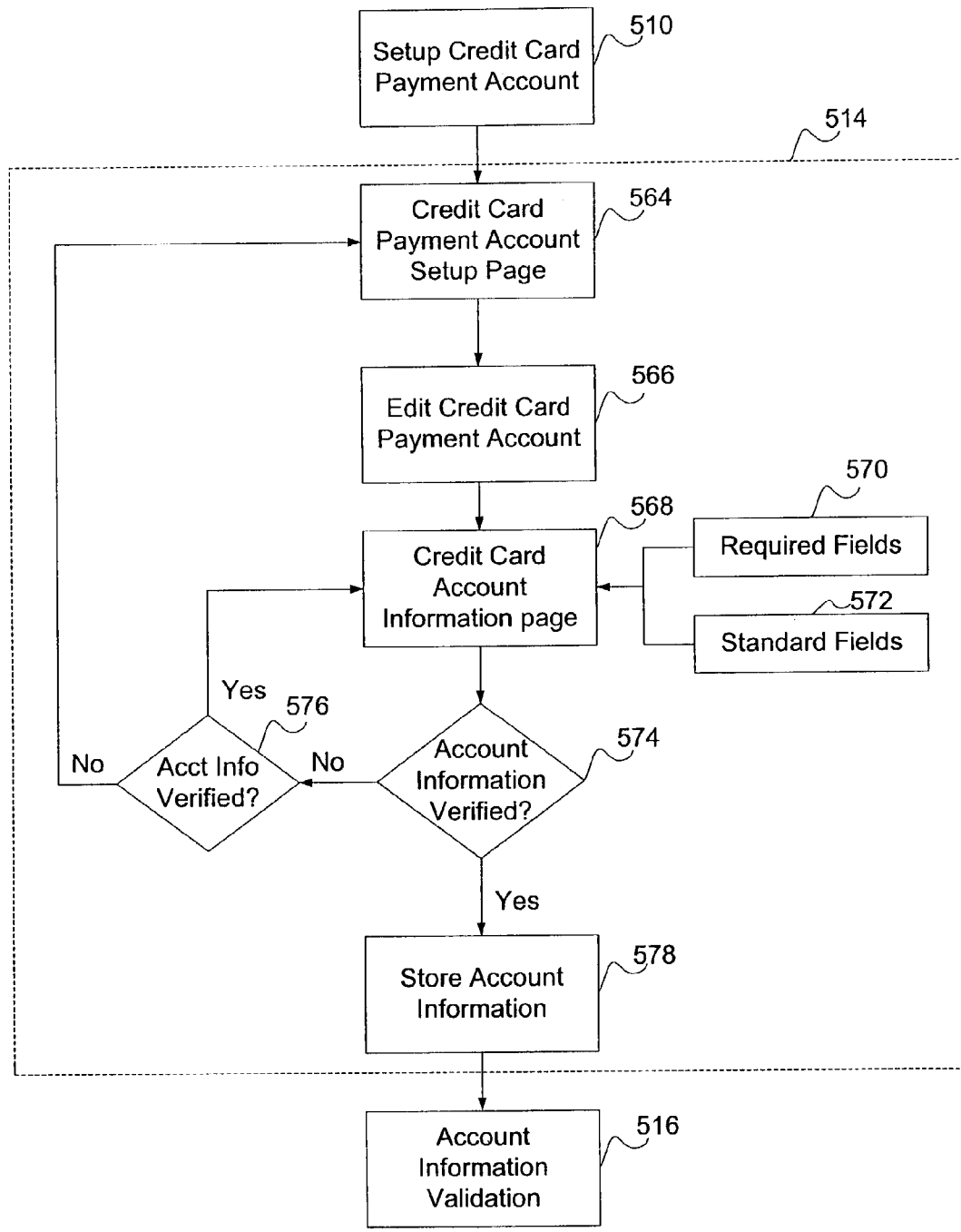
FIG. 20 is a flowchart showing the process of capturing information to set up a credit card payment account performed in the bill payment system illustrated in FIGS. 17 and 18.

Referring next to FIG. 20, the process of setting up a credit card payment account in the setup credit card account step 510 of the bill payment system 500 is illustrated. In order for a customer to initiate credit card bill payment with the bill payment system 500, the customer must first set up a credit card payment account. The credit card payment account will be used much like how a checking account could be used. The credit card payment account information can be stored in the database of the bill payment system 500 and can be accessed to initiate credit card payments when authorized or scheduled by the customer. It is apparent that the manual process of setting up a credit card payment account applies to bill centers that are unable to retrieve credit card payment account information from the credit card issuers.

When setting up a credit card payment account, the bill payment system 500 captures credit card account information from the customer in order to use the account to initiate credit card payments. The captured credit card account information can include a credit card account number, a credit card type, an expiration date, a customer name as it appears on the credit card, a card security code printed on the card, a billing address for the credit card, a social security number, a home telephone number, a work telephone number, an e-mail address, and other information such as the customer's mother's maiden name. Similar to the automated process of the credit card payment account setup 508, the credit card account number, the security code, and the social security number can be encrypted. Furthermore, the credit account information entered must, preferably, at a minimum, pass the appropriate Mod 10 routine when submitted by the customer. The security code refers to the typically three or four digit number that is printed on the front or back of the credit card. In the preferred embodiment, the billing address must match the address the credit card issuer has for the account in order for the credit card to be valid for use with the bill payment system 500.

To set up a credit card account for bill payment, a credit card payment account setup page is displayed to the customer in a display setup page step 564. The customer has the option of adding or editing information related to a credit card for use in bill payment account in an edit step 566. If the customer chooses to add and/or edit a credit card for payment account for use in bill payment, the bill payment system 500 next requests the credit card information at a credit card account information page in a credit card information step 568. Here the customer will be required to enter standard credit card information in required fields entry step 572 and in standard fields entry step 572. The credit account information step 568 may include both required fields, entered in the required fields entry step 570, wherein the customer may not proceed further in the setup credit account process shown without entering the required information, and additional information in the standard fields entry step 572.

The entered information, including the credit card number, is verified and verification is determined in a verification determination step 574. If the account information cannot be verified in the verification determination step 574, the bill payment system 500 then again attempts to verify the account information in a verification determination step 576. If the account information cannot be verified in the verification determination step 576, then the bill payment system 500 takes the customer back to the credit card payment account setup page in the display setup page step 564, where the customer is given the option of editing and/or adding another credit card for bill payments. If, on the other hand, the account information is verified in the verification determination step 576, the system returns to the credit account information step 568, where the customer will again be prompted to enter standard credit card information. Returning again to the verification determination step 574, if on the other hand the account information is verified, the account information will then be stored in a store account information step 578. After the account information is stored, the process moves to the credit card validation step 516 (which will be explained later in the validation process).

When the customer submits the information as described above, the bill payment system 500 applies the appropriate Mod 10 routine to validate the credit card account number. The validation of the credit card account number ensures that the account number is a valid number (e.g., a 15 or 16 digit credit card account number). Depending on the card issuer, the bill payment system 500 may also validate that the card security code was entered properly. The type of credit card that is being set up dictates the proper length of the security code and the number of digits in the credit card account number. For example, American Express requires a 4-digit security code along with a 15-digit account number, while Visa and MasterCard require a 3-digit security code along with a 13-digit or 16-digit account number.

In the preferred embodiment, credit card issuers share credit card information for customer accounts that are signed up for the bill payment system 500. Facilitating the sharing of customer account information avoids the need to have customers enter credit card account information a second time on the card issuers' website or on the bill center 96. Preferably, the sharing of customer account information is implemented in real-time to speed up the process of setting up a customer account at the bill center 96 or at the card issuer's website.

In the preferred embodiment, the bill payment system 500 implements a sign-on request form for the automated credit card payment account setup step 508 (FIG. 19). The sign-on request form facilitates the retrieval of account information that is required by the biller website that is needed to initiate credit card payments on behalf of the customer. The data elements required by the biller website 92 can be contained in the HTTP Post in the sign-on request form. These data elements can be stored to the bill payment system 500 database, and are used when initiating credit card payment at other biller websites. Preferably, the data elements that can be requested by the sign-on request form include a credit card account number, a credit card type, an expiration date of the credit card, a security code associated with the credit card, a customer name as it appears on the credit card, a billing address for the credit card, and a social security number. The credit card account number, the security code, and the social security number may be encrypted to further protect the customer from fraud and enhance privacy.

Those skilled in the art will recognizes that the process of capturing these data elements from credit card issuers is largely determined in part by the card issuer's systems and capabilities. If this process is available, the customer can skip the manual process of setting up a credit card payment account and the credit card validation process.

Whether or not a credit card number represents an active credit or deposit account, and whether or not the credit card account has a sufficient line of credit or balance to cover a payment, can only be answered by a clearinghouse or credit card processor with access to a banking system of which the credit card issuer is also a participant. However, because issuers of credit cards follow certain rules when creating card numbers, it is possible to verify whether a given number is accurate or cannot possibly be a number of the stated type. The present invention uses the customer information to check a given credit card number and thereby catch and prevent any errors the customer might have made in typing it into the form before the credit card is used to settle bills.

Figure 21:
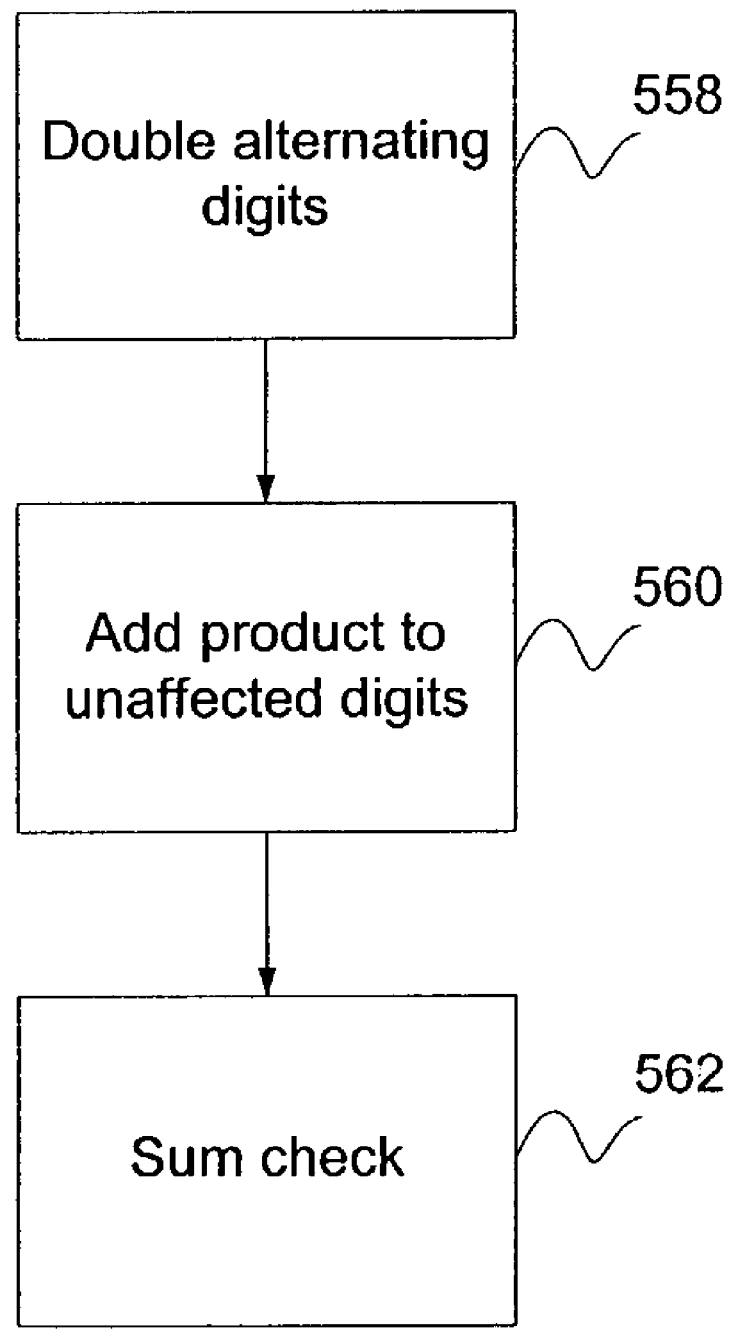
FIG. 21 is a flowchart outlining the major steps used to validate credit card numbers in the credit card validation process performed in the bill payment system illustrated in FIG. 18.

FIG. 21 illustrates a procedure for verifying the accuracy and validity of credit card numbers, which is preferably accomplished using a Mod 10 algorithm. Most credit card numbers are encoded with a "check digit." A check digit is a digit added to a number (either at the end or the beginning) that validates the authenticity of the number. A simple algorithm is applied to the other digits of the number which yields the check digit. When a user has keyed in a credit card number, the bill payment system 500 will validate the credit card number before sending for debit authorization.

The first step in validating the credit card account number is to double the value of alternate digits of the primary account number beginning with the second digit from the right (the first right-hand digit is the check digit), which is performed in a double alternating digits step 558. Next, the individual digits comprising the products obtained in the double alternating digits step 558 are added to each of the unaffected digits in the original credit card account number in an add products step 560. Finally, the total obtained in the double alternating digits step 560 is checked to verify that it is a number ending in zero (e.g., 30, 40, 50, etc.) in order to validate the account number in a sum check step 562. If the result is exactly divisible by 10 (that is, if the result ends in a zero), then the credit card number is valid, providing that it is of the correct length and bears a correct prefix for that type of card.

The bill payment system 500 may also validate the account number using the credit card issuer's bin ranges which are provided by the credit card issuer. This ensures that the credit card entered is actually a credit card from the credit card issuer. Alternatively, validation of credit card numbers using the credit card issuer's bin ranges ensures that only the card issuer's cards can be used as a credit card payment account for a billing center established by a credit card issuers. For example, an American Express Bill Center likely will only allow customers to set up an American Express credit card as a payment account, and likewise a Citibank Bill Manager would only allow customers to set up a Citibank credit card as a payment account.

In conjunction with capturing the information from the customer's credit card, there are common data elements that may be required at many biller websites which must be provided in order to initiate a credit card payment. In the preferred embodiment, these fields are captured at the time of the setup of the payment account so that these elements can be used as a pool of data and applied accordingly to each biller's requirements. This feature alleviates the need to capture the same data elements over and over for each biller the customer adds to his/her account for which the customer chooses to use his/her credit card payment account to initiate payments. These fields may remain constant, and certain fields may be added as more billers are added to the credit card bill payment list. Each biller will be set up to use the fields required at its website to initiate the credit card payment.

For credit card issuers that will automatically provide credit card account information, these items may be incorporated in to the process, along with the credit card account information. This information may be incorporated into the financial account setup component 502.

The credit card validation step 516 applies to bill centers that are unable to provide the bill payment system 500 with customer credit card payment account information. As shown in FIGS. 19 and 20, once a customer has set up his/her credit card payment account, the account will need to be validated with the credit card issuer. This may involve the sharing of the account information provided to the bill payment system 500 with the card issuer. The bill payment system 500 may send the account information to the card issuer in the desired format using Extensible Mark-up Language ("XML"), OFX, IFX, or an American Standard Code for Information Interchange ("ASCII") fixed length file. This process may take place on a daily basis, validating any new payment accounts that have been added that day.

The credit card validation step 516 works much like the pre-note process currently used for Automated Clearing House ("ACH") payment accounts. ACH is a secure payment transfer system that connects all U.S. financial institutions. The ACH network is a crucial link in the national banking system. The ACH network acts as the central clearing facility for Electronic Fund Transfer ("EFT") transactions that occur nationwide. It is here that payments linger in something akin to a holding pattern while awaiting clearance for their final banking destination. Thousands of financial institutions transmit or receive ACH entries through ACH operators such as the American Clearing House Association, the Federal Reserve, and the Electronic Payments Network.

Using ACH as a model, a credit card account may not be eligible to initiate transactions until the card issuer has positively validated it. In the preferred embodiment, in the event that the account is rejected, the customer will be notified via e-mail that the account was rejected. The rejection reason text will be included in the e-mail, and the customer will be expected to return to his/her bill center 96 and update the account information. At that time the account will be revalidated in the next process run between the bill payment system 500 and the credit card issuer.

Regardless of how credit card account information is captured by the bill payment system 500, all credit card payment accounts will need to be updated by the card issuer to the bill payment system 500 on a regular basis. This process ensures that the bill payment system 500 has the most current and up-to-date credit card account information that is needed to make payments on the customer's behalf. The card issuer can use XML, which is a subset of the Standard Generalized Markup Language ("SGML") for creating a document structure, OFX, which is a specification for electronic exchange of financial data over the Internet, or an ASCII fixed length file to update the bill payment system 500 daily with enrolled customer credit card account information. Name and address changes, account number updates, lost or stolen cards, and expiration date updates are some of the elements that the credit card issuer must regularly update the bill payment system 500 on a daily basis. These updates ensure that the bill payment system 500 database is in-sync with the credit card issuer's database and has the correct account information for payments. Preferably, this maintenance takes place on a daily basis prior to the daily payment processing. The bill payment system 500 may use the updated information to keep the customer's credit card payment account current. It is apparent that the maintenance process may be determined in large part by the credit card issuer's systems and capabilities.

If desired, the credit card payment account may not be eligible to be made the default payment account for the customer's bill center account. For example, it may be preferable that only checking accounts may be set as a default payment account for the bill center 96. However, credit card payment accounts may be eligible to be set as the default payment account on a biller-by-biller basis. For example, using the process of the biller setup component 504, the customer can set his/her credit card payment account as the default payment account for a biller. Only billers that are set up for credit card payments will allow the customer the option of setting his/her credit card payment account as the default payment account.

Automated Setup of User ID and Password

For users that do not already have a user ID and password for a biller website, the biller automated User ID and password setup step 512 may be used to automatically set up online access for a customer's account with the biller. In one embodiment, the bill payment system 500 can capture the information from the customer that is necessary to set up online access with the biller. The bill payment system 500 will use the information the customer has already provided to set up his/her bill center account and prompt the customer to enter any additional information necessary to set up the account for online access at the biller website.

When adding a biller to the bill center 96, a customer that chooses to set up the biller for credit card bill payment will be prompted for his/her user ID and password. If the customer does not have a user ID and password with the biller, the customer will have the option of setting up an account (e.g., a user ID and password) with the biller website through the bill center 96. If the customer chooses the option of the biller automated User ID and password setup step 512 (FIGS. 18 and 19), the customer will be prompted to enter information that is necessary to set up a user ID and password at the biller website, such as a first name, a last name, a middle initial, a billing address, a home phone number, a social security number, an e-mail address, a secret identifier (i.e. mother's maiden name, pet's name etc.), a preferred user ID, and a preferred password. The logic of what information is required is based on the biller website. The present invention can aggregate information required by way of a standard, generic form, and then transmit only information that is required by the biller website. This methodology ensures that the present invention remains flexible in how it communicate, transmit, and retrieve data from the biller website.

Figure 22:
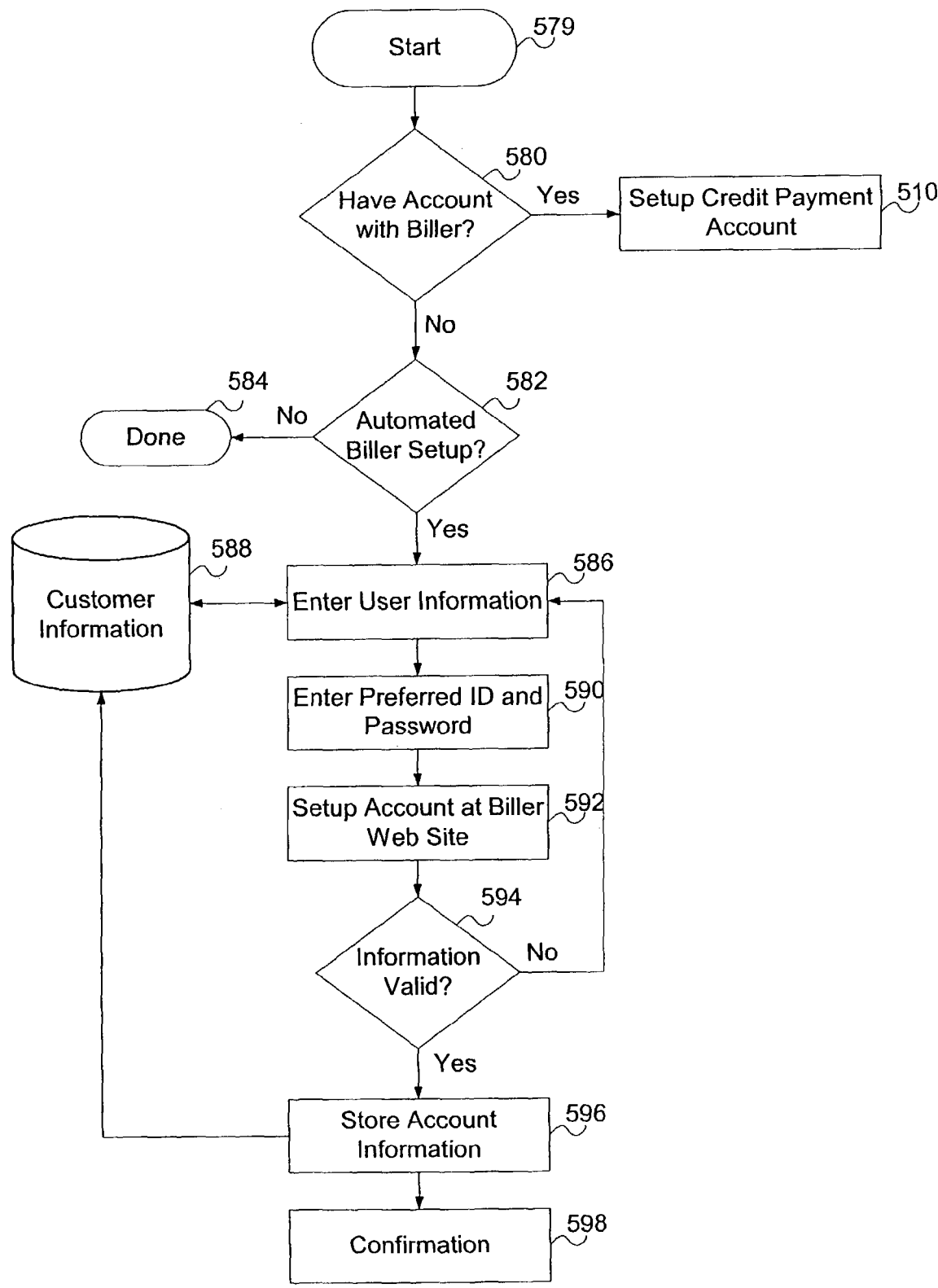
FIG. 22 is a flowchart showing steps in the automated ID and setup process performed in the bill payment system illustrated in FIG. 18 to add billers selected by the user.

Referring now to FIG. 22, which shows the details of the biller automated user ID and password setup step 512 in the biller setup component 504, the customer can set up an account with the biller website if he/she does not have a customer account previously registered with the biller website. Beginning at a process initiation step 579, the bill payment system 500 first asks the customer whether he/she has an account with the biller in a biller account determination step 580. If the customer indicates that he/she has an existing account with the biller, then the process moves to the setup credit card payment account step 510 where the customer can proceed to set up the bill payment system for credit card payment of bills to the biller.

If, on the other hand, the customer does not have an account set up with the biller at the biller website, then the process moves to an automated biller setup determination 582 where the bill payment system 500 asks whether the customer wants the bill payment system 500 to automatically set up an account with the biller for the customer. If the customer chooses not to set up an account with the biller, then the process ends in a process completion step 584. If, on the other hand, the customer chooses to allow the bill payment system 500 to automatically set up an account with the biller, the bill payment system 500 will prompt the customer for the customer's user information for the biller website in an enter user information step 586. Preferably, the bill payment system 500 interfaces with an existing database and retrieves customer information in a customer information database 588, if any exists, that is relevant to the automated ID and password process. Using the retrieved customer information or the customer information entered by the customer user in the enter user information step 586, the bill payment system 500 next prompts the customer to enter a preferred user ID and password in a enter user logon information step 590.

The bill payment system 500 uses the information entered by the customer to set up a user ID and password for the user account at the biller website, and attempts to use the preferred user ID and password entered by the customer in a set up account step 592. If the user ID and password entered by the customer are not valid or available at the biller website, the bill payment system 500 automatically creates a new user ID and a new user password by versioning up the user ID and randomly creating a password that meets the biller's requirements in the set up account step 592. The bill payment system 500 will automatically create a new user ID only if the user ID is invalid, and create a new password if only the password is invalid.

A determination is made as to whether the information entered by the customer is valid in a valid information determination step 594. If the information is valid, an account has been set up at the biller website, and the bill payment system 500 stores the account information in a store account information step 596, and then confirms to the customer that an account has been set up for him/her at the biller website 92 in a confirmation step 598. The account information can also be used to update the information stored in the customer information database 588. If, on the other hand, neither the bill payment system 500 nor the biller website can validate the customer account information in the valid information determination step 594, then the customer is prompted to review and revise the information submitted in the enter user information step 586.

In the preferred embodiment, the biller automated user ID and password setup step 512 is performed in real-time once the customer provides all of the appropriate information. Similar to the automated user ID and password setup 490 (FIG. 15), the bill payment system 500 can set up the login information at the biller website while the customer is still in the bill center session. Thus, the bill payment system 500 facilitates real-time online setup of the user ID and password. Any errors encountered at the biller website will be messaged immediately to the customer and will require the customer to correct any necessary information. Once the customer has corrected any necessary information, the customer can re-submit the enrollment process.

For any accounts that are unable to be set up using the preferred real-time setup method, an automated process may be run on a nightly basis to set up user ID's and passwords for each biller website for all customers for whom the bill payment system 500 was unable to set up in real-time.

Again, applying the concept of the automated user ID and password setup 490 for bill scraping, if the biller website is unavailable at the time the user is setting up their account, an error message is displayed to the customer explaining the issue. The customer information is stored and the bill payment system 500 schedules the enrollment setup process during the next automated enrollment setup.

If the process is unable to properly set up the customer's login access to a biller website due to a problem with the biller website, the account will be rescheduled for the following day. The process will continue to do so on a daily basis until the problem with the biller website is corrected. The customer will not be eligible to make credit card payment transactions to this biller until this process has been completed.

If an error occurs as a result of the customer providing invalid information, the customer will be notified via e-mail that the bill payment system 500 was unable to establish a login for the biller website. The customer will need to update the customer account information for the biller website and resubmit his/her enrollment request. The customer will not be eligible to make credit card payment transactions to this biller until the process has been completed.

Once the customer's online account has been established with the biller at a biller website, the customer will be e-mailed a confirmation notice providing the customer with the user ID and password that was established at the biller website by the bill payment system 500.

In the preferred embodiment, when a customer is adding a new biller, the customer will be alerted to the option of paying the biller using his/her credit card. This will only be for billers that have been enabled for bill payment, and for customers at corresponding bill centers that have been activated for credit card bill payment. The messaging will come during the normal process the customer uses for setting up the biller.

There may be a promotional page displayed to the customer describing credit card bill payment and the advantages of setting up their account. The promotional page may be displayed to any customer setting up a biller that is eligible for credit card bill payment in the bill center 96. From the promotional screen, the customer can choose to select to set the biller up for credit card bill payment.

If the customer chooses to set up the biller for credit card bill payment, the customer will be presented a copy of any terms and conditions from the biller website that pertain to credit card bill payment. The customer will need to agree to the terms and conditions for the biller website in the bill center 96. The acknowledgement to the terms and conditions will be stored by a database in the bill payment system 500 for audit purposes.

Figure 23:
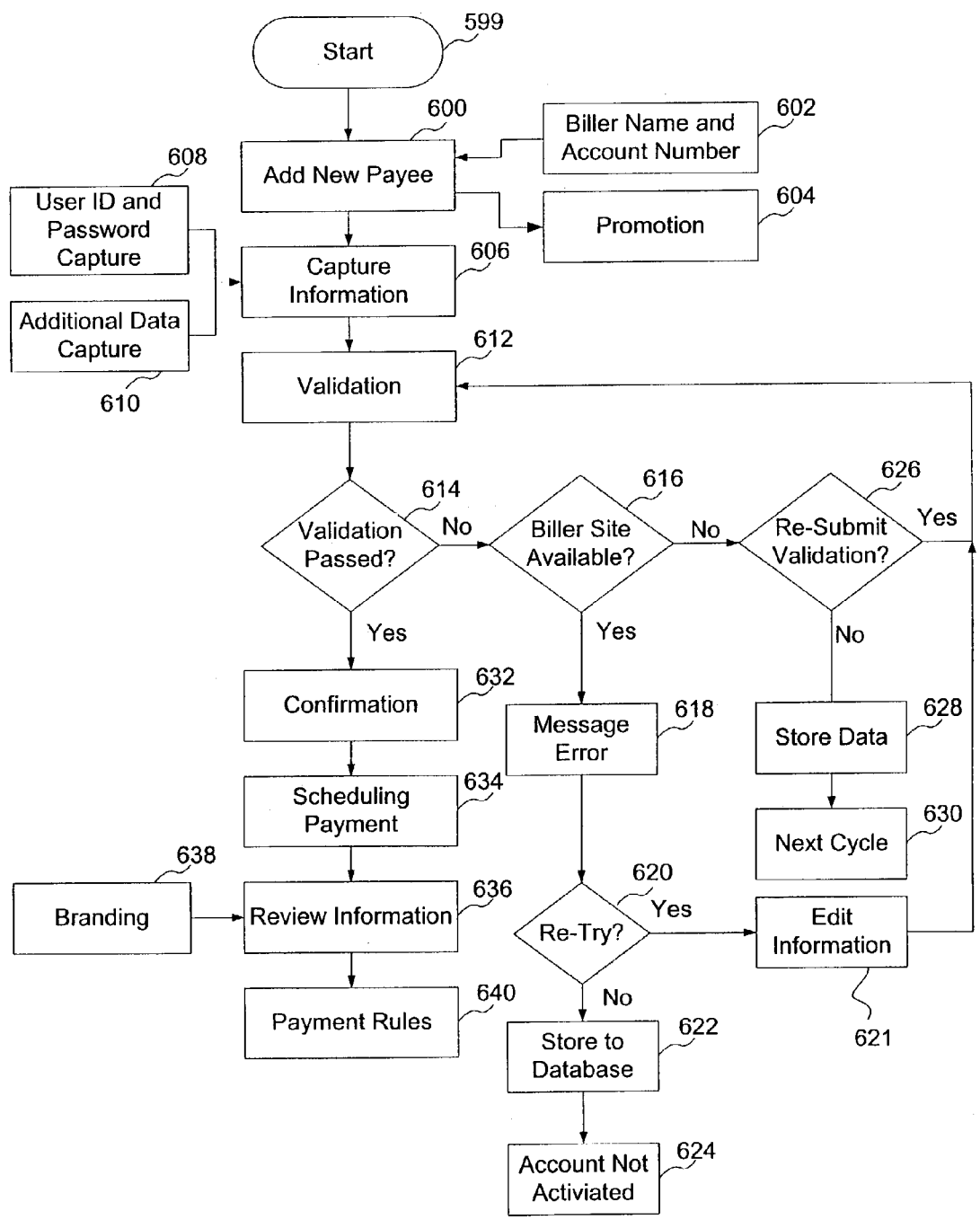
FIG. 23 is a flowchart showing the edit biller process performed in the bill payment system illustrated in FIG. 18.

Referring next to FIG. 23, a flowchart outlining the edit biller step 520 performed in the bill payment system 500 is illustrated. The process of editing a biller for credit card bill payment starts with an initiate process step 599, and moves to an add new payee step 600. The customer is prompted to enter a biller name and account number in enter biller information step 602, and may be presented with a promotion in a present promotion step 604 (e.g., discounts for new users, advertisements, display of advantages and benefits of the bill payment system, etc.). The customer can add a biller using the enter biller information step 602, as well as other information that may be necessary to add and verify a payee. Next, the bill payment system 500 captures additional information in a capture information step 606. The customer may be prompted to enter a user ID and a password in an enter user information step 608, and other additional data in an enter additional data step 610, all of the date entered being required to access the biller website for payment. The information captured in the capture information step 606 is then validated in a validation step 612.

If the captured information 606 is not validated in a validation determination step 614, the bill payment system 500 determines whether the biller website is available in a biller website availability determination step 616. If the biller website is not available, the bill payment system 500 makes a determination as to whether or not to revalidate the captured information in a revalidation determination step 626. If it is determined in the revalidation determination step 626 that revalidation is necessary, the process returns to the validation step 612. If, on the other hand, it is determined in the revalidation determination step 626 that revalidation is not necessary, then the bill payment system 500 stores the data in a store data step 628, and waits to revalidate the captured information in a wait till next cycle step 630.

Returning to the biller website availability determination step 616, if it is determined that the biller website is available, then the bill payment system 500 produces an error message in a display error message step 618. The bill payment system 500 then determines whether to retry validation in a retry determination step 620. Alternatively, the bill payment system 500 could ask the customer whether to retry the validation. If a retry is chosen in the retry determination step 620 (either automatically or by the customer), the customer can choose to edit the captured information in an edit information step 621 before the process returns to the validation step 612. If, on the other hand, retry is not selected in the retry determination step 620, then the bill payment system 500 stores the captured information in a database in a store information step 624. The bill payment system 500 then notifies the customer that the account has not been activated in an account not activated notification step 624.

Returning to the validation determination step 614, if the captured information is validated, then a confirmation is sent to the customer notifying the customer that a new payee has been added in a confirmation step 632. After the confirmation step 632, the customer can schedule a payment in a schedule payment step 634. After scheduling a payment in the schedule payment step 634, the customer can review the information in a review information step 636, which may include the display of branding information to the consumer in a display branding information step 638. The branding information may be use to promote the bill payment system 500, or any other products and/or services, including credit card payment. The customer can also set up payment rules for the biller in a payment rules step 640 once the captured information has been validated.

Payment Rules Setup

Once the customer has finished setting up the biller for credit card payments (FIGS. 19 through 23), the customer can choose the payment rule the customer plans to use to initiate credit card payments to the biller at the biller website. The customer can choose the option of manual, automatic, or recurring payments. With manual payments, the customer needs to login to the bill center 96 and manually schedule a credit card bill payment transaction. If the customer chooses automatic payments, the credit card bill payment transaction is automatically scheduled by the bill payment system 500 based on the conditions determined by the customer. Preferably, the customer needs to have selected online bill delivery for the biller in order for the automatic payment process to work effectively. With recurring payments, the customer sets a date and an amount of the payment that will be automatically scheduled by the bill payment system 500. Payments are made for the set amount determined by the customer, and can be scheduled on a weekly or monthly basis.

In the preferred embodiment, the bill payment system 500 sends a message to the customer indicating that payments should be scheduled four business days in advance of the bill due date. The message reminder ensures that proper processing time will be allocated. The message reminder also allows extra time for the bill payment system 500 to schedule the payment at the biller website in event a problem is encountered at the biller website. Such problems could include the user ID and password not being recognized by the biller at the biller website, a website outage at the biller website, or a processing problem that may occur at the biller website. Ultimately, the message reminder enables the bill payment system 500 to notify the customer of a problem with the credit card payment transaction in time to allow the customer to initiate a payment to the biller through other means (e.g., via checking account or a debit card established with the bill payment system 500).

Validation of the User ID and Password

Every customer that chooses to set his/her billers up for credit card bill payment needs to provide a user ID and password for each biller website. The user ID's and passwords need to be validated at the biller websites after providing the information to the bill payment system 500. The bill payment system 500 logs into each biller website using the user ID and password provided by the customer in order to verify that the account number the customer entered at the bill payment system 500 matches the account number on the biller website.

If the user ID and password are not recognized by the biller website or if the account number the customer entered at the bill center does not match what is on the biller website, the customer will receive an error message from the bill center 96. The error message reports the error received from the biller website to the customer. The customer can make any changes necessary and resubmit his/her request. The customer can also choose not to complete the validation step, thus not setting up the biller for credit card bill payment.

For customers that set up the biller with the integrated EBPP system 50, the user ID and password would have already been validated at the biller website 92. Therefore, the validation step need not take place.

If a biller website is inaccessible at the time the customer sets up the biller, a message is displayed to the customer, informing the customer that the process of validating the login information with the biller has failed and that the system will attempt to revalidate the login information at a later time. The customer will be able to complete the setup process for the biller, but the biller will not be set up for credit card bill payment until the validation process has taken place.

Scheduling Payment

In the preferred embodiment, bills need to be scheduled for payment on a business day. Credit card bill payments are made on business days, and will preferably follow the U.S. Federal Reserve Holiday Schedule. If a payment is scheduled on a non-business day, a message will appear to the customer alerting the customer that payments can only be scheduled on business days. The payment is then scheduled for the next business day following the date the customer scheduled payment. The scheduled payment date is recorded as the payment date in the database and is used to initiate the credit card bill payment transaction.

When the customer schedules a payment, a message is presented to the customer to recommend that the customer schedule the payment four days in advance of the bill due date. A message may be optionally presented that briefly describes the credit card bill payment process to the customer. In one aspect, the message may state that it could take the bill payment system 500 up to two days to process the payment at the biller website. The message can also state that the customer will be notified immediately if the payment can not be scheduled two days after the payment date and that the customer needs to return to the bill center 96 to reschedule the payment.

Once the payment is scheduled, the customer bill may be moved to the customer's Outbox. The customer can stop or modify the payment while the bill is in the customer's Outbox.

In the preferred embodiment, if a customer schedules a payment after a cut-off time (for example, 3:00 PM EST), the payment will be processed on the next business day.

Figure 24:
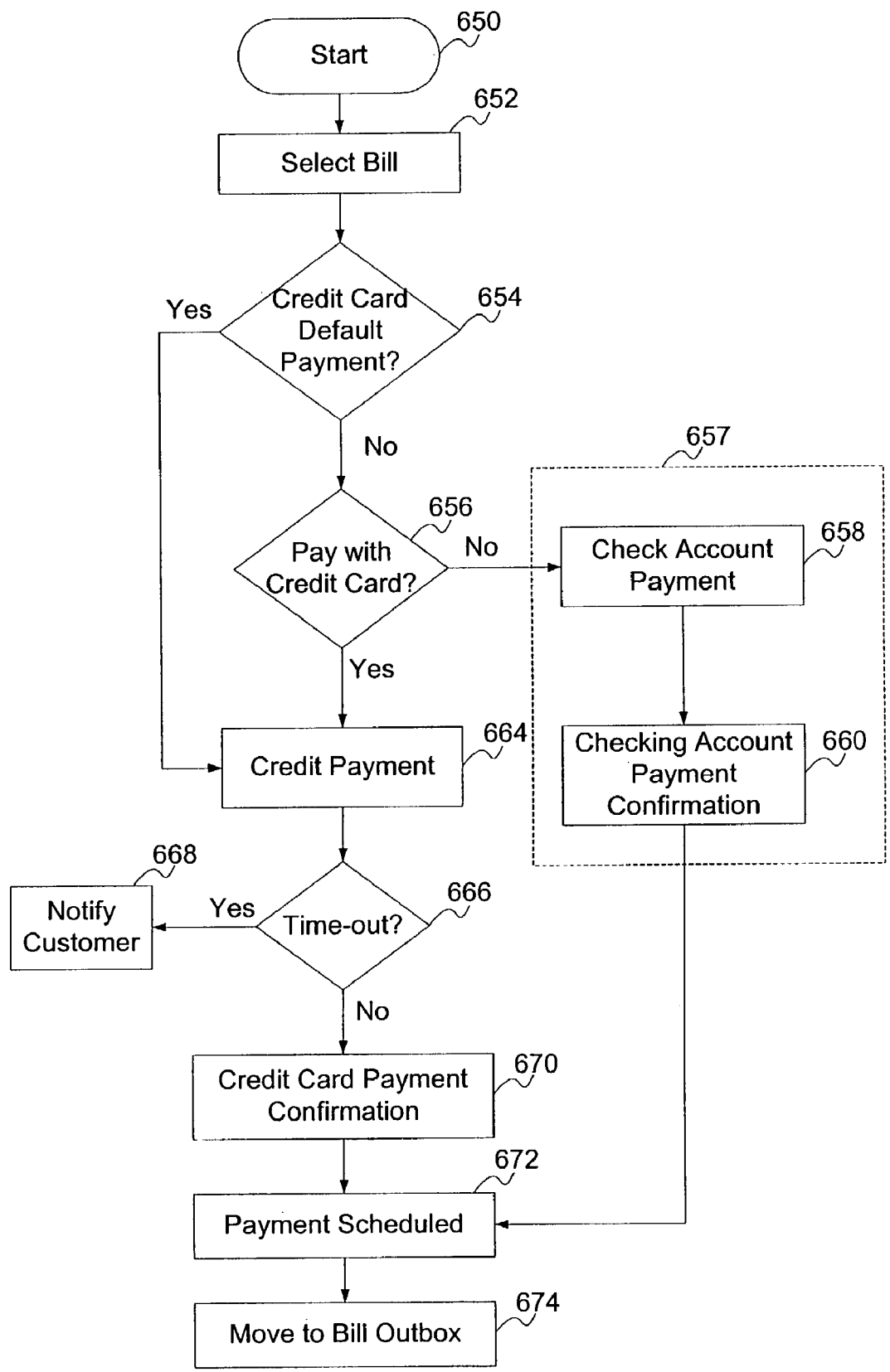
FIG. 24 is a flowchart showing the scheduling payment process performed in the bill payment system illustrated in FIG. 18.

Referring now to FIG. 24, there is shown a flowchart illustrating the steps of scheduling a payment. The flow starts at a process initiation step 650 where the customer selects a bill from the bill inbox for scheduling payment thereupon in a select bill step 652. The bill payment system 500 then determines whether a credit card has been designated as the default payment method in a determine credit card payment status step 654. If a credit card has not been designated as the default payment method, the bill payment system 500 then allows the customer to schedule the payment with a credit card in a select credit card determination step 656. If the customer does not schedule payment with a credit card in the select credit card determination step 656, then the he/she is prompted to schedule payment via a checking account in a checking account payment step 658. Following the scheduling of payment via checking account, a checking account confirmation step 660 is performed to send a notification of the scheduled payment via checking account to the customer. The process then moves to a payment scheduled step 672 in which payment via the checking account is scheduled, and the bill is then moved to the bill outbox in a move to bill outbox step 674. On the scheduled payment date, the bill payment system 500 will execute the payment by either issuing a check, draft, or by using EFT (with the method used being predetermined).

Although the checking account payment option shown as an alternative to credit card payment in the steps included within the area identified by the reference numeral 657, it is apparent that the components in this area can be replaced by other payment options such as a debit card, a stored value card, or a smart card.

Returning to the select credit card determination step 656, if the customer wants to pay with a credit card, then the process moves to a credit payment step 664 to allow the customer to schedule a bill for credit card payment. Similarly, if in the determine credit card payment status step 654 the credit card has been set up for default payment, the process will also move to the credit payment step 664 to allow the customer to schedule a bill for credit card payment. A preset timeout is implemented in a timeout step 666 for security in which the bill payment system 500 will notify the customer in a customer notification step 668 if the credit card bill payment is not scheduled within a predetermined time limit. If the customer schedules the bill for credit card payment before the timeout at step 666 occurs, then a credit payment confirmation is issued in a confirmation step 670, and the bill is scheduled for payment in the payment scheduled step 672. The bill is then sent to the bill outbox for processing in the move to bill outbox step 674.

Payment Initiation

A customer can also set up a biller for credit card bill payment through the payment initiation process 534 (FIG. 18). Biller setup can take place during the payment initiation 534 only if the customer chooses to make a payment via a credit card. In the preferred embodiment, the bill payment system 500 may present a pop-up screen marketing credit card bill payment to the customer during the payment initiation process. Customers would have the option of enrolling for credit card bill payment rather then checking account payment (or both if the customer chooses one as primary method of payment and the other as a secondary or backup method of payment).

If the customer chooses to set up a biller for credit card bill payment, the bill payment system 500 presents a screen to obtain (or confirm) the information needed to initiate a payment on behalf of the customer at the biller website. As discussed above, common data elements are retrieved from the database of the stored values captured from the customer or from the credit card issuer. If there are any additional elements that must be captured by the customer, the customer needs to enter these additional elements. The bill payment system 500 then stores additional elements in the database for future reference.

After the customer enters the required values, the bill payment system 500 validates the information by logging into the biller website and validating the account. If the account passes the validation check, the payment is scheduled and stored to the database. A confirmation screen is presented to the customer along with other information pertinent to the scheduled biller, and the bill is moved to the bill outbox.

If the system could not validate the customer's information, as a result of the information provided by the customer being incorrect, an error message is displayed describing the verification error. The customer can either cancel out the process at this point or correct the information and attempt to validate the corrected information again. If the customer cancels out of the process, the customer will be taken to the check payment screen.

If the system could not validate the customer's information because the biller's website was unavailable, an error message is displayed describing the error. The message can also state that the information will be validated at a later time if the customer so chooses. The customer can choose to resubmit the validation request, or have the validation take place at a later time. If the customer chooses to make the payment via a checking account, the customer is directed to the check payment screen. The bill payment system 500 then attempts to validate the biller during the next validation process.

If the customer chooses not to pay via a checking account, the payment is moved to the Bill Outbox and will be scheduled for payment on the date the customer instructed. The bill payment system 500 will attempt to revalidate the account information in the next validation process. If the account can not be validated prior to the payment date, validation will occur during the payment process. If the information cannot be validated during the payment process, the error process built into the payment process will take the necessary actions (notify the customer via e-mail, move the bill to the inbox, and set a special alert).

As previously discussed, credit card payment initiation can take place through a manual, automatic, or recurring payment. A bill received into the bill center 96 can either be paid manually by the customer, or will be paid using an automatic payment rule the customer has set up for the biller. A bill created by the bill center 96 may also result in a payment initiated from a recurring payment rule the customer has set up for the biller.

Figure 25:
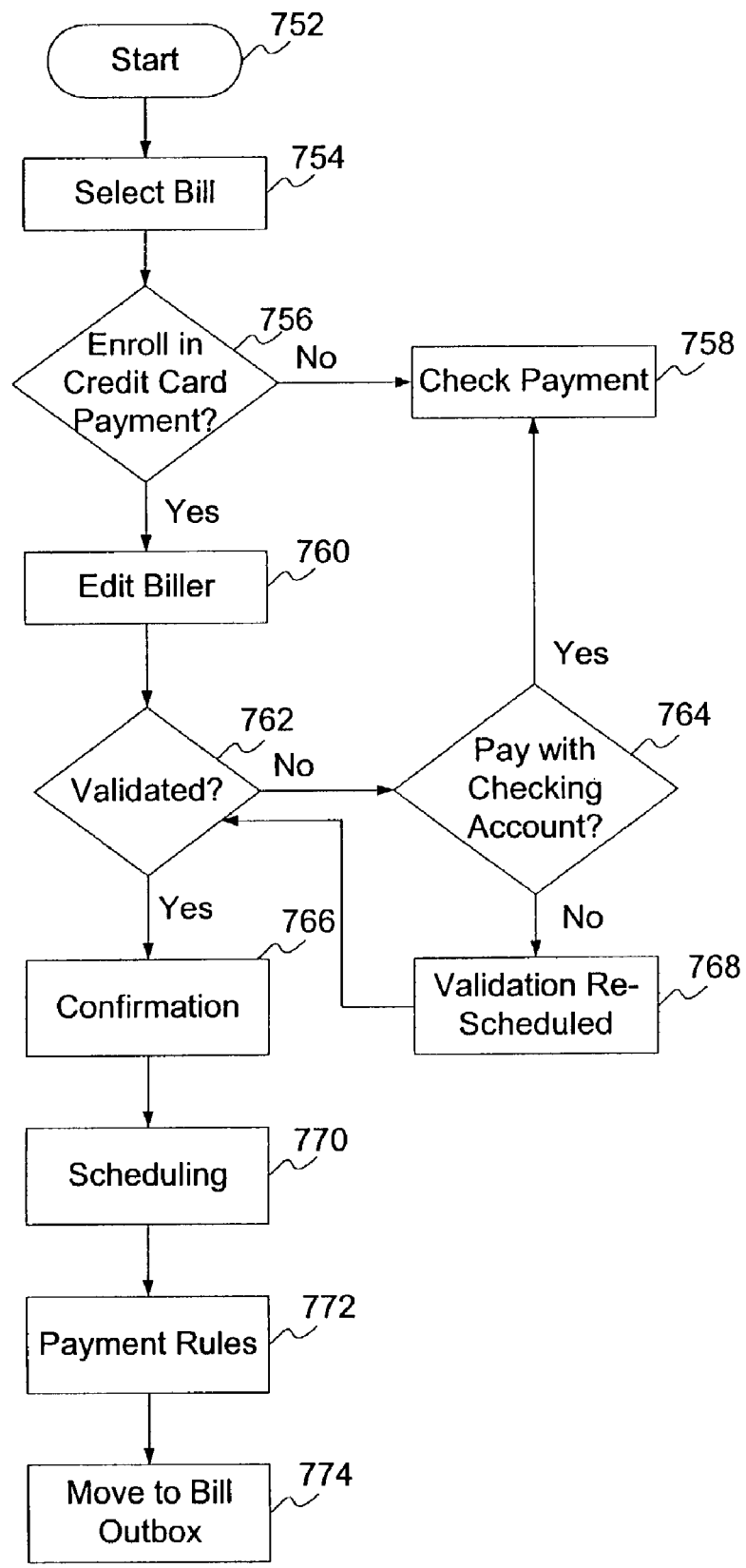
FIG. 25 is a flowchart showing the payment initiation process performed in the bill payment system illustrated in FIG. 18 when a biller has not been previously set up for bill payment by the customer.

FIG. 25 depicts the process of initiating a credit card payment to a biller that the customer had not previously set up with the bill payment system 500. The process starts out in a process initiation step 752, with the customer then selecting a bill for credit card payment from the bill inbox in a bill selection step 754. If the customer initiates a payment to a biller that has not yet been set up for credit card bill payments, a marketing page may be displayed to the customer explaining the credit card payment process, with the customer deciding whether or not to enroll in the biller's credit card payment option in an enrollment determination step 756. If the customer chooses not to enroll in the enrollment determination step 756, then the customer can make payment via check payment (or by other available methods as well) in a make alternate payment step 758.

If, on the other hand, the customer chooses to enroll for credit card bill payment in the enrollment determination step 756, the customer is prompted to verify the data elements that have previously been provided which are used for credit card bill payments in an edit biller step 760 (as discussed above). Once the customer has provided his/her information, the bill payment service 500 validates the customer's information at the biller website 92 in a validation determination step 762. If the information is not validated, then the customer can decide in a payment by checking determination step 764 whether to pay with a checking account (or by other available methods as well). If the customer elects to pay by another method, the process moves to the make alternate payment step 758.

If, on the other hand, the customer decides not to pay by the alternate method, the process will reschedule validation in a reschedule validation step 768. Upon rescheduling of the validation, the process will return to the validation step. Returning now to the validation determination step 762, if the information passes the validation process, a confirmation is provided in a confirmation step 766 and is sent to the customer. After the confirmation has been sent notifying the customer that the biller has been enrolled in credit card bill payment, the customer can move to scheduling of bill payment in a scheduling step 770, following which the customer defines payment rules in a define payment rules step 772. Following the define payment rules step 772, the bill will be moved to the bill outbox for processing in a move to bill outbox step 774.

If an error is encountered with the information the customer provided, the customer can change his/her information and revalidate it or cancel the process. If the customer cancels the process, the process will return to the check payment screen. If, on the other hand, the customer resubmits the information, the validation process will be restarted.

If an error occurs because the biller website is unavailable, the customer may have the option of resubmitting the information or continuing the process without the validation. In this aspect, the bill payment system 500 can schedule the account for validation in the next validation process. The bill payment is moved to the Bill Outbox. If the account is validated prior to the payment date, the database will be updated to reflect the validation. If the information is not validated before the payment date, the payment process will pick up the payment transaction.

Figure 26:
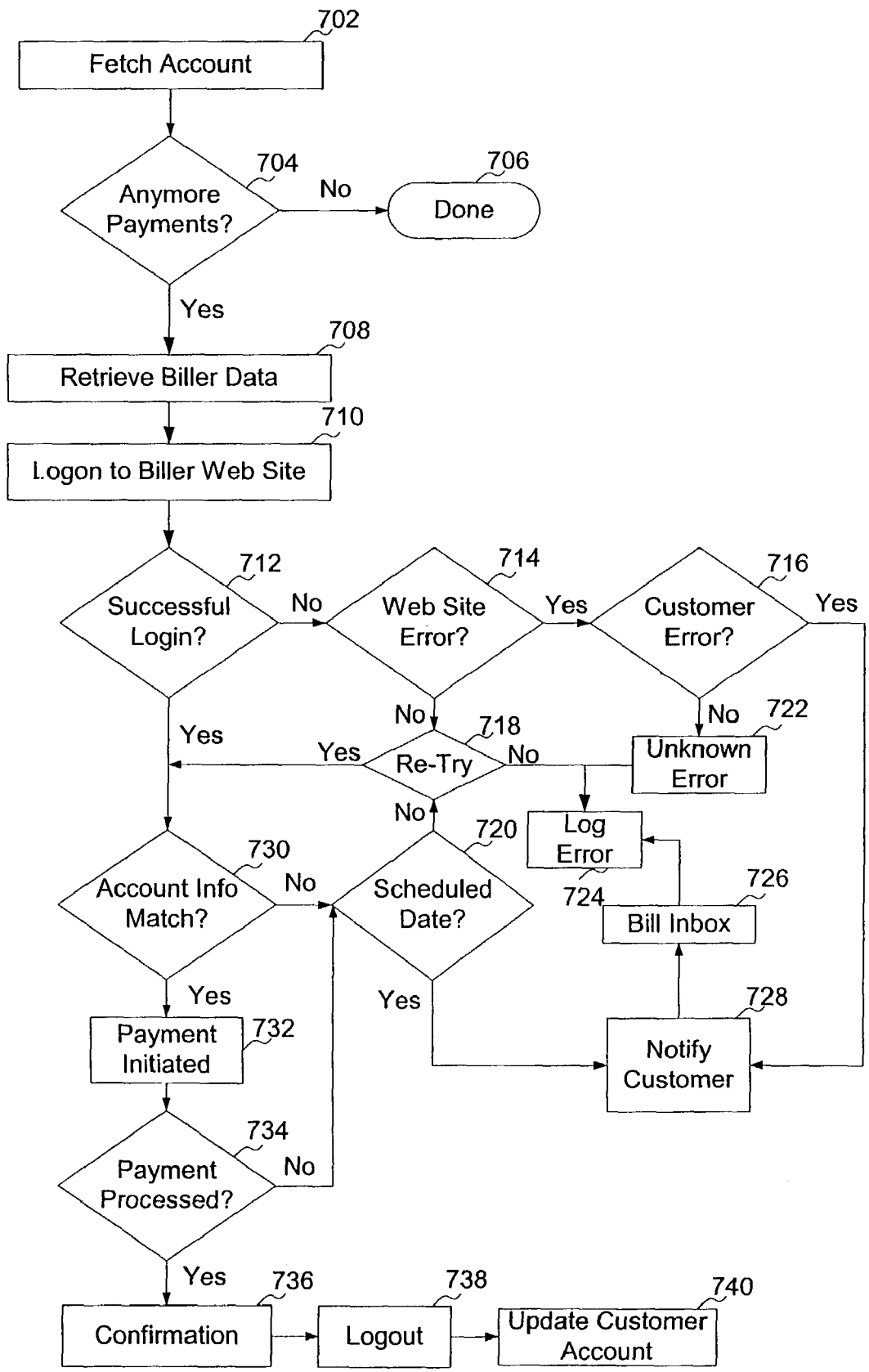
FIG. 26 is a flowchart showing the payment initiation process performed in the bill payment system illustrated in FIG. 18 when a biller has been previously set up as determined in the edit biller process illustrated in FIG. 23.

FIG. 26 depicts the process of initiating a credit card bill payment to a biller that has already been set up in the bill payment system 500. FIG. 26 may be viewed as a continuation of FIG. 25 in which, after a biller is set up in the payment initiation process of FIG. 25, the bill payment system 500 periodically fetches the account in a fetch account step 702 and determines whether there are any payments that need to be initiated in a pending payment determination step 704. If, in the pending payment determination step 704, it is determined that no more payments remain to be made, then the process stops in a process completion step 706. If, on the other hand, it is determined in the pending payment determination step 704 that there are more payments that need to be made, then the bill payment system 500 retrieves the biller data in a retrieve biller data step 708 and logs onto the biller website 92 in a logon to biller website step 710.

If the logon to the biller website step 712 is not successful, then the bill payment system 500 determines whether the error was due to the biller website 92 in a website error determination step 714. If the website error determination step 714 determines that the source of the error is not the biller website, then the bill payment system 500 retries logging on in a retry logon determination step 718, and, if unsuccessful, logs the error in a log error step 724. Returning to the website error determination step 714, if, on the other hand, it is determined that the error is due to the biller website, then the bill payment system 500 determines whether the error was due to customer information in a customer error determination step 716.

If it is determined in the customer error determination step 716 that the error resides in the customer information, the bill payment system 500 notifies the customer in a customer notification step 728, and the bill is moved back to the bill inbox in a send to bill inbox step 726 because payment initiation has failed. If, on the other hand, it is determined in the customer error determination step 716 that the error is not due to customer information, then the error is deemed unknown in an unknown error classification step 722, and is logged for further analysis in the log error step 724.

Returning to the retry logon determination step 718, if, on the other hand, the logon retry is successful, the process moves to an account information match determination step 730. Similarly, if the logon to the biller website determination step 712 is successful, then the bill payment system 500 also moves to the account information match determination step 730, which determines whether the account information (e.g. the account number) matches. If it is determined in the account information match determination step 730 that the account information does not match, then the bill payment system 500 determines whether or not the bill is being processed on the scheduled date in a scheduled date determination step 720.

If it is determined in the scheduled date determination step 720 that the scheduled processing date is correct, then the customer is notified in the customer notification step 728, and the bill is moved to the bill inbox in the send to bill inbox step 726. If, on the other hand, it is determined in the scheduled date determination step 720 that the payment is being initiated on the wrong scheduled date, then the bill payment system 500 retries to logon in the retry logon determination step 718, and if unsuccessful logs the error in the log error step 724 for further analysis.

Returning to the account information match determination step 730, if the account information matches, then the bill payment system 500 initiates payment at the biller website 92 in a payment initiated step 732. If payment cannot be successfully processed as determined in a payment processed determination step 734, the process moves back to the scheduled date determination step 720 to determine whether the payment is initiated on the correct scheduled date. If, on the other hand, it is determined in the payment processed determination step 734 that the payment has been successfully processed, the customer is sent a confirmation in a send confirmation step 736. The bill payment system 500 then logs out of the biller website 92 in a logout step 738, and the customer account is updated in an update customer account step 740.

When the customer manually initiates a payment to a biller that has been set up for credit card bill payment, the customer has the option of choosing a credit card payment account to initiate the payment transaction. The option of using a credit card payment account may be presented in an account drop down menu on the check payment screen. If the customer selects the credit card payment account, the appropriate credit card payment screen is displayed. The customer will proceed through the transaction, and the payment will be scheduled for the date the customer indicates. All cutoff times for credit card payments may apply.

Payment Validation and Login Verification

Five days in advance of the scheduled payment date, the bill payment system 500 will attempt to verify that the payment information meets all system requirements to be processed as a credit card payment, and that the user ID and password provided by the customer is valid at the biller website. This payment validation and login verification feature ensures that the payment will be able to be initiated on the date the customer has scheduled payment. This process will not only serve to validate the customer's user ID and password, but will also serve to give advanced warning of any biller website problems in advance of the payment initiation date.

The first part of the validation process ensures that the payment is still properly set up in the bill payment system 500 to be processed on the payment date. The payment account will be checked to ensure that it is still active and has not passed its expiration date. The bill payment system 500 verifies that the payment account is active and properly associated with the biller in the bill payment system 500 database.

The second part of the validation process uses the User ID and the password provided by the customer to log onto the biller website. The bill payment system 500 will verify that the biller recognizes the user ID and password and that the account number on the biller website matches the account number provided in the bill center 96. The validation process may be performed every day prior to the scheduled payment date, if necessary, for five days total until the information is validated. Once the account has been validated, the last validation date will be updated in the database and the account will not be validated again until the payment date.

Figure 27:
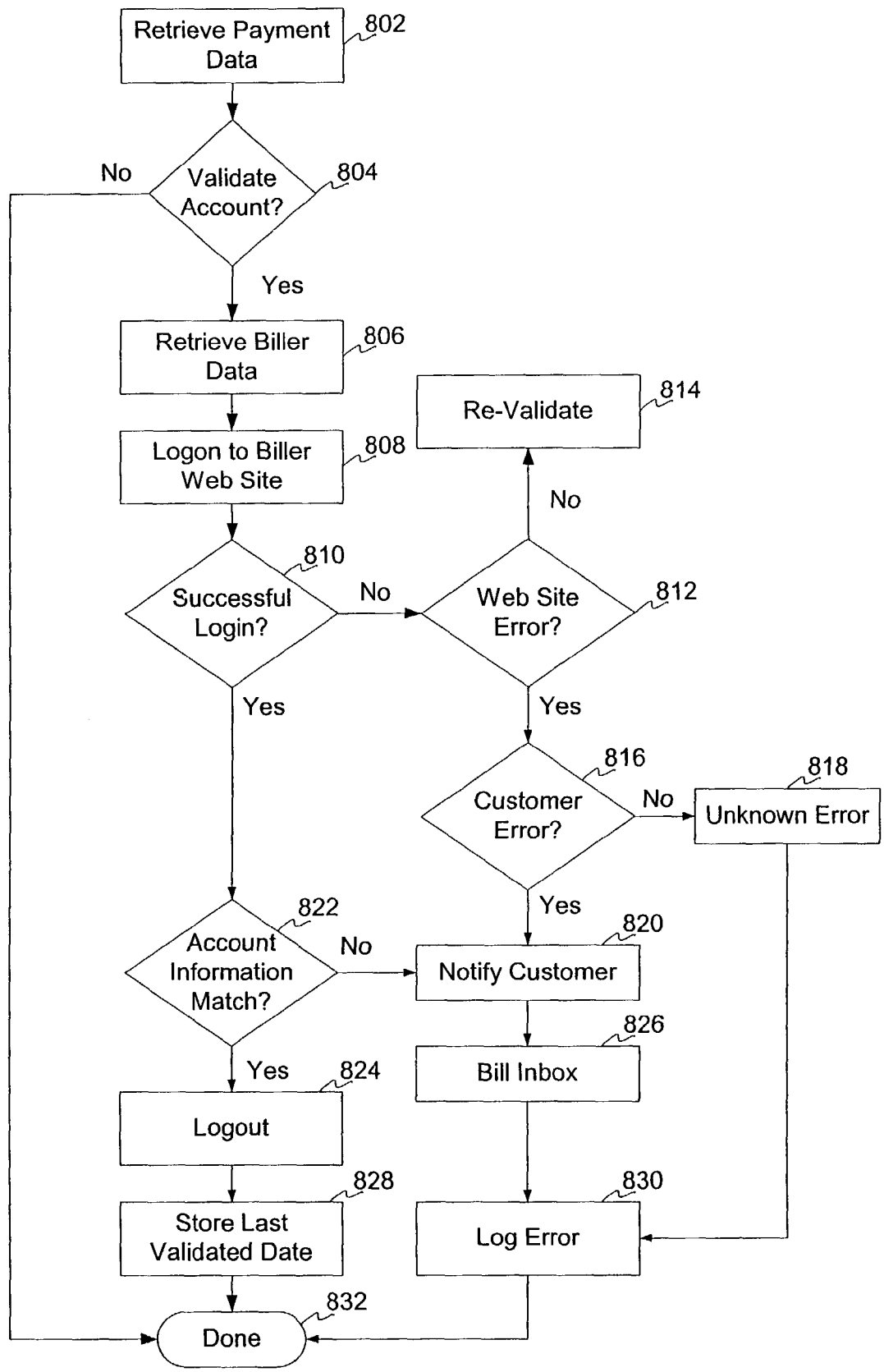
FIG. 27 is a flowchart showing the validation process of the bill payment process performed in the bill payment system illustrated in FIG. 18.

Referring now to FIG. 27, the validation process starts in a retrieve payment data step 802 in which the bill payment system 500 retrieves payment data and determines whether the payment data needs validation in a validation determination step 804. If it is determined that validation is not needed, the system moves to a process completion step 832. If, on the other hand, it is determined in the validation determination step 804 that the payment data needs validation, then the bill payment system 500 retrieves biller data in a retrieve biller data step 806. Using the biller data, the bill payment system 500 then logs onto the biller website in a logon step 808.

If the login is determined to be unsuccessful in a login determination step 810, the bill payment system 500 determines whether the error was due to the biller website in a website error determination step 812. If it is determined in the website error determination step 812 that the source of the error is not the biller website, then the bill payment system 500 retries validation in a revalidate step 814. If, on the other hand, it is determined in the website error determination step 812 that the error is due to the biller website, then the bill payment system 500 determines whether the error was caused by customer information in a customer error determination step 816. If an error occurs with the biller website, then the process will try again the next day. It will continue to try each subsequent day until such time at which the payment transaction will be initiated at the biller website. Any errors with the biller website will be reflected in the daily activity logs. These logs are reviewed daily to ensure timely responses to any biller website change or error.

If it is determined in the customer error determination step 816 that the error resides in the customer information, the bill payment system 500 notifies the customer in a customer notification step 820, and the bill is moved back to the bill inbox in a return to bill inbox step 826 because payment initiation has failed. The system will then log the error in a log error step 830, and then move to the process completion step 832. For example, if an error occurs that is related to the customer's user ID, the password, or the account number, the customer is notified via e-mail that the bill payment system 500 is unable to initiate the scheduled credit card bill payment transaction. The customer's payment is moved from his/her Outbox back to his/her Inbox, and the customer will need to visit the bill center 96 in order to reschedule the payment. In order to reschedule the payment using a credit card, the customer needs to edit the biller information and provide an updated user ID and password. These values are validated through the normal process in order for the customer to schedule a credit card payment transaction.

Referring again to the customer error determination step 816, if, on the other hand, it is determined that the error is due to customer information, then the error is deemed unknown in an unknown error step 818, and is logged for further analysis in the log error step 830, and the process ends in the process completion step 832.

Returning now to the login determination step 810, if it is determined that the login is successful, the bill payment system 500 next determines whether the account information matches in an account information match determination step 822. If it is determined that the account information does not match, the customer is notified in the customer notification step 820, the bill is moved to the bill inbox in the bill inbox step 826, the error is logged in the log error step 830, and the process ends in the process completion step 832. If, on the other hand, it is determined in the account information match determination step 822 that the account information matches, then the bill payment system 500 logs out of the biller website in a logout step 824. For accounts that are validated, the accounts will be marked as validated in the database in a store validation date step 828, and the process will move to the process completion step 832. The account will not be validated again prior to the payment date, when the account will again be validated again upon the initiation of the payment process.

Fail-Proof Payment Option

As has been mentioned above, with previously known EBPP solutions there is no practical way to make last minute payment of a bill, especially if the payment option selected by the customer fails. For example, when customer bills are presented electronically by the biller and the customer initiates payment online, most such bills are paid electronically via ACH transfer. The EBPP provider transfers funds via ACH or a manual draft out of the customer's checking or other asset account. These payment methods assume that the customer has enough money in the customer account to cover the bills. That is not necessary the case and the customer can be rejected and the settlement of bills fail due to NSF. The problem is further compounded by last minute payments and late fees and/or penalties that could damage the credit history of the customer.

The present invention solves this problem by capitalizing on the multiple payment options available through the present invention by providing fail-proof bill payment capabilities in which the present invention allows the customer to set up a "backup" account. For example, if the integrated EBPP system 50 or the bill payment system 500, singly or combined, are unable to process a bill payment with a checking account due to NSF, the integrated EBPP system 50 can use a credit card account (i.e., the backup account) to settle the bills. The driver of the fail-proof bill payment feature is the ability to select from multiple payment options.

Figure 28:
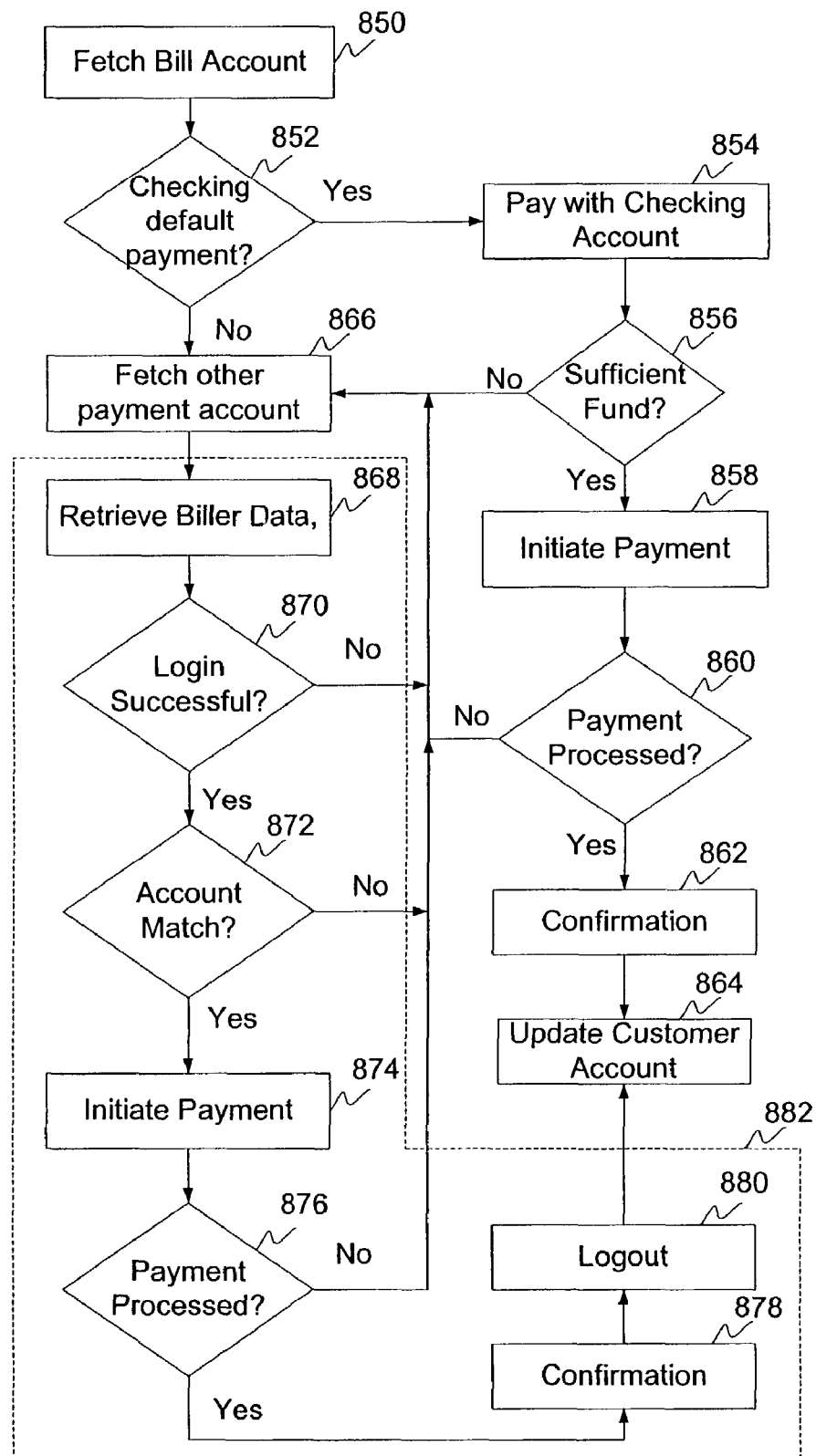
FIG. 28 is a flowchart showing the backup payment feature performed in the bill payment system illustrated in FIG. 18.

Referring finally to FIG. 28, there is shown a flowchart illustrating one aspect of the fail-proof bill payment feature of the present invention. The process starts at a fetch bill account step 850 in which the integrated EBPP system 50 fetches an account to settle a bill. The process then determines in a checking default payment determination step 852 whether a checking account is the default payment account. If it is determined that a checking account has been set up as the default or primary account, then the process moves to pay bills with the checking account in a pay bills from checking account step 854. The system determines in a sufficient funds determination step 856 whether there are (likely) sufficient funds in the checking account to cover the bill being presented for payment. If it is determined in the sufficient funds determination step 856 that likely there are sufficient funds, then the process initiates payment in an initiate payment step 858. Next, the flow determines if payment was successful processed in a payment processed determination step 860. If it is determined in the payment processed determination step 860 determines that payment was successfully processed, then the bill payment process has been successful. In this event, a confirmation is prepared in a confirmation step 862 and is sent to the customer, and the customer account is updated in an update account step 864.

If at any of the check payment determination steps (the checking default payment determination step 852, the sufficient funds determination step 856, and the payment processed determination step 860) were unsuccessful (i.e., a "No" output), the system then selects the next payment account in a fetch backup account step 866 in an effort to settle a bill to avoid late payment fees for the customer if the customer cannot be reached or does not respond in time to remedy the problem. For example, if a credit card has been set up as a "backup" payment account, the process will move to a credit card payment process 882. Using the bill payment system 500, the integrated EBPP system 50 then processes the bill payment using a credit card as described earlier.

The credit card payment process begins by retrieving biller data in a retrieve biller data step 868, with such data typically including access information, credit card information, and any other information necessary to settle the bill using a credit card at the biller website. If it is determined that the login has been successful in a login determination step 870, the process next moves to an account match determination step 872. If it is determined that the account number matches in the account match determination step 872, the system then initiates credit card payment of the bill in an initiate payment step 874. If the credit card payment is determined to have been processed successfully in a payment processed determination step 876, then a confirmation of payment is sent to the customer in a confirmation step 878. The bill payment system 500 then logs out of the biller website in a logout step 880, and the customer account is updated in an update account step 864.

As is similar to the check payment process, if at any of the credit card payment determination steps (the login determination step 870, the account match determination step 872, and the payment processed determination step 876) were unsuccessful (i.e., a "No" output), the system moves back to the fetch backup account step 866 and selects the next payment and attempts to settle the customer bill using the next payment account.

It is apparent that a credit card or any other payment account, such as a debit card, stored value card, or smart card, can be used as the default or primary payment account. In addition, the system can contain multiple backup accounts. When one fails, the system can simply switch over to the next payment account. It is also apparent that by using the bill payment system 500, one credit card account can be a default payment account while another credit card account is a backup payment account.

Process Timing

In one aspect of the present invention, the credit card bill payment process may run independently of both the integrated EBPP system 50 scraping process and the daily EFT payment process. The credit card bill payment process may be run at off-peak hours to ensure faster processing at biller websites when web traffic is at its lowest point, or at optimal hours. Preferably, the process runs on business days, and observes the Federal Reserve holiday schedule. Alternatively, the credit card bill payment process may runs seven days a week to handle any backlog payments in need of scheduling.

In the preferred embodiment, the bill payment system 500 may refer to the stored payment date for each payment. On the payment date, the payment transaction is incorporated in the credit card bill payment file. When the bill is moved into the credit card bill payment file, the status of the bill is changed to pending, and the bill will no longer be present in the bill center 96.

The credit card bill payment file may attempt to initiate a credit card bill payment transaction for each payment in the file for a 48-hour period. If the payment is not processed within 48 hours after the payment date, the bill is moved back to the customer's inbox and the customer is notified that payment could not be executed. The customer may at that point need to visit the bill center 96 and reschedule the payment manually.

Using the payment date, the credit card bill payment process will initiate the credit card payment transaction on behalf of each customer payment included in the credit card bill payment file. In one aspect, the process may start with a scheduled task that will call up all scheduled credit card payment transactions for that day. All scheduled payments may be broken down by biller, and the process will begin to initiate payments to each biller website for the scheduled payment transactions. Any payments scheduled in advance of the payment date is processed beginning at 6:00 AM EST on the payment date.

Any credit card bill payments scheduled on the payment date after 6:00 AM EST, but before 3:00 PM EST, will move into a pending status at 3:00 PM EST, the same time the check and/or EFT payment process runs.

These credit card bill payments will be staged for the next credit card bill payment process, which may be run later that evening, or early the next morning (depending on the best processing time for each biller).

As previously discussed, the system of the present invention uses "bot" technology that incorporates specific strategies for each enabled biller. These strategies will work off of a main platform and will be customized to each individual biller website. These strategies call up the appropriate customer information from the bill payment system 500 database that is needed to schedule the payment transaction at biller websites on behalf of the customer. A session with the biller is created using the customer's user ID and password, scheduling the credit card payment transaction, logging the transaction confirmation or any errors encountered at the site, and then logging out of the customer's account. The confirmation number is captured and stored to the bill payment system 500 database, and may be displayed in the tracking portion of the bill center. The confirmation number is also sent to the customer in the payment confirmation e-mail, along with the terms and conditions presented at the biller website.

This payment process is repeated for each biller, initiating each payment transaction that was scheduled for that day. All transactions are logged to the bill payment system 500 database and are used for notification and reporting purposes.

Transactions Notification

Each successful transaction generates an e-mail confirmation to the customer. The e-mail notification is sent to the customer on the date the payment was successfully made at the biller website. The e-mail also includes any terms and conditions that are presented on the biller website as part of the payment transaction or confirmation. The terms and conditions provide the customer with the appropriate validation that the biller intended on the biller website.

The customer's bill will be changed from a pending status to a paid status, and the bill will be available for viewing in the Reports section of the customer bill center 96. The customer will then be able to view the bill using the reporting functionality in the bill center 96, and the payment confirmation number from the biller website will be displayed in the tracking portion of the bill.

If a credit card bill transaction is unsuccessful 48 hours past the payment date, the customer is notified via email that the bill payment system 500 was unable to initiate credit card payment. The e-mail will include the error message present at the biller website or a description of the error encountered by the bill payment system 500 when trying to make the payment.

The customer's bill will be changed from a pending status to an unpaid status, and is moved back to the Inbox in the bill center 96. In order to reschedule the payment, the customer will need to log into the bill center 96 and manually initiate the transaction. At that time, the customer will be able to schedule the payment using either a checking account or credit card payment account, provided that the error was not as a result of an invalid credit card account. Preferably, all rescheduled payments will be processed with the next payment cycle for each appropriate process (checking account or credit card bill).

The bill payment system 500 will log all errors to the database and keep a record of the possible error conditions that occur at each biller website. The error conditions will be used in the email message to the customers.

CONCLUSION

The foregoing detailed description has disclosed to those skilled in the art the best mode known to the inventors of making and using the bill payment system of the invention. It will be apparent to those skilled in the art that the principles of the invention may be applied not only in the context of the Internet, but in any context where a customer of the EBPP has access to other information via a network.

The integrated bill payment system of the invention may be implemented in many different ways. As already pointed out, the components of the system may be distributed across a number of systems.

With regard to the bill payment system of the present invention, the use of scraping strategies to incorporate credit card payment transactions is performed by using the customer's login information to initiate credit card payments at the biller website. In order to initiate a credit card payment at a biller website, the bill payment system requires the customer's credit card information for the credit card the customer will use to pay the biller and the login information for the biller website. In another aspect, even if the customer has already established a credit card payment with the biller website, the present invention can still be the facilitator of credit card bill payment for the customer if the customer supplies the access information for the biller website (assuming that the credit card information is saved at the biller website.)

The bill payment system of the present invention may be modified to include debit card transactions similar to credit card transaction or basically all bank cards known in the art. Smart card (a smart card, similar in size to a credit card, contains an embedded microchip that can be loaded with data, used for telephone calling, electronic cash payments, and other applications, and then periodically refreshed for additional use) can be utilized as well; however, the method and system of using smart cards will vary due to the information available on smart cards.

Although an exemplary embodiment of the bill payment system of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. An electronic bill payment system comprising:
a user interface at a first website on a user computer for enabling a user to enter user financial account information and user access information for use in accessing a biller website and for making a payment at said biller website from a user financial account, said first website being a different website than said biller website; and
a bot program for using said user access information to access said biller website,
said bot program using said user financial account information to initiate a payment on behalf of the user at said biller website from said user financial account,
the bot program configured with a bill presentment component for gathering user bills from billers, said electronic bill payment system being operative to pay electronic bills gathered by said bill presentment component,
the bill presentment component including an agent program acting as a proxy for the user for accessing the biller website using said user access information, said agent program, on a scheduled basis, scraping said biller website to obtain bill data for said user, said agent program returning said user bill data from said biller website to said bill presentment component for presentment to said user.

2. An electronic bill payment system as defined in claim 1, further comprising:
a scheduling component enabling the user to schedule a payment initiation date, said scheduling component further allowing the user to define payment rules.

3. An electronic bill payment system as defined in claim 2, wherein said payment rules comprise a manual payment rule, an automatic payment rule, and a recurring payment rule.

4. An electronic bill payment system as defined in claim 1, further comprising:
a payment validation feature to review information associated with said payment prior to making said payment to ensure that said payment will be successfully processed.

5. An electronic bill payment system as defined in claim 1, further comprising:
a login verification feature to validate said user access information for accessing said biller website and verifying said user access information used to access said biller website and determining any potential problem in advance of making a payment.

6. An electronic bill payment system as defined in claim 1, further comprising:
an automated user ID and password feature for facilitating online setup of a user account at said biller website for the user if the user does not have a user account with said biller website.

7. An electronic bill payment system as defined in claim 6, wherein said automated user ID and password feature captures user information from the user which is necessary to set up online access with said biller website.

8. An electronic bill payment system as defined in claim 6, wherein said automated user ID and password feature attempts to use a preferred ID and a preferred password provided by the user to set up online access with said biller website.

9. An electronic bill payment system as defined in claim 8, wherein said automated user ID and password feature automatically creates a new user ID and a new user password that meets the biller website requirements if said preferred user ID and/or said preferred password are not valid at said biller website.

10. An electronic bill payment system as defined in claim 1, further comprising:
a credit card bill payment component for enabling the payment of a bill with a credit card.

11. An electronic bill payment system as defined in claim 1, further comprising:
a debit card bill payment component for enabling the payment of a bill with a debit card.

12. An electronic bill payment system as defined in claim 1, further comprising:
a stored valued card bill payment component for enabling the payment of a bill with a stored value card.

13. An electronic bill payment system as defined in claim 1, further comprising:
a smart card bill payment component for enabling the payment of a bill with a smart card.

14. An electronic bill payment system as defined in claim 1, further comprising:
a check payment component for enabling the payment of a bill with an electronic check.

15. An electronic bill payment system as defined in claim 1, further comprising:
a backup account payment feature which enables the user to select at least one user financial account which will be used to settle a bill if the bill is not settled with a payment from said user financial account.

16. An electronic bill payment system as defined in claim 1, further comprising:
a bill balancing feature for computing the current balance of said user financial account by subtracting from an account balance the amounts of bills paid since the last time the account balance was updated.

17. An electronic bill presentment and payment system as defined in claim 1, wherein said bot program runs at off-peak hours to ensure faster processing.

18. An electronic bill presentment and payment system comprising:
a bill center for enabling a user bill to be presented and paid make a payment over the Internet, said bill center enabling a user at a first website on a user computer to enter user access information and user financial account information;
an first agent program acting as a proxy for said user for accessing a biller website using said user access information, said first agent program, on a scheduled basis, scraping said biller website for user bill data,
said first agent program returning said user bill data from said biller website to said bill center for use in producing a display at the bill center that looks like a bill the user would see at said biller website;
an automated account setup option for facilitating online set up of a user account at a biller websites for said user if said user does not have a user account with said biller website;
a first account bill payment component for paying bills from a first user financial account, said user financial account information including information relating to said first user financial account;
a second account bill payment component for paying bills from a second user financial account if payment of bills from said first user financial account is not possible, said user financial account information including information relating to said second user financial account; and
a second agent program for using said user access information to access said biller website, said second agent program using said user financial account information to initiate a payment from at least one of said first and second user financial accounts at said biller website, wherein the first website being a different website than said biller website.

19. An electronic bill payment system, comprising:

a user interface at a first website on a user computer for enabling a user to enter user access information allowing a user to access a biller website, said user interface also allowing said user to select at least one of a plurality of payment options for initiating payment at said biller website, said first website being a different website than said biller website; and an agent program for using said user access information to access said biller website, the agent program, on a scheduled basis, scraping said biller website to obtain bill data for said user, said agent program using said selected payment option to make a payment on behalf of said user at said biller website.

20. An electronic bill payment system as defined in claim 19, wherein said plurality of payment options includes at least two from the group consisting of a checking account, a credit card account, and a debit card account.

21. An electronic bill payment system as defined in claim 19, further comprising:

an automated account setup agent program for facilitating online set up of a user account at the biller website for said user if said user does not have a user account with said biller website.

22. An electronic bill payment system as defined in claim 19, wherein said user interface further allows said user to select at least one of a plurality of backup payment options for initiating payment at said biller website, said electronic bill payment system further comprising:

a backup agent program for using said user access information to access said biller website, said agent program using said backup payment option to initiate a payment on behalf of said user at said biller website if said selected payment option fails to settle a bill.

23. A method of paying bills via the Internet, comprising:

setting up a user at a first website on a user computer to settle bills at a biller website by acquiring user access information required to access said biller website and user financial account information to perform a payment at said biller website from said user financial account, the first website being a different website than the biller website;

accessing said biller website using said user access information, on a scheduled basis, to scrape user bill data from said biller website; and making a payment from the first website on behalf of the user at said biller website using said user access information and said user financial account information.

24. A method as defined in claim 23, wherein said user financial account is a credit card account or a debit card account.

25. A method as defined in claim 23, further comprising:

automatically setting up a user account for initiating payment at said biller website based on said user financial account information.

26. A method as defined in claim 23, further comprising:

enabling said user to select a primary payment account and at least one backup payment account, wherein said backup payment account is used to settle a bill if a primary payment account fails to settle a bill.

27. A method of paying bills via the Internet, comprising:

providing an interface at a first website on a user computer for a user to enter user access information required to access a biller website, wherein said user access information is validated at said biller website, the first website being a different website than the biller website;

automatically setting up a user account at said biller website if the user has not set up a user account at the biller website;

acting as a proxy for the user for accessing the biller website using said user access information and, on a scheduled basis, to scrape user bill data from the biller website for use in producing a display at the first website that looks like a bill the user would see at said biller website;

providing an interface for the user at the first website to enter bill payment information necessary to pay a bill at the biller site; and making a bill payment on behalf of the user at the biller website using the user access information and the bill payment information.

* * * * *

UNITED STATES PATENT AND TRADEMARK OFFICE
CERTIFICATE OF CORRECTION

| | | |
|---|---|---|
| PATENT NO. | : 7,958,049 B2 | Page 1 of 1 |
| APPLICATION NO. | : 10/405570 | |
| DATED | : June 7, 2011 | |
| INVENTOR(S) | : Eric W. Jamison et al. | |

It is certified that error appears in the above-identified patent and that said Letters Patent is hereby corrected as shown below:

Claim 18, col. 52, line 45, "an first agent" should read -- a first agent --.

Signed and Sealed this
Fourteenth Day of February, 2012

David J. Kappos
*Director of the United States Patent and Trademark Office*